(12) United States Patent
Wright et al.

(10) Patent No.: US 11,503,826 B2
(45) Date of Patent: Nov. 22, 2022

(54) LOW VOLATILITY AUXIN HERBICIDE FORMULATIONS

(71) Applicant: Monsanto Technology LLC, St. Louis, MO (US)

(72) Inventors: Daniel R. Wright, St. Louis, MO (US); Eric J. Roskamp, Chesterfield, MO (US); Ronald J. Brinker, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 0 days.

(21) Appl. No.: 15/472,425

(22) Filed: Mar. 29, 2017

(65) Prior Publication Data

US 2017/0311589 A1    Nov. 2, 2017

Related U.S. Application Data

(63) Continuation of application No. 15/093,289, filed on Apr. 7, 2016, now abandoned, which is a continuation of application No. 13/389,864, filed as application No. PCT/US2010/044873 on Aug. 9, 2010, now abandoned.

(60) Provisional application No. 61/232,710, filed on Aug. 10, 2009.

(51) Int. Cl.
| | |
|---|---|
| *A01N 25/22* | (2006.01) |
| *A01N 25/32* | (2006.01) |
| *A01N 37/40* | (2006.01) |
| *A01N 57/20* | (2006.01) |

(52) U.S. Cl.
CPC ............. *A01N 25/22* (2013.01); *A01N 25/32* (2013.01); *A01N 37/40* (2013.01); *A01N 57/20* (2013.01)

(58) Field of Classification Search
None
See application file for complete search history.

(56) References Cited

U.S. PATENT DOCUMENTS

| | | |
|---|---|---|
| 3,013,054 A | 12/1961 | Richter |
| 3,276,856 A | 10/1966 | Esposito |
| 3,594,151 A | 7/1971 | Sprayberry et al. |
| 3,713,404 A | 1/1973 | Lavo et al. |
| 3,870,732 A | 3/1975 | Hokama |
| 3,910,974 A | 10/1975 | Hokama |
| 3,923,849 A | 12/1975 | Hokama |
| 4,022,610 A | 5/1977 | Hokama |
| 4,445,927 A | 5/1984 | Gimesi et al. |
| 4,534,783 A | 8/1985 | Beestman |
| 4,936,900 A | 6/1990 | Hyson |
| 4,936,901 A | 6/1990 | Surgant, Sr. et al. |
| 5,004,863 A | 4/1991 | Umbeck |
| 5,015,580 A | 5/1991 | Christou et al. |
| 5,035,738 A | 7/1991 | Burns et al. |
| 5,159,135 A | 10/1992 | Umbeck |
| 5,175,353 A | 12/1992 | Jones et al. |
| 5,221,319 A | 6/1993 | Van Haften et al. |
| 5,229,354 A | 7/1993 | Narayanan et al. |
| 5,229,355 A | 7/1993 | Chaudhuri et al. |
| 5,231,070 A | 7/1993 | Narayanan et al. |
| 5,250,500 A | 10/1993 | Jones et al. |
| 5,283,228 A | 2/1994 | Narayanan et al. |
| 5,384,253 A | 1/1995 | Krzyzek et al. |
| 5,416,011 A | 5/1995 | Hinchee et al. |
| 5,434,783 A | 7/1995 | Pal et al. |
| 5,463,174 A | 10/1995 | Moloney et al. |
| 5,508,184 A | 4/1996 | Negrutiu et al. |
| 5,518,908 A | 5/1996 | Corbin et al. |
| 5,538,880 A | 7/1996 | Lundquist et al. |
| 5,550,318 A | 8/1996 | Adams et al. |
| 5,569,834 A | 10/1996 | Hinchee et al. |
| 5,591,616 A | 1/1997 | Hiei et al. |
| 5,631,152 A | 5/1997 | Fry et al. |
| 5,670,454 A | 9/1997 | Grossmann et al. |
| 5,733,848 A | 3/1998 | Luteri |
| 5,824,877 A | 10/1998 | Hinchee et al. |
| 5,877,112 A | 3/1999 | Roberts et al. |
| 5,883,046 A | 3/1999 | Luteri |
| 5,965,487 A | 10/1999 | Flahive |
| 5,981,840 A | 11/1999 | Zhao et al. |
| 6,030,923 A | 2/2000 | Okano et al. |
| 6,060,432 A | 5/2000 | Adams et al. |
| 6,107,249 A | 8/2000 | Wikeley |
| 6,133,199 A | 10/2000 | Soula et al. |
| 6,160,208 A | 12/2000 | Lundquist et al. |
| 6,177,414 B1 | 1/2001 | Tomalia et al. |
| 6,384,301 B1 | 5/2002 | Martinell et al. |

(Continued)

FOREIGN PATENT DOCUMENTS

| | | |
|---|---|---|
| AU | 2010202620 A1 | 7/2010 |
| CA | 2729738 A1 | 1/2010 |

(Continued)

OTHER PUBLICATIONS

Agrian, Buffer Protect, Westbridge Agricultural Products, <http://www.agrian.com/labelcenter>, downloaded Jan. 17, 2013, 2 pages.

Banvel, Micro Flo Company, Material Safety Data Sheet, prepared Jul. 14, 1999, 3 pages.

Banvel II, BASF The Chemical Company, Material Safety Data Sheet, Rev. Nov. 30, 2006, 5 pages.

Behrens, R., et al., "Dicamba Volatility," Weed Science, 1979, pp. 486-493, vol. 27, No. 5.

(Continued)

*Primary Examiner* — Erin E Hirt
(74) *Attorney, Agent, or Firm* — Stinson LLP

(57) ABSTRACT

Low volatility dicamba herbicide formulations are described. In some embodiments, concentrate formulations comprising dicamba monoethanolamine salt, dicamba potassium salt, or mixed dicamba salts are provided. In other embodiments, a dicamba salt is combined with a polybasic polymer.

11 Claims, 1 Drawing Sheet

(56) References Cited

U.S. PATENT DOCUMENTS

| | | |
|---|---|---|
| 6,399,861 B1 | 6/2002 | Anderson et al. |
| 6,403,865 B1 | 6/2002 | Koziel et al. |
| 6,410,783 B1 | 6/2002 | Peterson et al. |
| 6,417,140 B1 | 7/2002 | Patel |
| 6,586,367 B2 | 7/2003 | Lee et al. |
| 6,774,087 B1 | 8/2004 | Nakayama et al. |
| 6,906,004 B2 | 6/2005 | Parrish et al. |
| 6,939,555 B2 | 9/2005 | Volgas et al. |
| 7,135,437 B2 | 11/2006 | Pallas et al. |
| 7,223,718 B2 | 5/2007 | Smiley |
| 7,431,845 B2 | 10/2008 | Manek et al. |
| 7,695,541 B1 | 4/2010 | Frizzell et al. |
| 2003/0022791 A1 | 1/2003 | Asrar et al. |
| 2003/0104943 A1 | 6/2003 | Lennon et al. |
| 2003/0125209 A1 | 7/2003 | Tank |
| 2004/0138176 A1 | 7/2004 | Miles |
| 2006/0019828 A1 | 1/2006 | Becher et al. |
| 2006/0040826 A1 | 2/2006 | Eaton et al. |
| 2006/0040828 A1 | 2/2006 | Mao et al. |
| 2006/0270556 A1 | 11/2006 | Wright et al. |
| 2007/0093462 A1 | 4/2007 | Rogers et al. |
| 2007/0149409 A1 | 6/2007 | Burnet et al. |
| 2007/0259789 A1 | 11/2007 | Huchet et al. |
| 2008/0119361 A1 | 5/2008 | Feng et al. |
| 2008/0153706 A1 | 6/2008 | Frisch et al. |
| 2008/0182773 A1 | 7/2008 | Gauweiler et al. |
| 2008/0207452 A1 | 8/2008 | Kramer et al. |
| 2008/0207453 A1 | 8/2008 | Kramer et al. |
| 2009/0041813 A1 | 2/2009 | Bouillo et al. |
| 2009/0062127 A1 | 3/2009 | Liu |
| 2009/0093366 A1 | 4/2009 | Wright et al. |
| 2009/0170702 A1 | 7/2009 | Yoshii et al. |
| 2010/0273654 A1 | 10/2010 | Li et al. |
| 2010/0331182 A1 | 12/2010 | Zhang et al. |
| 2011/0034332 A1 | 2/2011 | Becher et al. |
| 2011/0275517 A1 | 11/2011 | Satchivi et al. |
| 2012/0184434 A1 | 7/2012 | Xu et al. |
| 2019/0208786 A1 | 7/2019 | Gao et al. |
| 2020/0253212 A1 | 8/2020 | Agbaje et al. |

FOREIGN PATENT DOCUMENTS

| | | |
|---|---|---|
| CN | 1513326 A | 7/2004 |
| DE | 4030687 A1 | 5/1991 |
| EP | 0 375 624 A1 | 6/1990 |
| EP | 1 023 832 A1 | 8/2000 |
| EP | 2 308 309 A1 | 4/2011 |
| GB | 851008 | 10/1960 |
| GB | 1 262 123 A | 2/1972 |
| RU | 2 366 176 C2 | 9/2009 |
| WO | 92/12637 A1 | 8/1992 |
| WO | 99/05914 A1 | 2/1999 |
| WO | 00/05951 A1 | 2/2000 |
| WO | 00/05952 A1 | 2/2000 |
| WO | 00/30451 | 6/2000 |
| WO | 00/30452 A1 | 6/2000 |
| WO | 0189302 A1 | 11/2001 |
| WO | 2002/102153 A2 | 12/2002 |
| WO | 03024218 A1 | 3/2003 |
| WO | 2005/087007 A1 | 9/2005 |
| WO | 2005/115144 A1 | 12/2005 |
| WO | 2007/110355 A2 | 10/2007 |
| WO | 2008/030749 A2 | 3/2008 |
| WO | 2008/101818 A2 | 8/2008 |
| WO | 2008106118 A2 | 9/2008 |
| WO | 2009/060026 A2 | 5/2009 |
| WO | 2010/046422 A2 | 4/2010 |
| WO | 2010/071936 A1 | 7/2010 |
| WO | 2010/102102 A1 | 9/2010 |
| WO | 2011/039172 A2 | 4/2011 |
| WO | 2011082162 A1 | 7/2011 |
| WO | 2012/104237 A2 | 8/2012 |
| WO | 2012/163824 A1 | 12/2012 |
| WO | 2014134235 A1 | 9/2014 |

OTHER PUBLICATIONS

Bower, R., et al., "Transgenic Sugarcane Plants via Microprojectile Bombardment," The Plant Journal, 1992, pp. 409-419, vol. 2, No. 3.

Branham, B. E., et al., "Drift and Volatility of Broadleaf Herbicides," 1987, pp. 126-129.

Bytebier, B., et al., "T-DNA Organization in Tumor cultures and Transgenic Plants of the Monocotyledon Asparagus Officinalis," Proceedings of the National Academy of Sciences of the United States of America, Aug. 1987, pp. 5345-5349, vol. 84, No. 15.

Christou, P., "Stable Transformation of Soybean Callus by DNA-Coated Gold Particles," Plant Physiology, Jul. 1988, pp. 671-674, vol. 87, No. 3.

Clarity, BASF The Chemical Company, Material Safety Data Sheet, Ref. Aug. 14, 2006, 7 pages.

Climb®, Alkalinity Agent, Product Information, Wilbur Ellis, undated, 2 pages.

"Dicamba 480 Manufacturing Concentrate," Material Safety Data Sheet, Syngenta, 2005, 6 pages, XP007915948.

Dion, H. M., et al., "Competitive Sorption Between Glyphosate and Inorganic Phosphate on Clay Minerals and Low Organic Matter Soils," Journal of Radioanalytical and Nuclear Chemistry, Aug. 2001, pp. 385-390, vol. 249, Issue 2.

Foy, C. L., et al., "Effect of Inhibitors and Herbicides on Tricarboxylic Acid Cycle Substrate Oxidation by Isolated Cucumber Mitochondria," Weeds, Jul. 1965, pp. 226-231, vol. 13, No. 3.

Fraley, R. T., et al., "Expression of Bacterial Genes in Plant Cells," Proceedings of the National Academy of Sciences of the United States of America, Aug. 1983, pp. 4803-4807, vol. 80, No. 15.

Fromm, M. E., et al., "Expression of Genes Transferred into Monocot and Dicot Plant Cells by Electroporation," Proceedings of the National Academy of Sciences of the United States of America, Sep. 1985, pp. 5824-5828, vol. 82, No. 17.

Fynan, E. F., et al., "DNA Vaccines: Protective Immunizations by Parenteral, Mucosal, and Gene-Gun Inoculations," Proceedings of the National Academy of Sciences of the United States of America, Dec. 1993, pp. 11478-11482, vol. 90, No. 24.

Gordon-Kamm, W. J., et al., "Transformation of Maize Cells and Regeneration of Fertile Transgenic Plants," The Plant Cell, Jul. 1990, pp. 603-618, vol. 2, No. 7.

Hall, J. K., et al., "Dicamba Mobility in Conventionally Tilled and Non-Tilled Soil," Soil and Tillage Research, May 1994, pp. 3-17, vol. 30, Issue 1.

Hartzler, B., "Dicamba Volatility," 2001, Iowa State University Weed Science Online, 4 pages.

Hoefer, R.H., et al., "Absorption of Dicamba in Soybeans as Effected by Formulation and Surfactants," North Central Weed Control Conference, Abstract, 1979, pp. 4-5.

International Preliminary Report on Patentability issued in International PCT Application No. PCT/US2010/044873, dated Feb. 23, 2012, 16 pages.

International Search Report and Written Opinion issued in International PCT Application No. PCT/US2010/044873, dated May 10, 2011, 22 pages.

Iowa State, accessed from <http://www.weeds.iastate.edu/mgmt/2001/dicambavolatility.htm>, Apr. 6, 2014, 4 pages.

Lu, L., et al., "High Efficiency Retroviral Mediated Gene Transduction into Single Isolated Immature and Replatable CD34(3+) Hematopoietic Stem/Progenitor Cells From Human Umbilical Cord Blood," The Journal of Experimental Medicine, Dec. 1993, pp. 2089-2096, vol. 178, No. 6.

Lupasol®, Polyethylenimines for Creative Connections, BASF, 2005, 6 pages.

Lupasol® Products, Technical Information, Feb. 2008, BASF, 12 pages.

Material Safety Data Sheet, DICAMBA 480 Manufacturing Concentrate, Reg. No. 24774, Syngenta Crop Protection Canada, Inc., MSDS Preparation Date Dec. 31, 2008, 6 pages.

Material Safety Data Sheet, Blend of Di-potassium Phosphate, Nitrogen, and Ag-Phite (DKP xtra), Product No. Mar. 18, 2020, Plant Food Systems, Inc., Undated, 1 page.

(56) References Cited

OTHER PUBLICATIONS

Material Safety Data Sheet regarding Amine 4 2,4-D Weed Killer prepared by Registrations and Regulatory Affairs, Date of Issue Dec. 14, 2012, 3 pages.
Nalewaja, J. D., et al., "Salt Antagonism of Glyphosate," Weed Science, Oct.-Dec. 1991, pp. 622-628, vol. 39, No. 4.
Nalewaja, J. D., et al., "2,4-D Amine Antagonism by Salts," Weed Technology, Oct.-Dec. 1991, pp. 873-880, vol. 5, No. 4.
Owen, M. D. K., et al., "Evaluation of Nicosulfuron, Rimsulfuron, and Pyridate Applied Postemergence for Weed Control in Corn," NCWSS Research Report-V.52, Ames, IA, 1995, pp. 149-152.
Peniuk, M. G., et al., "Absorption, Translocation, and Metabolism are Not the Basis for Differential Selectivity of Wild Mustary (*Sinapis arvensis* L.) to Auxinic Herbicides," WSSA Abstracts, 1992, No. 165, 32:55-56, 4 pages.
Petersen, P. J., et al., "Dicamba Absorption and Translocation as Influenced by Formulation and Surfactant," Weed Science, Sep. 1985, pp. 717-720, vol. 33, No. 5, XP009141502.
Poovaiah, B. W., et al., "Effects of Inorganic Salts on Tissue Permeability," Plant Physiology, Aug. 1976, pp. 182-185, vol. 58, No. 2.
Purdue, accessed from <http://web.archive.org/web/*/http://www.agriculture.purdue.edu/fnr/html/faculty/holt/NRCASupplement.pdf>, 2007, 19 pages.
Quimby, P. C., Jr., et al., "Selectivity of Dicamba in Wheat and Wild Buckwheat," Weed Science, Sep. 1971, pp. 598-601, vol. 19, No. 5.
Ramirez-Ortega, R., et al., "Enhancement Effect of N, P and K on Glyphosate for Broomrape (*Orobanche crenata* Forsk.) Control in Faba Bean (*Vicia faba* L.)," FABIS Newsletter 31, 1992, pp. 37-39.
Safety Data Sheet—Clarity (Version 3.0), BASF The Chemical Company, May 2, 2013, 9 pages.
Sargent, J.A., "Chapter 10 Relationship of Selectivity to Uptake and Movement," Herbicides, 1976, Second Edition, vol. 2, pp. 303-312, 12.
Scott, P. C., "Separation of Effects of Auxin and Ethylene in Pea Roots," Nature, 1970, pp. 1366-1367, vol. 227.
Serafini, accessed from <http://pmep.cce.cornell.edu/profiles/herb-growthreg/dalapon-ethephon/diglycolamine/Diglycolamine_600.html>, Apr. 6, 2014, 3 pages.
Sprankle, P., et al., "Rapid Inactivation of Glyphosate in the Soil," Weed Science, May 1975, pp. 224-228, vol. 23, No. 3.
Wagner, E., et al., "Coupling of Adenovirus to Transferrin-polylysine/DNA Complexes Greatly Enhances Receptor-mediated Gene Delivery and Expression of Transfected Genes," Proceedings of the National Academy of Sciences of the United States of America, Jul. 1992, pp. 6099-6103, vol. 89, No. 13.
Wan, Y., et al., "Generation of Large Numbers of Independently Transformed Fertile Barley Plants," Plant Physiology, Jan. 1994, pp. 37-48, vol. 104, No. 1.
Wauchope, R. D., et al., "The SCS/ARS/CES Pesticide Properties Database for Environmental Decision-Making," 1992, Reviews of Environmental Contamination and Toxicology, 1992, pp. 1-155, vol. 123.
Pernak et al., Ionic liquids with herbicidal anions, Tetrahedron 67 (2011) 4838-4844.
Pernak et al., 2,4-D based herbicidal ionic liquids, Tetrahedron 68 (2012) 4267-4273.
UCANR, "EPSP inhibitors" https://herbicidesymptoms.ipm.ucanr.edu/MOA/EPSP_synthase_inhibitors/#:-:text=Glycines%20(glyphosate)%20are%20herbicides%20that,of%20the%20aromatic%20amino%20acids. No pagination, no date, 2 pages.

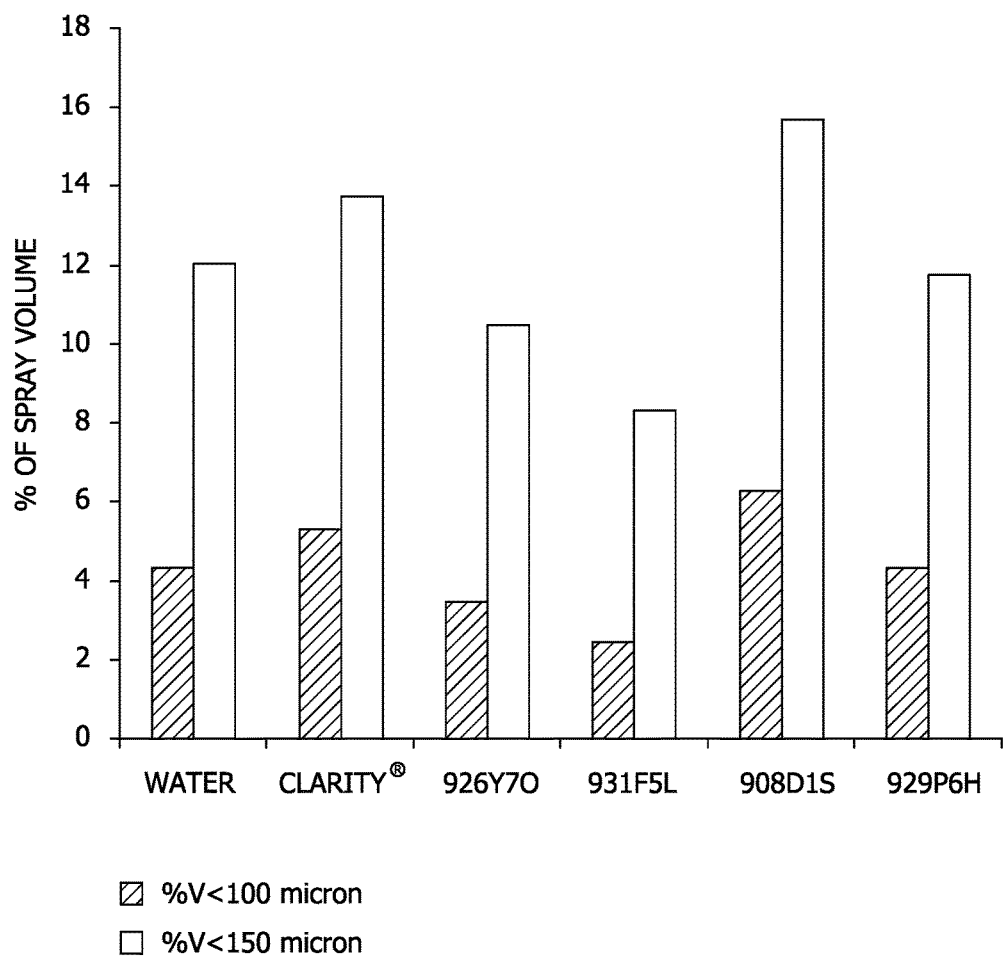

LOW VOLATILITY AUXIN HERBICIDE FORMULATIONS

REFERENCE TO RELATED APPLICATIONS

This application is a continuation application of U.S. application Ser. No. 15/093,289, filed Apr. 7, 2016, which is a continuation application of U.S. application Ser. No. 13/389,864, filed Feb. 10, 2012, based on PCT application PCT/US10/44873, filed Aug. 9, 2010, claiming priority to U.S. Provisional Application No. 61/232,710, filed Aug. 10, 2009, the entire disclosures of which are incorporated by reference.

FIELD OF THE INVENTION

The present invention generally relates to low volatility auxin herbicide formulations.

BACKGROUND OF THE INVENTION

Auxin herbicides have proven to be effective and highly beneficial for control of unwanted plants. Auxin herbicides include 2,4-D (2,4-dichlorophenoxyacetic acid), 2,4-DB (4-(2,4-dichlorophenoxy)butanoic acid), dichloroprop (2-(2,4-dichlorophenoxy)propanoic acid), MCPA ((4-chloro-2-methylphenoxy)acetic acid), MCPB (4-(4-chloro-2-methylphenoxy)butanoic acid), aminopyralid (4-amino-3,6-dichloro-2-pyridinecarboxylic acid), clopyralid (3,6-dichloro-2-pyridinecarboxylic acid), fluroxypyr ([(4-amino-3,5-dichloro-6-fluoro-2-pyridinyl)oxy]acetic acid), triclopyr ([(3,5,6-trichloro-2-pyridinyl)oxy]acetic acid), diclopyr, mecoprop (2-(4-chloro-2-methylphenoxy)propanoic acid) and mecoprop-P, dicamba (3,6-dichloro-2-methoxybenzoic acid), picloram (4-amino-3,5,6-trichloro-2-pyridinecarboxylic acid), quinclorac (3,7-dichloro-8-quinolinecarboxylic acid), aminocyclopyrachlor (6-amino-5-chloro-2-cyclopropyl-4-pyrimidinecarboxylic acid), agriculturally acceptable salts of any of these herbicides, racemic mixtures and resolved isomers thereof, and mixtures thereof. Dicamba has proven to be a particularly effective auxin herbicide and is typically formulated as the sodium, dimethylamine, isopropylamine or diglycolamine salt.

Volatility and drift problems are commonly associated with auxin herbicides. Volatile auxin herbicides can, under certain conditions of application, vaporize into the surrounding atmosphere and thereby migrate from the application site to adjacent crop plants, such as soybeans and cotton, where contact damage to sensitive plants can occur. Spray drift can be attributed to volatility as well as to the physical movement of small particles, such as spray droplet particles, from the target site to adjacent crop plants.

Prior art solutions to volatility and drift have failed to successfully regulate off-target dicamba movement from the application site. Attempts to reduce volatility have been made by formulating dicamba in the form of various mineral or amine salts. For example, the commercial product CLARITY® (available from BASF) is a formulation comprising the diglycolamine salt of dicamba and the commercial product BANVEL® (available from BASF) is a formulation comprising the dimethylamine salt of dicamba. Problematically however, crop plants such as soybean and cotton or sensitive plants such as vegetables and flowers located in an area wherein CLARITY or BANVEL has been applied can still exhibit symptoms of injury such as leaf cupping, leaf malformation, leaf necrosis, terminal bud kill and/or delayed maturity.

Other attempts to reduce dicamba volatilization have focused on encapsulation. In one approach, dicamba is absorbed into solid phase natural or synthetic polymers. However, the resulting particle sizes are typically not suitable for spray application therefore limiting use to granular drop application. Microencapsulation in a polymer shell is also known in the art, but the relatively high solubility of dicamba and its salts precludes successful use of that technology in aqueous suspensions and commercial dicamba microencapsulation products have not been developed.

A need persists for low volatility auxin herbicide formulations that are efficacious, yet non-phytotoxic to sensitive crops located in areas adjacent to the target site, and for auxin formulations that are less prone to volatility and physical drift.

SUMMARY OF THE INVENTION

Among the various aspects of the present invention may be noted the provision of auxin herbicide formulations exhibiting low volatility and/or drift and methods for their use.

Briefly, therefore, the present invention is directed to an aqueous herbicidal solution concentrate formulation useful for killing or controlling the growth of unwanted plants, the formulation comprising a solution comprising an auxin herbicide component consisting essentially of auxin herbicide salts and comprising at least 50 grams acid equivalent per liter of dicamba monoethanolamine salt.

The present invention is further directed to an aqueous herbicidal solution concentrate formulation useful for killing or controlling the growth of unwanted plants, the formulation comprising a solution comprising an auxin herbicide component consisting essentially of auxin herbicide salts and comprising at least 550 grams acid equivalent per liter of dicamba potassium salt.

The present invention is further directed to an aqueous herbicidal solution concentrate formulation useful for killing or controlling the growth of unwanted plants, the formulation comprising an auxin herbicide component consisting essentially of auxin herbicide salts and comprising at least 50 grams acid equivalent per liter of dicamba diethanolamine salt.

The present invention is further directed to low volatility auxin herbicide formulations comprising an auxin herbicide component consisting essentially of an auxin herbicide salt or a mixture of auxin herbicide salts and a polybasic polymer or mixture of polybasic polymers, wherein the formulation is an aqueous solution. The polymer has a molecular weight of from 600 to 3,000,000 Daltons and has a nitrogen content of from 13 to 50 percent by weight The present invention is further directed to a method of using an auxin herbicide to control auxin-susceptible plants growing in and/or adjacent to a field of crop plants. The method comprises diluting a formulation comprising a solution of (i) at least 50 grams acid equivalent per liter of dicamba monoethanolamine salt or dicamba diethanolamine salt or at least 550 grams acid equivalent per liter of dicamba potassium salt with water to provide an aqueous herbicidal application mixture or (ii) forming an aqueous application mixture from a low volatility auxin herbicide formulation comprising an auxin herbicide component consisting essentially of an auxin herbicide salt or a mixture of auxin herbicide salts and a polybasic polymer or mixture of polybasic polymers. The aqueous herbicidal application mixture is applied to the foliage of the auxin-susceptible plants.

The present invention is further directed to a method of reducing the volatility of auxin herbicides. The method comprises providing a nitrogen containing polybasic polymer source for use in preparation of an aqueous herbicidal application mixture comprising an auxin herbicide for application to auxin susceptible plants. The auxin herbicide content of said auxin herbicide consists essentially of the salts of one or more auxin herbicide species. The polybasic polymer has a molecular weight from 600 to 3,000,000 Daltons and has a nitrogen content from 10 to 50 percent by weight.

The present invention is still further directed to a method for controlling auxin susceptible plants. The method comprises obtaining a nitrogen containing polybasic polymer source comprising at least one polybasic polymer species, wherein the polybasic polymer has an average molecular weight of from 600 to 3,000,000 Daltons and has an average nitrogen content of from 13 to 50 percent by weight and obtaining an auxin herbicide source having a herbicide content consisting essentially of one or more auxin herbicide salt species. The nitrogen containing polybasic polymer source and auxin herbicide source are mixed with water to produce an aqueous auxin application mixture that is applied to the auxin susceptible plants.

The present invention is yet further directed to a method of counseling a person responsible for control of auxin susceptible plants. The method comprises (i) identifying an auxin herbicide source to be used in the preparation of an aqueous auxin application mixture, the auxin herbicides contained in said auxin herbicide source consisting essentially of one or more auxin herbicide salt species, (ii) identifying a nitrogen containing polybasic polymer source comprising at least one polybasic polymer species, wherein the polybasic polymer has an average molecular weight of from 600 to 3,000,000 Daltons and has an average nitrogen content of from 13 to 50 percent by weight and (iii) enabling said person to prepare said aqueous auxin application mixture from materials comprising said auxin herbicide source and said nitrogen containing polybasic polymer source for application to said auxin susceptible plants.

Other objects and features will be in part apparent and in part pointed out hereinafter.

BRIEF DESCRIPTION OF THE DRAWINGS

FIG. 1 is a graph depicting the percent of spray volume for prior art compositions and compositions of the present invention having droplet particle sizes of less than 150 microns and less than 100 microns wherein the prior art and inventive composition solutions contained about 0.56 weight percent acid equivalent dicamba and were sprayed at 165 kPa pressure by means of a flatfan 9501E nozzle.

Corresponding reference characters indicate corresponding parts throughout the drawings.

DESCRIPTION OF THE PREFERRED EMBODIMENTS

In accordance with the present invention, auxin herbicide formulations exhibiting low volatility, controlled droplet particle size, reduced physical and reduced vapor drift are provided. As compared to auxin formulations known in the art, it is believed that the formulations of the present invention provide enhanced protection from crop injury to auxin tolerant or resistant crops while maintaining comparably effective herbicidal efficacy on unwanted plants located in the target area. Throughout the remainder of the description of the invention, where reference to the auxin herbicide dicamba is made, one skilled in the art will understand that the principles of the present invention apply generally to auxin herbicides, including those described above, and the invention is not limited to dicamba herbicidal formulations.

In some embodiments of the present invention, formulations and methods are provided that effectively control auxin herbicide release to give both commercially acceptable weed control and a commercially acceptable rate of crop injury. In some other embodiments, the formulations provide enhanced crop protection in over the top application to plants.

In accordance with the present invention, a "commercially acceptable rate of weed control" varies with the weed species, degree of infestation, environmental conditions, and the associated crop plant. Typically, commercially effective weed control is defined as least about 60%, 65%, 70%, 75%, 80%, 85%, 90%, 95%, or even greater than 95%. Although it is generally preferable from a commercial viewpoint that 80-85% or more of the weeds be destroyed, commercially significant weed control can occur at much lower levels, particularly with some very noxious, herbicide-resistant plants. "Weed control," as used herein, refers to any observable measure of control of plant growth, which can include one or more of the actions of (1) killing, (2) inhibiting growth, reproduction or proliferation, and (3) removing, destroying, or otherwise diminishing the occurrence and activity of plants. Weed control can be measured by any of the various methods known in the art. For example, weed control can be determined as a percentage as compared to untreated plants following a standard procedure wherein a visual assessment of plant mortality and growth reduction is made by one skilled in the art specially trained to make such assessments. In another control measurement method, control is defined as an average plant weight reduction percentage between treated and untreated plants. Preferably, commercial weed control is achieved at no greater than 30 days after treatment (DAT), such as from 18 to 30 DAT.

A "commercially acceptable rate of crop injury" for the present invention likewise varies with the crop plant species. Typically, a commercially acceptable rate of crop injury is defined less than about 20%, 15%, 10% or even less than about 5%. Crop damage can be measured by any means known in the art, such as those describe above for weed control determination. Preferably, crop damage appears no more than from 10% to 20% at no greater than 30 DAT, such as from 3 to 21 or from 3 to 30 DAT.

The auxin-susceptible plants can be weeds or crop plants. Crop plants include, for example, vegetable crops, grain crops, flowers, root crops and sod. Crop plants of the present invention include hybrids, inbreds, and transgenic or genetically modified plants.

In some embodiments, the crop plants are auxin tolerant species that are not susceptible to auxin herbicides or are a transgenic species that contain an auxin (e.g., dicamba) resistant trait. Examples include dicamba resistant corn, cotton or soybean. Dicamba resistant crops can further comprise one or more additional traits including, without limitation: herbicide resistance (e.g., resistance to other auxin herbicides (e.g., 2,4-D or fluroxypyr), glyphosate, glufosinate, acetolactate synthase inhibitor herbicides (e.g., imazamox, imazethapyr, imazaquin and imazapic), acetyl CoA carboxylase inhibitors (e.g., sethoxydim and clethodim), etc.); insect resistance such as *Bacillus thuringiensis* (Bt); high oil; high lysine; high starch; nutritional density; and/or drought resistance. In some other embodiments, the weeds and/or crop plants are glyphosate tolerant or contain a glyphosate resistant trait. Examples include glyphosate resistant corn, cotton or soybean. In other embodiments, the crop plants comprise stacked traits such as dicamba and glyphosate resistance; dicamba and glufosinate resistance; dicamba and acetolactate synthase (ALS) or acetohydroxy acid synthase (AHAS) resistance; dicamba, glyphosate and glufosinate resistance; dicamba, glyphosate and ALS or AHAS resistance; dicamba, glufosinate and ALS or AHAS resistance; or dicamba, glyphosate, glufosinate and ALS or AHAS resistance. In other embodiments, the plants can additionally include other herbicide, insect and disease resistance traits, as well as combinations of those traits. For instance, the plants can have dicamba, 2,4-D or fluroxypyr resistant traits.

In some embodiments, low volatility commercially acceptable formulations of auxin herbicides are achieved by combining 2,4-D, 2,4-DB, dichloroprop, MCPA, MCPB, aminopyralid, clopyralid, fluroxypyr, triclopyr, diclopyr, mecoprop, mecoprop-P, dicamba, picloram, quinclorac, aminocyclopyrachlor, agriculturally acceptable salts of any of these herbicides, racemic mixtures or resolved isomers thereof, or mixtures thereof (i) in aqueous solution with one or more soluble polybasic polymers such as, for example, a polymeric polyamine and/or (ii) by raising the pH of aqueous solutions thereof. Cations for the formation of auxin herbicide salts include, without limitation, sodium, potassium, ammonium, lithium, diammonium, monoethanolamine, diethanolamine, triethanolamine, triisopropanolamine, dimethylamine, diethylamine, triethylamine, methylamine, ethylamine, diglycolamine, propylamine, butylamine, pentylamine, hexylamine, heptylamine, octylamine, decylamine and dodecylamine, and mixtures thereof.

In accordance with the present invention, it has yet been further discovered that the concentration of volatilized auxin herbicide in the vapor phase surrounding a low volatility auxin herbicide formulation comprising an auxin herbicide salt and one or more polybasic polymers is less than the concentration of volatilized auxin herbicide in the vapor phase surrounding a reference formulation formulated in the absence of the polybasic polymer(s), but otherwise having the same formulation as the low volatility auxin herbicide formulation. Based on experimental evidence, the concentration of volatilized dicamba herbicide in the vapor phase surrounding the low volatility dicamba herbicide formulations of the present invention comprising a polybasic polymer has been discovered to be less than 0.9, 0.8, 0.7, 0.6, 0.5, 0.4, 0.3, 0.2 or 0.1 that of the concentration of volatilized dicamba herbicide in the vapor phase surrounding a similarly formulated reference formulation but not containing the polybasic polymer.

Volatilization can be measured by means known to those skilled in the art such as by distilling auxin herbicide compositions and analyzing the distillation condensate and/or distilled composition for auxin content. In another method, a gas stream can be passed over auxin formulations into which the auxin herbicide volatilizes from the formulation. The gas stream can then be quantitatively analyzed for dicamba content by methods known in the art.

In is believed, without being bound to any particular theory, that polybasic polymers reduce auxin salt volatility because dissociated auxin salt forms ionic bonds with the polybasic polymer and binds the auxin in solution. Any residue from a herbicidal application of the auxin, is therefore inhibited from dissociating to the free acid. In the case of dicamba, the free acid is about 100 times more volatile than bound dicamba acid or salt. Furthermore, it is believed that additional localization of an auxin in or around the polymer matrix may be achieved through cation-pi complexation. It is known that ammonium salts form stable cation-pi complexes with the pi systems of aromatic rings. In this case, the ammonium ions of the polymer can form cation-pi or pi-cation-pi complexes with the auxin. This additional complex interaction may further contribute to reduction in volatilization of the auxin. In some embodiments, reduced dicamba volatility in combination with relatively fast dicamba release from the polymer can be achieved by formulating dicamba salts with a polybasic polymer having a relatively weak ion exchange capability. It is believed that low ion exchange capacity polymers retard dicamba salt disassociation to the free acid form thereby reducing volatility, but those polymers do not bind the dicamba strongly enough to retard release rate to an extent that efficacy is reduced. It is further believed that dicamba bound to polymers having relatively strong ion exchange capability would likewise have a reduced volatilization rate as compared to a similarly formulated formulation, but not containing the polymer.

Experimental evidence to date indicates that the polymers do not inhibit dicamba herbicidal effectiveness (i.e., do not decrease the availability of the herbicide to the plant). Even with the auxin herbicide molecule held by either an acid-base and/or cation-pi electron complex, it has been discovered that the biological activity of dicamba is increased as compared to application of the herbicide with no surfactant and is, in fact, generally equivalent to application of the herbicide with a surfactant. This suggests that polymers may increase the availability of dicamba to the plant.

It has been discovered, in some embodiments of the present invention, that polybasic polymers are effective auxin herbicide drift control agents because these polymers, when utilized in aqueous auxin formulations, can reduce the number of spray drops having a diameter of less than about 200 microns, 150 microns, or even 100 microns. It is believed, without being bound to any particular theory, that in addition to reducing auxin volatility, polybasic polymers also function as thickeners or rheological property modifying agents that increase solution viscosity resulting in a greater number of large spray droplet particles in the size distribution and restricting the generation of small droplet particles. For a given velocity, wind will move large droplet particles a shorter distance as compared to smaller droplet particles. Notably, an increase in average spray drop size from about 10 microns to about 150 microns can decrease the lateral distance a droplet particle travels in a light wind after normal spraying by about 300 to 500 meters. Spray droplet particle size can be measured by methods known to those skilled in the art such as phase doppler droplet particle analysis (PDPA).

In order to achieve the benefits of reduced auxin volatility and/or enhanced auxin drift control, polybasic polymers, having from 4 to about 100,000 nitrogen atoms per molecule, from about 15 to about 100,000 nitrogen atoms per molecule, from about 25 to about 100,000 nitrogen atoms per molecule, from about 50 to about 100,000 nitrogen atoms per molecule, or even from about 100 to about 100,000 nitrogen atoms per molecule, or mixtures of polybasic polymers having an average number of nitrogen atoms within the above ranges, are preferred. For polybasic polymers or a combination of polymers, an average nitrogen content of from 10% to about 50% by weight, from 13% to about 50%, from 15% to about 50%, from about 20% to about 50%, from about 30% to about 45% by weight, or even about 30% to about 40% by weight is preferred. Examples of typical polymer molecular weights, or average molecular weight for polymer mixtures, (in Daltons) for the practice of the present invention include 600, 800, 1,300, 1,500, 2,000, 2,500, 5,000, 10,000, 20,000, 50,000, 75,000, 100,000, 250,000, 500,000, 750,000, 1,000,000, 1,250,000, 1,500,000, 1,750,000, 2,000,000, 2,250,000, 1,500,000, 1,750,000, 2,000,000, 2,250,000, 2,500,000, 2,750,000 or even 3,000,000, and ranges thereof. Polybasic polymers suitable for the practice of the present invention are preferably hydrophilic and have an aqueous solubility of at least 5% v/v, more preferably at least 10% v/v.

Formulations comprising an auxin herbicide salt are generally compatible with polybasic polymers in tank mixes as well as in concentrate formulations. Advantageously therefore, the polybasic polymers of the present invention do not require separate addition into a spray tank. Alternatively however, the polybasic polymers of the present invention can be combined with auxin herbicide formulations before use on plants such as by addition to auxin herbicide concentrate compositions or auxin herbicide tank mixes, or by introducing an auxin herbicide composition and a polybasic polymer or polymer combination as separate feed streams to a spraying or application system so that the feed streams are co-mixed immediately prior to use. A weight ratio of dicamba acid equivalent (a.e.) to polybasic polymer or combination of polymers of from 1:100 to about 100:1, from about 1:50 to about 50:1, from about 1:1 to about 100:1, from about 1:1 to about 50:1, from about 1:1 to about 25:1, from about 1:1 to about 10:1, from about 3:1 to about 10:1 or from about 5:1 to about 10:1 is preferred. In some embodiments of the present invention, formulations contain from about 1% to about 10% v/v total polybasic polyamine and from about 360 to about 750, from about 400 to about 750, from about 450 to about 750, from about 460 to about 750, from about 470 to about 750, from about 480 to about 750, from about 490 to about 750, or from about 500 to about 750 grams a.e. per liter (g a.e./L) dicamba.

Combinations of the above-described polymer nitrogen content, molecular weights, solubilities, concentrations and ratios are within the scope of the present invention.

Auxin herbicide salts are generally preferred as compared to the acid form for combination with polybasic polymers. Suitable cations for auxin herbicide salts include, for example and without restriction, DMA, MEA, DEA, triethanolamine (TEA), potassium, sodium, IPA and DGA. In some embodiments of the present invention, the auxin herbicide component of the formulation consists essentially of auxin herbicide salts. In dicamba embodiments, MEA, DEA and potassium dicamba are preferred because they are believed to be compatible with polybasic polymers such as polymeric polyamines, such that high concentrations in aqueous solution can be achieved while volatility is low as compared to other dicamba salt formulations that do not contain the polymer and without requiring the pH of the formulation to be 9 or greater.

In other embodiments, in the case of dicamba, low volatility can be achieved by formulating dicamba as the monoethanolamine or diethanolamine salt. It has been discovered that the MEA and diethanolamine (DEA) salts of dicamba are less volatile than other dicamba salts, such as the DMA and IPA salts, known in the art. In particular, the concentration of volatilized dicamba in the vapor phase surrounding the aqueous dicamba MEA or DEA concentrate formulation is less than the concentration of volatilized dicamba in the vapor phase surrounding a reference formulation formulated from dicamba salts known in the art such as dimethylamine dicamba, isopropylamine dicamba, or mixtures thereof, but otherwise having the same composition as the dicamba MEA concentrate formulation. Distillation studies of solutions of the MEA, sodium, potassium, DGA and IPA dicamba salts show that dicamba salts having relatively volatile cations, such as or IPA, have comparably greater dicamba volatilization than do dicamba salts having less volatile cations, such as sodium, potassium, MEA or DEA. The concentration of volatilized dicamba herbicide in the vapor phase surrounding an MEA dicamba formulation has been discovered to be from 0.05, 0.1, 0.2, 0.3, 0.4, 0.5, 0.6, 0.7, 0.8, 0.9, or ranges thereof, that of the concentration of volatilized dicamba herbicide in the vapor phase surrounding similarly formulated IPA dicamba. Experimental measurements of dicamba concentration in the gas phase above dicamba salt aqueous solutions show that the gas phase dicamba concentration associated with an MEA dicamba aqueous solution is typically less than the gas phase concentration associated with a comparative solution of dicamba acid or the IPA or DMA dicamba salts, wherein the comparative solution otherwise has the same formulation as the MEA dicamba salt solution. In particular, it has been discovered that the gas phase dicamba concentration associated with MEA dicamba is about 2, 5, 10, 15 or 20 times less than the gas phase dicamba concentration associated with DMA dicamba and about 7 to 8 times less than the gas phase dicamba concentration associated with IPA dicamba in otherwise similarly formulated formulations.

It is further believed that the amount of dicamba volatilizing from an aqueous solution of the sodium, potassium, MEA or DEA salt can also be a function of pH, with volatilization varying inversely with pH. In general, dicamba volatility decreases with increasing pH. Without being bound to any particular theory and based on experimental evidence to date, the pH dependent trend may be explained by the Henderson-Hasselbalch equation, ($pH=pKa+\log[HA/A-]$) where HA represents the concentration of acidic species with an associated hydrogen and A⁻ represents the concentration of the deprotonated basic species. As the pH is increased, there is more ionization of dicamba acid (more dissociation) resulting in a lower vapor pressure. This helps to explain the disparity observed in the volatility between dicamba acid and the dicamba salts, and also the difference in volatility between salts at low pH versus salts at high pH. The increased ionization with the salts and the increased dissociation at the higher pHs may lead to a lower vapor pressure and therefore lower volatility. A pH of from about 4 to about 11, from about 5 to about 10, or from about 7 to about 9 is preferred for any of the various dicamba salts. It is believed that the polybasic polymers of the present invention function as pH buffers thereby maintaining a nearly constant pH value in the dicamba compositions of the present invention, even upon the addition of a small amount of acid. The buffering effect therefore assists in maintaining low vapor pressure and low volatility by resisting pH changes into the acidic range.

In accordance with the present invention, and based on experimental evidence, it has been further discovered that the monoethanolamine (MEA) salt of dicamba provides higher aqueous solubility and lower viscosity as compared to dicamba acid and other dicamba salts known in the art, such as the dimethylamine (DMA) and isopropylamine (IPA) salts. As indicated in Table A below, MEA salt aqueous solubility at 20° C. is about 66.1 weight percent a.e. (wt % a.e.), or about 885 grams acid equivalent per liter (g a.e./L) as compared to 54.6 wt % a.e. (720 g a.e./L) and 56.5 wt % a.e. (700 g a.e./L) for potassium dicamba and diglycolamine (DGA) dicamba, respectively. The DMA salt of dicamba is believed to have a solubility at 20° C. of about 45 wt % a.e. (600 g a.e./L).

TABLE A

| Dicamba | wt % a.e. @20° C. | Approximate g a.e./L @20° C. |
|---|---|---|
| acid | 0.4 | 4.5 |
| sodium salt | 36.3 | 364 |
| potassium salt | 54.6 | 720 |
| DGA salt | 56.5 | 700 |
| MEA salt | 66.1 | 885 |

In some embodiments of the present invention, MEA, potassium and DEA dicamba tank mix formulations are provided. The tank mix formulations preferably comprise from about 0.1 to about 50 g a.e./L, such as 0.1, 0.5, 1, 5, 10, 25 or 50 g a.e./L, and ranges thereof.

In some other embodiments of the present invention, MEA dicamba concentrate formulations are provided. The concentrate formulations preferably comprise at least 50 g a.e./L, such as from about 50 to about 885, from about 100 to about 885, from about 200 to about 885, from about 300 to about 885, from about 400 to about 885, from about 500 to about 885, from about 550 to about 885, or from about 600 to about 885 g a.e./L MEA dicamba. For example, 50, 100, 150, 200, 250, 300, 350, 400, 450, 500, 550, 600, 650, 700, 750, 800, 850 or 885 g a.e./L, and ranges thereof.

In some other embodiments, of the present invention, potassium dicamba concentrate formulations are provided. The concentrate formulations preferably comprise at least 550 g a.e./L, such as from about 550 to about 720, or from about 600 to about 720 g a.e./L potassium dicamba. For example, 550, 600, 650, 700 or 720 g a.e./L, and ranges thereof.

In some other embodiments, of the present invention, DEA dicamba concentrate formulations are provided. The concentrate formulations preferably comprise at least 50 g a.e./L, from about 50 to about 720, from about 100 to about 720, from about 200 to about 720, from about 300 to about 720, from about 400 to about 720, from about 500 to about 720, from about 550 to about 720, or from about 600 to about 720 g a.e./L DEA dicamba. For example, 50, 100, 150, 200, 250, 300, 350, 400, 450, 500, 550, 600, 650, 700, or 720 g a.e./L, and ranges thereof.

In still other embodiments of the present invention, mixed dicamba salt compositions comprising at least one of the MEA, DEA or potassium salt are provided. In addition to the MEA, DEA and potassium dicamba salts, suitable salts include the sodium, ammonium, lithium, diammonium, triethanolamine, triisopropanolamine, DMA, diethylamine, triethylamine, methylamine, ethylamine, DGA, propylamine (such as IPA or n-propyl), butylamine, pentylamine, hexylamine, heptylamine, octylamine, dodecylamine and decylamine dicamba salts. More preferably, the mixed salts include two or more dicamba salts selected from the MEA, DEA, sodium, potassium, IPA, DGA and DMA salts, wherein at least one salt is the MEA, DEA or potassium salt of dicamba. A weight ratio of the MEA, DEA and/or potassium dicamba salt to the sum of the other salts of no greater than about 20:1, such as 20:1, 10:1, 5:1, 3:1, 1:1, 1:3, 1:5, 1:10 and ranges thereof, is preferred, more preferably from 20:1 to about 1:10, from about 20:1 to about 1:5, from about 20:1 to 1:1, or from about 20:1 to about 5:1. The total dicamba concentration for the mixed salt compositions on an acid equivalent basis is at least about 52.5, 100, 150, 200, 250, 300, 350, 400, 450, 480, 500, 520, 540, 560, 575, 580, 600, 620, 640, 660, 680 or 700 grams per liter, and ranges thereof. For any given dicamba salt and concentration thereof, one skilled in the art can readily determine using routine experimentation a minimum ratio of the dicamba salts (i.e. a lower limit from the upper limit of 20:1) that is necessary to achieve the objects of the invention in view of the other components of the formulation, such as a co-herbicide component, polybasic polymer component and/or surfactant component and their respective concentrations.

It has yet been further discovered that MEA dicamba concentrate formulations are only moderately irritating to eyes at a pH of about 8. Eye irritation measurement can be done according to the methods provided in U.S. Environmental Protection Agency Office of Prevention, Pesticides and Toxic Substances, Health Effects Test Guidelines (for example, OPPTS 870.2400 Acute Eye Irritation, August 1998). MEA dicamba formulations are generally classified in the eye irritation (rabbit) FIFRA (Federal Insecticide, Fungicide and Rodenticide Act) category III (moderate irritation).

In some embodiments of the present invention, the polybasic polymer is a polymeric polyamine, polymeric polyimine, nitrogen-substituted vinyl polymer, polyoxazoline, polymeric polypeptide, polymeric polyimide, polypropyleneimine dendrimer, polyethyleneimine dendrimer or a polyamidoamine dendrimer. Combinations thereof are also within the scope of the present invention.

In some embodiments of the present invention, the polybasic polymer is a polymeric polyamine. Polymeric polyamines include, for instance, polyethyleneimines, polyalkoxylated polyamines, and combinations thereof. Particular polymeric polyamines include benzylated polyamines, ethoxylated polyamines, propoxylated polyamines, alkylated polyamines, esterified polyamines and combinations thereof.

In some embodiments of the present invention, the polymeric polyamines have structure (1):

wherein each $R_1$ is independently hydrogen, a hydrocarbyl or substituted hydrocarbyl group having from 1 to 20 carbon atoms, an aryl group, or a cyclic group; each $R_2$ is independently an alkylene having from 1 to 4 carbon atoms or an aryl, each $R_3$ is independently hydrogen or a hydrocarbyl having from 1 to 4 carbon atoms and x is a degree of polymerization of from about 1 to about 70,000. $R_1$ is preferably independently hydrogen or an alkyl having from 1 to 12 carbon atoms, $R_2$ is preferably independently ethylene or $C_6$ arylene, $R_3$ is preferably independently hydrogen or an alkyl having from 1 to 4 carbon atoms and x is preferably selected to give a linear polyimine having a molecular weight of from 600 to 3,000,000 Daltons. Examples of polymeric polyamines include polyaniline wherein $R_2$ is $C_6$ arylene and $R_3$ is hydrogen and poly (ethylene imine) wherein $R_2$ is ethylene and $R_3$ is hydrogen In some embodiments of the present invention, the polymeric polyamine is a polymeric polyimine compound (hereafter referred to as "polyimines") selected from linear polyimines and branched polyimines having a molecular weight of from about 800 to about 3,000,000 Daltons.

Linear polyimines typically have structure (2):

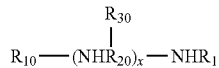
(2)

wherein each $R_{10}$ is independently hydrogen, a hydrocarbyl or substituted hydrocarbyl group having from 1 to 20 carbon atoms or an aryl group; each $R_{20}$ is independently an alkylene having from 1 to 4 carbon atoms; each $R_{30}$ is independently hydrogen or a hydrocarbyl having from 1 to 4 carbon atoms wherein $R_{30}$ substitution occurs at any of the $R_{20}$ carbon atoms; and x is a degree of polymerization of from about 1 to about 70,000. $R_{10}$ is preferably independently hydrogen or an alkyl having from 1 to 12 carbon atoms, $R_{20}$ is preferably ethylene, $R_{30}$ is preferably independently hydrogen or an alkyl having from 1 to 4 carbon atoms and x is preferably selected to give a linear polyimine having a molecular weight of from 800 to 3,000,000 Daltons.

Branched polyimines typically have structure (3):

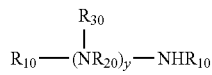
(3)

wherein each $R_{10}$ is independently hydrogen, a hydrocarbyl or substituted hydrocarbyl group having from 1 to 20 carbon atoms or an aryl group; each $R_{20}$ is independently an alkylene having from 1 to 4 carbon atoms; and y is a degree of polymerization of from about 1 to about 70,000. Each $R_{30}$ is independently hydrogen or an amine of formula (4):

(4)

wherein at least one $R_{30}$ is of formula (4) and wherein $R_{40}$ is an alkylene having from 1 to 4 carbon atoms, and $R_{41}$ and $R_{42}$ are independently selected from hydrogen, a hydrocarbyl or substituted hydrocarbyl having from 1 to 20 carbon atoms, and an amine of formula (5):

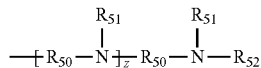
(5)

wherein $R_{50}$ is an alkylene having from 1 to 4 carbon atoms, $R_{51}$ and $R_{52}$ are independently selected from hydrogen and a hydrocarbyl or substituted hydrocarbyl having from 1 to 20 carbon atoms, and each z is independently from 0 to 5. $R_{50}$ is preferably ethylene, $R_{51}$ and $R_{52}$ are preferably independently hydrogen or a hydrocarbyl having from 1 to 12 carbon atoms. The sum of y and z are preferably selected to give a branched polyimine having a molecular weight of from 800 to 3,000,000 Daltons.

Also included within the scope of polymeric polyimines are polynitriles of structure (6):

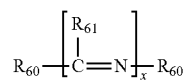
(6)

wherein each $R_{60}$ is independently hydrogen, a hydrocarbyl or substituted hydrocarbyl group having from 1 to 20 carbon atoms or an aryl group; each $R_{61}$ is independently hydrogen or a hydrocarbyl having from 1 to 6 carbon atoms; and x is a degree of polymerization of from about 1 to about 70,000 selected to yield a molecular weight of from 600 to 3,000,000 Daltons.

Representative polyimines and polymeric polyimines include, but are not limited to, compounds of structures (7) and (8):

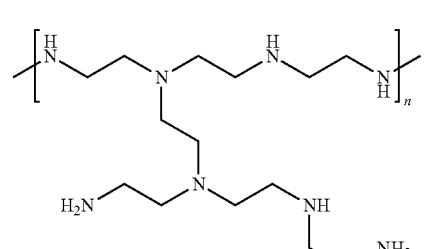
(7)

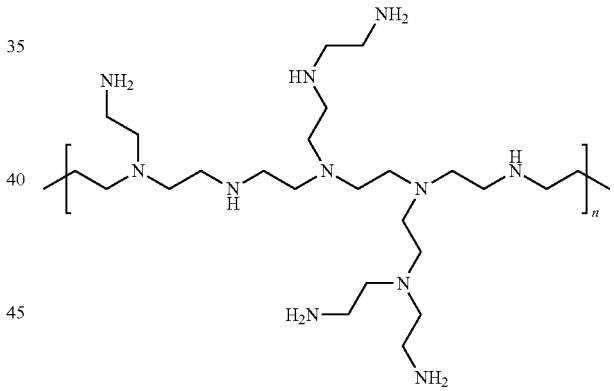
(8)

wherein x is the degree of polymerization. Formula (8) is generally representative of Lupasol® polyimine polymers available from BASF.

Representative commercially available polyimines are shown in Table B below where Epomin® is commercially available from Aceto Corp.; "MW" refers to the average molecular weight in Daltons; "Visc." refers to viscosity in mPa at 20° C.; "Pour Pt." refers to the pour point in ° C.; "Density" refers to the density in grams per mL measured at 20° C.; and "Ratio" refers to the ratio of primary:secondary: tertiary amine nitrogens:

TABLE B

| Polyimine | MW | Visc. | Pour Pt. | Density | Ratio |
|---|---|---|---|---|---|
| LUPASOL FG | 800 | 800 | −3 | 1.09 | 1:0.82:0.53 |
| LUPASOL 20 wfr | 1,300 | 5,000 | −16 | 1.03 | 1:0.91:0.64 |

TABLE B-continued

| Polyimine | MW | Visc. | Pour Pt. | Density | Ratio |
|---|---|---|---|---|---|
| LUPASOL PR 8515 | 2,000 | 75,000 | −9 | 1.05 | 1:0.92:0.70 |
| LUPASOL WF | 25,000 | 200,000 | −3 | 1.1 | 1:1.2:0.76 |
| LUPASOL FC | 800 | 250 | −24 | 1.08 | 1:0.86:0.42 |
| LUPASOL G20 | 1,300 | 350 | −24 | 1.08 | 1:0.9:0.64 |
| LUPASOL G35 | 2,000 | 450 | −18 | 1.08 | 1:0.94:0.67 |
| LUPASOL G100 | 5,000 | 1,200 | −18 | 1.08 | 1:1.05:0.76 |
| LUPASOL G500 | 25,000 | 1,000 | No Data | No Data | No Data |
| LUPASOL HF | 25,000 | 14,000 | −20 | 1.08 | 1:1.2:0.76 |
| LUPASOL P | 750,000 | 500,000 | −3 | 1.09 | 1:1.07:0.77 |
| LUPASOL PS | 750,000 | 1,400 | −5 | No Data | 1:1.07:0.77 |
| LUPASOL SK | 2,000,000 | 750 | 0 | 1.06 | No Data |
| LUPASOL SNA | 1,000,000 | 500 | 0 | 1.06 | No Data |
| LUPASOL HEO1 | 13,000 | 200 | No Data | No Data | No Data |
| LUPASOL PN50 | 1,000,000 | 6,000 | No Data | No Data | No Data |
| LUPASOL PO100 | 5,000 | 300 | No Data | No Data | No Data |
| EPOMIN 006 | 600 | No Data | No Data | No Data | No Data |
| EPOMIN 012 | 1,200 | No Data | No Data | No Data | No Data |
| EPOMIN 018 | 1,800 | No Data | No Data | No Data | No Data |
| EPOMIN 1000 | 100,000 | No Data | No Data | No Data | No Data |
| Aldrich 408727 | 25,000 | No Data | No Data | 1.03 | No Data |

In some embodiments, polyalkylenimines can be functionalized by reaction with one or more alkylene oxides to form the hydroxyalkylated derivative. As described in U.S. Pat. No. 7,431,845 (to Manek et al.), a hydroxyalkylated derivative may be prepared by heating an aqueous solution of polyalkylenimine with the desired amount of alkylene oxide at a temperature of about 80° C. to about 135° C., optionally in the presence of an alkali metal catalyst such as sodium methoxide, potassium tert-butoxide, potassium or sodium hydroxide. In some embodiments, the polyalkylenimine is functionalized by reaction with ethylene oxide and/or optionally propylene oxide. In other embodiments, the polyalkylenimine is functionalized by reaction with about 1 to about 100 molar equivalents of ethylene oxide per ethylene unit in the polyalkylenimine. In still other embodiments, the polyalkylenimine is functionalized by reaction with about 1 to about 100 molar equivalents of ethylene oxide and about 1 to about 100 molar equivalents of propylene oxide per ethylene unit in the polyalkylenimine. In yet other embodiments, the polyalkylenimine is reacted first with the propylene oxide and subsequently with the ethylene oxide. For example, in some embodiments, the polyalkylenimine is functionalized by reaction with about 5 to about 25 molar equivalents of ethylene oxide and about 85 to about 98 molar equivalents of propylene oxide per ethylene unit in the polyalkylenimine.

Examples of commercial oxyalkylated polyalkylenimines include Lupasol SC-61B and Lupasol SK (available from BASF), and Kemelex 3550X, 3423X, 3546X, D600 and 3582X (available from Uniquema, New Castle, Del., USA).

Lupasol SC-61 B is believed to be a hydroxylated (ethoxylated) polyethylenimine of formula (9):

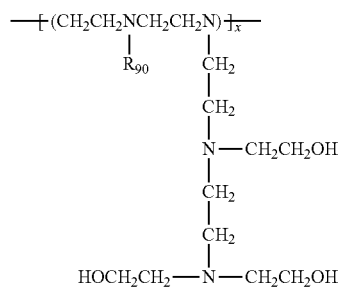

(9)

wherein $R_{90}$ is hydrogen or a continuation of the polymer chain and x is a value required to yield a molecular weight of about 110,000 Daltons.

In some embodiments of the present invention the polybasic polymers are dendritic polymers (for example, starburst polymers), characterized as repeatedly branched molecules having attached functional groups distributed on the periphery of the branches thereby providing a highly functionalized surface. Preferred dendritic polymers are polypropyleneimine dendrimers, polyethyleneimine dendrimers, and polyamidoamine dendrimers. A molecular weight of from about 1000 to about 1,000,000 is preferred, representing from 1 to about 10 generation growth steps.

In some embodiments of the present invention, the polybasic polymer is a nitrogen-substituted vinyl polymer.

Vinyl polymers include polyvinyl acrylamides of formula (10):

(10)

wherein each $R_{100}$ is independently hydrogen, a hydrocarbyl or substituted hydrocarbyl group having from 1 to 20 carbon atoms or an aryl group; $R_{101}$ is a nitrogen-containing moiety; and x is a degree of polymerization of from about 1 to about 70,000. In some embodiments, $R_{101}$ is acrylamide (—C(O)NH$_2$), allylamine (—CH$_2$NH$_2$), pyridine, pyrazine, pyrazole or pyrazoline. The polyacrylam ides can comprise cationic monomers such as, for example, dimethyl aminoethyl acrylate methyl chloride, dimethyl aminoethyl methacrylate methyl chloride, acrylamidopropyl trimethyl ammonium chloride, methacryl amodopropyl trimethyl ammonium chloride, and diallyl dimethyl ammonium chloride. Examples of vinyl polymers include poly(vinyl pyridine), depicted in formula (12) comprising the monomer poly(2-vinyl pyridine):

(12)

and polyvinyl acrylamide comprising the monomer depicted in formula (13):

(13)

In some other embodiments of the present invention, the polybasic polymer is a polyamide.

Polyamide polymers include polymeric acrylamides comprising the repeating unit of general formula (14):

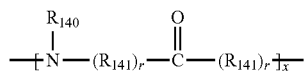
(14)

wherein each $R_{140}$ is independently hydrogen or a hydrocarbyl having from 1 to 6 carbon atoms, each $R_{141}$ is independently alkylene having from 1 to 8 carbon atoms or arylene, each r is independently 0 or 1, and x is a degree of polymerization of from about 1 to about 70,000.

Examples of polyamide polymers include polyisocyanates comprising the repeating unit of formula (15):

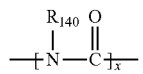
(15)

and polylactams comprising the repeating unit of formula (16):

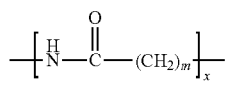
(16)

wherein m is from 1 to 6.

In some other embodiments of the present invention, the polybasic polymer material is a polyoxazoline comprising the repeating unit of formula (17):

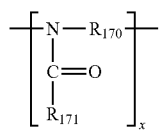
(17)

wherein $R_{170}$ is a substituted or unsubstituted alkylene group containing 1 to about 4 carbon atoms; $R_{171}$ is a hydrocarbyl or substituted hydrocarbyl that does not significantly decrease the water-solubility of the polymer; and n is an integer which provides the polymer with a molecular weight of from 600 to 3,000,000 Daltons. $R_{170}$ may be substituted with hydroxy, amide or polyether. $R_{170}$ is preferably methylene, ethylene, propylene, isopropylene or butylene. $R_{170}$ is most preferably ethylene. $R_{171}$ is preferably alkyl or aryl; $R_{171}$ may be substituted with hydroxy, amide or polyether. Preferably $R_{171}$ is methyl, ethyl, propyl, isopropyl, butyl, or isobutyl. Most preferably $R_{170}$ is ethylene and $R_{171}$ is ethyl.

In some other embodiments of the present invention, the polybasic polymer is a polymeric polypeptide (poly α-amino acid) comprising the repeating unit of formula (18):

(18)
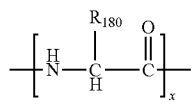

wherein each $R_{180}$ is independently selected from a side chain specific to amino acids, indicated in parentheses below. For instance, $R_{180}$ may be hydrogen (glycine), —$CH_3$ (alanine), —$CH(CH_3)_2$ (valine), —$CH_2CH(CH_3)_2$ (leucine), —$CH(CH_3)(CH_2CH_3)$ (isoleucine), —$(CH_2)_4NH_2$ (lysine), —$CH_2OH$ (serine), —$CH(OH)(CH_3)$ (threonine), etc., and x is selected to provide a molecular weight between 600 and 3,000,000 Daltons. In some embodiments, polar $R_{180}$ groups are preferred to provide greater water solubility. Polar amino acids include arginine, aspargine, aspartic acid, cysteine (slightly polar), glutamic acid, glutamine, histidine, lysine, serine, threonine, tryptophan (slightly polar) and tyrosine.

Any of the polymers described above for formulae (7) through (18) can be terminated with a head group independently selected from hydrogen, a hydrocarbyl or substituted hydrocarbyl group having from 1 to 20 carbon atoms or an aryl group.

In some embodiments of the present invention, surfactants can optionally be used in auxin herbicide formulations to effectively enhance herbicidal effectiveness. In some other embodiments, solubilizers can be optionally be used to enhance polybasic polymer aqueous solubility. In some embodiments, a compound can function as both an efficacy enhancer and a solubilizer. Typically, at low concentrations relative to the auxin herbicide component (i.e., a high weight ratio of auxin a.e. to surfactant, for example in excess of about 20:1), such compounds may enhance polybasic polymer solubility but not effectively provide herbicidal efficacy enhancement. Conversely, at higher concentrations relative to the auxin herbicide component, such compound may both enhance herbicidal efficacy and polyamine polymer solubility.

Surfactants are optionally included in auxin (dicamba) formulations to facilitate dicamba retention, uptake and translocation into the plant foliage and thereby enhance herbicidal effectiveness. It has been discovered that the polymeric polyamines of the present invention are at least as effective as surfactants for foliar retention, uptake and translocation of dicamba. Efficacious dicamba formulations containing polymeric polyamines or other polybasic polymers, with or without a surfactant, are therefore within the scope of the present invention.

In some embodiments of the present invention, one or more herbicidal efficacy enhancing surfactants known in the art can optionally be formulated with dicamba. It has been discovered that MEA dicamba formulations are compatible with most water soluble surfactants. A weight ratio of dicamba a.e. to surfactant of from 1:1 to 20:1. from 2:1 to 10:1 or from 3:1 to 8:1 is preferred.

Alkoxylated tertiary etheramine surfactants for use in the herbicidal formulations of the present invention have the general structure (19):

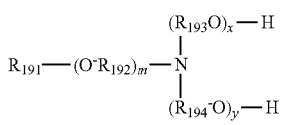
(19)

wherein $R_{191}$ is a hydrocarbyl or substituted hydrocarbyl having from about 4 to about 22 carbon atoms; each $R_{192}$ is a hydrocarbylene independently having 2, 3, or 4 carbon atoms; m is an average number from about 1 to about 10; $R_{193}$ and $R_{194}$ are each independently hydrocarbylene having 2, 3, or 4 carbon atoms; and the sum of x and y is an average value ranging from about 2 to about 60.

$R_{191}$ is preferably an alkyl having from about 4 to about 22 carbon atoms, more preferably from about 8 to about 18 carbon atoms, from about 10 to about 16 carbon atoms, or from about 12 to about 18 carbons atoms, or from about 10 to about 14 carbon atoms. Sources of the $R_{191}$ group include, for example, coco or tallow, or $R_{191}$ may be derived from synthetic hydrocarbyls, such as decyl, dodecyl, tridecyl, tetradecyl, hexadecyl, or octadecyl groups. Each $R_{192}$ may independently be propylene, isopropylene, or ethylene, and m is preferably from about 1 to 5, such as 2 to 3. $R_{193}$ and $R_{194}$ may be ethylene, propylene, isopropylene, and are preferably ethylene. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated tertiary etheramine surfactants for use in the herbicidal formulation of the present invention include, for example, any of the TOMAH E-Series surfactants, such as TOMAH E-14-2 (bis-(2-hydroxyethyl) isodecyloxypropylamine), TOMAH E-14-5 (poly (5) oxyethylene isodecyloxypropylamine), TOMAH E-17-2, TOMAH E-17-5 (poly (5) oxyethylene isotridecyloxypropyl amine), TOMAH E-19-2, TOMAH E-18-2, TOMAH E-18-5 (poly (5) oxyethylene octadecylamine), TOMAH E-18-15, TOMAH E-19-2 (bis-(2-hydroxyethyl) linear alkyloxypropylamine), TOMAH E-S-2, TOMAH E-S-15, TOMAH E-T-2 (bis-(2-hydroxyethyl) tallow amine), TOMAH E-T-5 (poly (5) oxyethylene tallow amine), and TOMAH E-T-15 (poly (15) oxyethylene tallow amine). Another example is Surfonic AGM 550 available from Huntsman Petrochemical Corporation wherein, for formula (9), $R_{191}$ is $C_{12-14}$, $R_{192}$ is isopropyl, m is 2, $R_{193}$ and $R_{194}$ are each ethylene, and x+y is 5.

Alkoxylated quaternary etheramine surfactants for use in the herbicidal formulations of the present invention have the general structure (20):

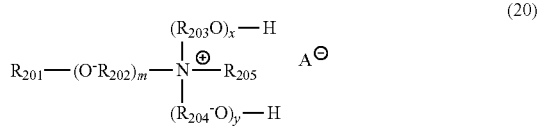

wherein $R_{201}$ is a hydrocarbyl or substituted hydrocarbyl having from about 4 to about 22 carbon atoms; Each $R_{202}$ is independently a hydrocarbylene having 2, 3, or 4 carbon atoms; m is an average number from about 1 to about 10; $R_{203}$ and $R_{204}$ are each independently hydrocarbylene having 2, 3, or 4 carbon atoms; and the sum of x and y is an average value ranging from about 2 to about 60. $R_{205}$ is preferably a hydrocarbyl or substituted hydrocarbyl having from 1 to about 4 carbon atoms, more preferably methyl. A is a charge balancing counter-anion, such as sulfate, chloride, bromide, nitrate, among others.

$R_{201}$ is preferably an alkyl having from about 4 to about 22 carbon atoms, more preferably from about 8 to about 18 carbon atoms, from about 10 to about 16 carbon atoms, or from about 12 to about 18 carbons atoms, or from about 12 to about 14 carbon atoms. Sources of the $R_{201}$ group include, for example, coco or tallow, or $R_{201}$ may be derived from synthetic hydrocarbyls, such as decyl, dodecyl, tridecyl, tetradecyl, hexadecyl, or octadecyl groups. Each $R_{202}$ may independently be propylene, isopropylene, or ethylene, and m is preferably from about 1 to 5, such as 2 to 3. $R_{203}$ and $R_{204}$ may be ethylene, propylene, isopropylene, and are preferably ethylene. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated quaternary etheramine surfactants for use in the herbicidal formulation of the present invention include, for example, TOMAH Q-14-2, TOMAH Q-17-2, TOMAH Q-17-5, TOMAH Q-18-2, TOMAH Q-S, TOMAH Q-S-80, TOMAH Q-D-T, TOMAH Q-DT-HG, TOMAH Q-C-15, and TOMAH Q-ST-50.

Alkoxylated etheramine oxide surfactants for use in the herbicidal formulations of the present invention have the general structure (21):

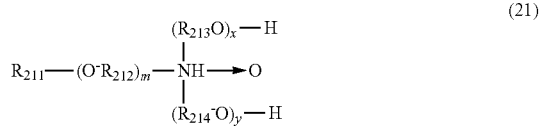

wherein $R_{211}$ is a hydrocarbyl or substituted hydrocarbyl having from about 4 to about 22 carbon atoms; Each $R_{212}$ is independently a hydrocarbylene having 2, 3, or 4 carbon atoms; m is an average number from about 1 to about 10; $R_{213}$ and $R_{214}$ are each independently hydrocarbylene having 2, 3, or 4 carbon atoms; and the sum of x and y is an average value ranging from about 2 to about 60.

$R_{211}$ is preferably an alkyl having from about 4 to about 22 carbon atoms, more preferably from about 8 to about 18 carbon atoms, from about 10 to about 16 carbon atoms, or from about 12 to about 18 carbons atoms, or from about 12 to about 14 carbon atoms. Sources of the $R_{211}$ group include, for example, coco or tallow, or $R_{211}$ may be derived from synthetic hydrocarbyls, such as decyl, dodecyl, tridecyl, tetradecyl, hexadecyl, or octadecyl groups. $R_{212}$ may be propylene, isopropylene, or ethylene, and m is preferably from about 1 to 5, such as 2 to 3. Each $R_{213}$ and $R_{214}$ is independently ethylene, propylene, isopropylene, and are preferably ethylene. The sum of x and y is preferably an average value ranging from about 2 to about 22, such as from about 2 to 10, or about 2 to 5. In some embodiments, the sum of x and y is preferably between about 10 and about 20, for example, about 15.

Specific alkoxylated etheramine oxide surfactants for use in the herbicidal formulation of the present invention include, for example, any of the TOMAH AO-series of surfactants, such as TOMAH AO-14-2, TOMAH AO-728, TOMAH AO-17-7, TOMAH AO-405, and TOMAH AO-455.

Alkoxylated tertiary amine oxide surfactants for use in the herbicidal formulations of the present invention have the general structure (22):

wherein $R_{221}$ is a hydrocarbyl or substituted hydrocarbyl having from about 4 to about 22 carbon atoms, $R_{222}$ and $R_{223}$ are each independently hydrocarbylene having 2, 3, or 4 carbon atoms, and the sum of x and y is an average value ranging from about 2 to about 50.

$R_{221}$ is preferably an alkyl having from about 4 to about 22 carbon atoms, more preferably from about 8 to about 18 carbon atoms, and still more preferably from about 12 to about 18 carbons atoms, for example coco or tallow. $R_{221}$ is most preferably tallow. $R_{222}$ and $R_{223}$ are preferably ethylene. The sum of x and y is preferably an average value ranging from about 2 to about 22, more preferably between about 10 and about 20, for example, about 15.

Specific alkoxylated tertiary amine oxide surfactants for use in the herbicidal formulations of the present invention include, for example, any of the AROMOX series of surfactants, including AROMOX C/12, AROMOX C/12W, AROMOX DMC, AROMOX DM16, AROMOX DMHT, and AROMOX T/12 DEG.

Alkoxylated tertiary amine surfactants for use in the herbicidal formulations of the present invention have the general structure (23):

(23)

wherein $R_{231}$ is a hydrocarbyl or substituted hydrocarbyl having from about 4 to about 22 carbon atoms, $R_{232}$ and $R_{233}$ are each independently hydrocarbylene having 2, 3, or 4 carbon atoms, and the sum of x and y is an average value ranging from about 2 to about 50.

$R_{231}$ is preferably an alkyl having from about 4 to about 22 carbon atoms, more preferably from about 8 to about 18 carbon atoms, and still more preferably from about 12 to about 18 carbons atoms, for example coco or tallow. $R_1$ is most preferably tallow. $R_{232}$ and $R_{233}$ are preferably ethylene. The sum of x and y is preferably an average value ranging from about 2 to about 22, more preferably between about 10 and about 20, for example, about 15.

Specific alkoxylated tertiary amine surfactants for use in the herbicidal formulations of the present invention include, for example, Ethomeen T/12, Ethomeen T/20, Ethomeen T/25, Ethomeen T/30, Ethomeen T/60, Ethomeen C/12, Ethomeen C/15, and Ethomeen C/25, each of which are available from Akzo Nobel.

Alkoxylated quaternary amine surfactants for use in the herbicidal formulations of the present invention have the general structure (24):

(24)

wherein $R_{241}$, $R_{242}$, $R_{243}$, x and y are as described above for the alkoxylated tertiary amine surfactants of structure (II), i.e., $R_{241}$ is a hydrocarbyl or substituted hydrocarbyl having from about 4 to about 22 carbon atoms, $R_{242}$ and $R_{243}$ are each independently hydrocarbylene having 2, 3, or 4 carbon atoms, and the sum of x and y is an average value ranging from about 2 to about 50. $R_{244}$ is preferably a hydrocarbyl or substituted hydrocarbyl having from 1 to about 4 carbon atoms, more preferably methyl. X is a charge balancing counter-anion, such as sulfate, chloride, bromide, nitrate, among others.

$R_{241}$ is preferably an alkyl having from about 4 to about 22 carbon atoms, more preferably from about 8 to about 18 carbon atoms, and still more preferably from about 12 to about 18 carbons atoms, for example coco or tallow. $R_{241}$ is most preferably tallow. $R_{242}$ and $R_{243}$ are preferably ethylene. The sum of x and y is preferably an average value ranging from about 2 to about 22, more preferably between about 10 and about 20, for example, about 15. Specific alkoxylated quaternary amine surfactants for use in the herbicidal formulation of the present invention include, for example, Ethoquad T/12, Ethoquad T/20, Ethoquad T/25, Ethoquad C/12, Ethoquad C/15, and Ethoquad C/25, each of which are available from Akzo Nobel.

An example of an alkoxylated polyamine surfactant for use in the herbicidal formulations of the present invention is a surfactant having the general structure (25):

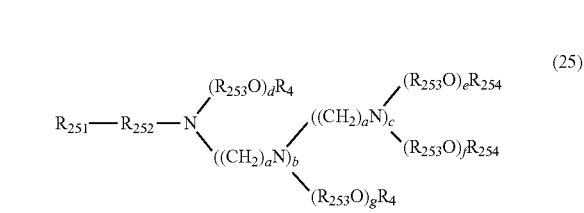
(25)

wherein $R_{251}$ is an alkyl or alkenyl radical containing 6 to 25 carbon atoms and from 0 to 3 carbon-carbon double bonds; $R_{252}$ is $-OCH_2CH_2CH_2-$, $-C(=O)OCH_2CH_2-$, $-C(=O)NHCH_2CH_2CH_2-$, or $-CH_2-$; each occurrence of $R_{254}$ is independently $-H$, $-OC(=O)R_1$, $-SO_3^-A^+$ or $-CH_2C(=O)O^-A^+$ wherein $A^+$ is an alkali metal cation, ammonium or $H^+$; each occurrence of a is from 3 to 8; each $R_{253}$ is independently ethyl, isopropyl or n-propyl; d, e, f and g are each independently from 1 to 20, b is from 0 to 10, c is 0 or 1, the sum of (c+d+e+f) is from (3+b) to 20, and the molecular weight is no more than about 800. The surfactants of formula (25) can optionally be in the form of a cation where one or more nitrogen atoms is additionally substituted with hydrogen, methyl, ethyl, hydroxyethyl or benzyl and one or more anions, equal in number to the number of said additionally substituted nitrogen atoms and being selected from chloride, methylsulfate and ethylsulfate. The surfactants of formula (25) can further optionally be in the form of amine oxides.

Examples of specific alkoxylated polyamine surfactants for use in the herbicidal formulation of the present invention are described in described in U.S. Pat. No. 6,028,046 (to Arif). Alkoxylated polyamine surfactants include, for example, ethoxylates of Adogen 560 (N-coco propylene diamine) containing an average of from 2EO to 20EO, for example, 4.8, 10 or 13.4EO; ethoxylates of Adogen 570 (N-tallow propylene diamine) containing an average of form 2EO to 20EO, for example, 13EO; and ethoxylates of Adogen 670 (N-tallow propylene triamine) containing an average of from 3EO to 20EO, for example, 14.9EO all of which are available from Witco Corp.

Other polyamine surfactants for use in the herbicidal formulations of the present invention have the general structure (26):

wherein $R_{261}$ is $C_{8-20}$, $R_{262}$ is $C_{1-4}$ and n is 2 or 3. Examples of polyamines for use in the formulations and methods of the present invention include Triamine C ($R_{261}$ is coco ($C_{10-14}$)), $R_{262}$ is $C_3$, n is 2 and amine number (total mg KOH/g) is 500-525), Triamine OV ($R_{261}$ is oleyl (vegetable oil), $R_{262}$ is $C_3$, n is 2 and amine number (total mg KOH/g) is 400-420), Triamine T ($R_{261}$ is tallow ($C_{16-18}$), $R_{262}$ is $C_3$, n is 2 and amine number (total mg KOH/g) is 415-440), Triamine YT ($R_{261}$ is tallow ($C_{16-18}$), $R_{262}$ is $C_3$, n is 2 and amine number (total mg KOH/g) is 390-415), Triameen Y12D ($R_{261}$ is dodecyl ($C_{12}$), $R_{262}$ is $C_3$, n is 2 and amine number (total mg HCl/g is 112-122), Triameen Y12D-30 ($R_{261}$ is dodecyl ($C_{12}$), $R_{262}$ is $C_3$, n is 2 and amine number (total mg HCl/g is 335-365), Tetrameen OV ($R_{261}$ is oleyl (vegetable oil), $R_{262}$ is $C_3$, n is 3 and amine number (total mg KOH/g) is 470-500), Tetrameen T ($R_{261}$ is tallow ($C_{16-18}$), $R_{262}$ is $C_3$, n is 3 and amine number (total mg KOH/g) is 470-495), wherein each is available from Akzo Nobel.

Sulfate surfactants for use in the herbicidal formulations of the present invention have the general structure (27a-c):

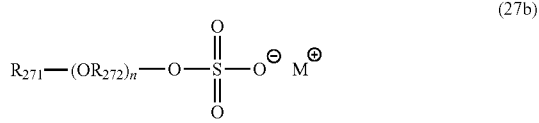

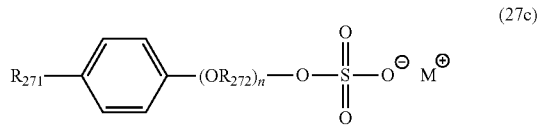

wherein compounds of formula (27a) are alkyl sulfates, compounds of formula (27b) are alkyl ether sulfates and compounds of formula (27c) are alkyl aryl ether sulfates. $R_{271}$ is a hydrocarbyl or substituted hydrocarbyl having from about 4 to about 22 carbon atoms, each $R_{272}$ is independently ethyl, isopropyl or n-propyl and n is from 1 to about 20. M is selected from an alkali metal cation, ammonium, an ammonium compound or $H^+$. Examples of alkyl sulfates include sodium $C_{8-10}$ sulfate, sodium $C_{10-16}$ sulfate, sodium lauryl sulfate, sodium $C_{14-16}$ sulfate, diethanolamine lauryl sulfate, triethanolamine lauryl sulfate and ammonium lauryl sulfate. Examples of alkyl ether sulfates include sodium $C_{12-15}$ pareth sulfate (1 EO), ammonium $C_{6-10}$ alcohol ether sulfate (3 EO), sodium $C_{6-10}$ alcohol ether sulfate (3 EO), isopropylammonium $C_{6-10}$ alcohol ether sulfate (3 EO), ammonium $C_{10-12}$ alcohol ether sulfate (3 EO), sodium lauryl ether sulfate (3 EO). Examples of alkyl aryl ether sulfates include sodium nonylphenol ethoxylate sulfate (4 EO), sodium nonylphenol ethoxylate sulfate (10 EO), Witcolate™ 1247H ($C_{6-10}$, 3EO, ammonium sulfate), WITCOLATE 7093 ($C_{6-10}$, 3EO, sodium sulfate), WITCOLATE 7259 ($C_{8-10}$ sodium sulfate), WITCOLATE 1276 ($C_{10-12}$, 5EO, ammonium sulfate), WITCOLATE LES-60A ($C_{12-14}$, 3EO, ammonium sulfate), WITCOLATE LES-60C ($C_{12-14}$, 3EO, sodium sulfate), WITCOLATE 1050 ($C_{12-15}$, 10EO, sodium sulfate), WITCOLATE WAQ ($C_{12-16}$ sodium sulfate), WITCOLATE D-51-51 (nonylphenol 4EO, sodium sulfate) and WITCOLATE D-51-53 (nonylphenol 10EO, sodium sulfate).

Sulfonate surfactants for use in the herbicidal formulations of the present invention correspond to sulfate structures (27a) through (27c) above except the R-substituted moiety is attached directly to the sulfur atom, for instance $R_{271}SO_3^-$. Examples of sulfonate surfactants include, for example, Witconate™ 93S (isopropylamine of dodecylbenzene sulfonate), WITCONATE NAS-8 (octyl sulfonic acid, sodium salt), WITCONATE AOS (tetradecyl/hexadecyl sulfonic acid, sodium salt), WITCONATE 60T (linear dodecylbenzene sulfonic acid, triethanolamine salt) and WITCONATE 605a (branched dodecylbenzene sulfonic acid, N-butylamine salt).

Phosphate esters of alkoxylated alcohol surfactants for use in the herbicidal formulations of the present invention have the general monoester structure (28a) and the general diester structure (28b):

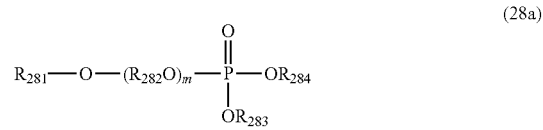

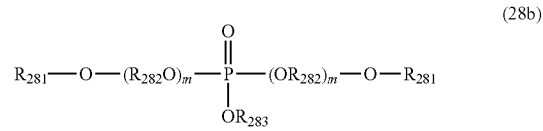

wherein $R_{281}$ is a hydrocarbyl or substituted hydrocarbyl having from about 4 to about 22 carbon atoms; $R_{282}$ is a hydrocarbylene having 2, 3, or 4 carbon atoms; m is an average number from about 1 to about 60; and $R_{283}$ and $R_{284}$ are each independently hydrogen or a linear or branched chain alkyl having from 1 to about 6 carbon atoms.

$R_{281}$ is preferably an alkyl having from about 4 to about 22 carbon atoms, more preferably from about 8 to about 20 carbon atoms, or an alkylphenyl having from about 4 to about 22 carbon atoms, more preferably from about 8 to about 20 carbon atoms. Sources of the $R_{281}$ group include, for example, coco or tallow, or $R_{281}$ may be derived from synthetic hydrocarbyls, such as decyl, dodecyl, tridecyl, tetradecyl, hexadecyl, or octadecyl groups. $R_{282}$ may be propylene, isopropylene, or ethylene, and is preferably ethylene. m is preferably from about 9 to about 15. $R_{283}$ and $R_{284}$ are preferably hydrogen.

Specific phosphate esters of alkoxylated alcohol surfactants for use in the herbicidal formulation of the present invention include, for example, EMPHOS CS-121, EMPHOS PS-400, and WITCONATE D-51-29, available from Witco Corp. Other examples are indicated in table C below for the Pholphalan produces (available from Akzo Nobel) wherein the surfactants may comprise a mixture of the monoester and diester forms and wherein $R_{284}$ is not present in the diester as indicated and "prop." refers to proprietary and "NR" refers to not reported. In some embodiments, the phosphate esters of the general monoester structure (28a) and the general diester structure (28b) are not alkoxylated, i.e., m is 0. Examples of commercial products include Phospholan PS-900 and Phospholan 3EA.

TABLE C

| Tradename | $R_{281}$ | $R_{282}$ | $R_{283}/R_{284}$ | m | mono and di forms |
|---|---|---|---|---|---|
| Phospholan CS-131 | nonyl phenol | $C_2$ | H | 6 | mono & di |
| Phospholan CS-1361 | nonyl phenol | $C_2$ | H | 6 | high mono & di |
| Phospholan CS-141 | nonyl phenol | $C_2$ | H | 10 | mono & di |
| Phospholan CS-147 | nonyl phenol | $C_2$ | H | 8 | mono & di |
| Phospholan KPE4 | prop. | prop. | prop. | prop. | mono |
| Phospholan PS-131 | tridecyl | $C_2$ | H | NR | NR |
| Phospholan PS-220 | decyl/tetradecyl | $C_2$ | H | 30 | mono & di |
| Phospholan PS-222 | dodecyl/pentadecyl | $C_2$ | H | 3 | mono & di |
| Phospholan PS-236 | decyl/dodecyl | $C_2$ | H | 7 | mono & di |
| Phospholan PS-900 | tridecyl alcohol | — | H | — | mono & di |
| Phospholan TS-230 | phenyl | $C_2$ | H | 7 | mono & di |
| Phospholan 3EA | triethanolamine amine | — | H | — | mono |

Alkyl polysaccharide surfactants for use in the herbicidal formulations of the present invention have the general structure (29):

$$R_{291}\text{—O—(sug)}_u \qquad (29)$$

wherein $R_{291}$ is a straight or branched chain substituted or unsubstituted hydrocarbyl selected from alkyl, alkenyl, alkylphenyl, alkenylphenyl having from about 4 to about 22 carbon atoms, wherein sug and u are as defined above. In various particular embodiments the polysaccharide surfactant may be an alkyl polyglucoside of formula (29) wherein: $R_{291}$ is a branched or straight chain alkyl group preferably having from 4 to 22 carbon atoms, more preferably from 8 to 18 carbon atoms, or a mixture of alkyl groups having an average value within the given range; sug is a glucose residue; and u is between 1 and about 5, and more preferably between 1 and about 3.

Examples of surfactants of formula (29) are known in the art. Representative surfactants are presented in Table D below wherein for each surfactant sug is a glucose residue.

TABLE D

| Trade name | $R_{291}$ | U |
|---|---|---|
| APG 225 | $C_{8-12}$ alkyl | 1.7 |
| APG 325 | $C_{9-11}$ alkyl | 1.5 |
| APG 425 | $C_{8-16}$ alkyl | 1.6 |
| APG 625 | $C_{12-16}$ alkyl | 1.6 |
| GLUCOPON 600 | $C_{12-16}$ alkyl | 1.4 |
| PLANTAREN 600 | $C_{12-14}$ alkyl | 1.3 |
| PLANTAREN 1200 | $C_{12-16}$ alkyl | 1.4 |
| PLANTAREN 1300 | $C_{12-16}$ alkyl | 1.6 |
| PLANTAREN 2000 | $C_{8-16}$ alkyl | 1.4 |
| Agrimul PG 2076 (synonymous with AGNIQUE PG 8105) | $C_{8-10}$ alkyl | 1.5 |
| Agrimul PG 2067 (synonymous with AGNIQUE PG 8107) | $C_{8-10}$ alkyl | 1.7 |
| Agrimul PG 2072 (synonymous with AGNIQUE PG 816) | $C_{8-16}$ alkyl | 1.6 |
| Agrimul PG 2069 (synonymous with AGNIQUE PG 9116) | $C_{9-11}$ alkyl | 1.6 |
| Agrimul PG 2062 (synonymous with AGNIQUE PG 264) | $C_{12-16}$ alkyl | 1.4 |
| Agrimul PG 2065 (synonymous with AGNIQUE PG 266) | $C_{12-16}$ alkyl | 1.6 |
| BEROL AG6202 | 2-ethyl-1-hexyl | |

Alkoxylated alcohol surfactants for use in the herbicidal formulations of the present invention have the general structure (30):

$$R_{301}O\text{—}(R_{302}O)_x R_{303} \qquad (30)$$

wherein $R_{301}$ is hydrocarbyl or substituted hydrocarbyl having from 1 to about 30 carbon atoms, $R_{302}$ in each of the $(R_{302}O)_x$ groups is independently $C_2$-$C_4$ alkylene, $R_{303}$ is hydrogen, or a linear or branched alkyl group having from 1 to about 4 carbon atoms, and x is an average number from 1 to about 60. In this context, preferred $R_{301}$ hydrocarbyl groups are linear or branched alkyl, linear or branched alkenyl, linear or branched alkynyl, aryl, or aralkyl groups. Preferably, $R_{301}$ is a linear or branched alkyl or linear or branched alkenyl group having from about 8 to about 30 carbon atoms, $R_{302}$ in each of the $(R_{302}O)_x$ groups is independently $C_2$-$C_4$ alkylene, $R_{303}$ is hydrogen, methyl or ethyl, and x is an average number from about 5 to about 50. More preferably, $R_{301}$ is a linear or branched alkyl group having from about 8 to about 25 carbon atoms, $R_{302}$ in each of the $(R_{302}O)_x$ groups is independently ethylene or propylene, $R_{303}$ is hydrogen or methyl, and x is an average number from about 8 to about 40. Even more preferably, $R_{301}$ is a linear or branched alkyl group having from about 12 to about 22 carbon atoms, $R_{302}$ in each of the $(R_{302}O)_x$ groups is independently ethylene or propylene, $R_{303}$ is hydrogen or methyl, and x is an average number from about 8 to about 30. Preferred commercially available alkoxylated alcohols include: Emulgin™ L, Procol™ LA-15 (from Protameen); Brij™ 35, Brij™ 56, Brij™ 76, Brij™ 78, Brij™ 97, Brij™ 98 and Tergitol™ XD (from Sigma Chemical Co.); Neodol™ 25-12 and Neodol™ 45-13 (from Shell); Hetoxol™ CA-10, Hetoxol™ CA-20, Hetoxol™ CS-9, Hetoxol™ CS-15, Hetoxol™ CS-20, Hetoxol™ CS-25, Hetoxol™ CS-30, Plurafac™ A38 and Plurafac™ LF700 (from BASF); ST-8303 (from Cognis); Arosurf™ 66 E10 and Arosurf™ 66 E20 (from Witco/Crompton); ethoxylated (9.4 EO) tallow, propoxylated (4.4 EO) tallow and alkoxylated (5-16 EO and 2-5 PO) tallow (from Witco/Crompton). Also preferred are; SURFONIC™ NP95 of Huntsman (a polyoxyethylene (9.5) nonylphenol); TERGITOL series from Dow and commercially available from Sigma-Aldrich Co. (Saint Louis, Mo.), including TERGITOL-15-S-5, TERGITOL-15-S-9, TERGITOL-15-S-12 and TERGITOL-15-S-15 (made from secondary, linear $C_{11}$ to $C_{15}$ alcohols with an average of 5 moles, 9 moles, 12.3 moles and 15.5 moles of ethoxylation, respectively); the SURFONIC LF-X series from Huntsman Chemical Co. (Salt Lake City, Utah), including L12-7 and L12-8 (made from linear $C_{10}$ to $C_{12}$ alcohols with an average of 7 moles and 8 moles, respectively, of ethoxylation), L24-7, L24-9 and L24-12 (made from linear $C_{12}$ to $C_{14}$ alcohols with an average of 7 moles, 9 moles and 12 moles of ethoxylation, respectively), L68-20 (made from primary, linear $C_{16-18}$ alcohols with an average of 20 moles of ethoxylation) and L26-6.5 (made from linear $C_{12}$ to $C_{16}$ alcohols with an average of 6.5 moles of ethoxylation); and Ethylan 68-30 ($C_{16-18}$ with an average of 20 moles of ethoxylation) available from Akzo Nobel.

In some embodiments of the present invention, the surfactant is selected from alkoxylated tertiary etheramines, alkoxylated quaternary etheramines, alkoxylated etheramine oxides, alkoxylated tertiary amines, alkoxylated quaternary amines, alkoxylated polyamines, sulfates, sulfonates, phosphate esters, alkyl polysaccharides, alkoxylated alcohols, and combinations thereof.

In some other embodiments, amidoalkylamine surfactants can optionally be formulated in compositions of the present invention comprising glyphosate co-herbicide. Amidoalkylamine surfactants for use in such herbicidal formulations of the present invention have the general structure (31):

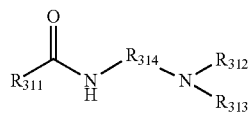

(31)

wherein $R_{311}$ is a hydrocarbyl or substituted hydrocarbyl having from 1 to about 22 carbon atoms, $R_{312}$ and $R_{313}$ are each independently hydrocarbyl or substituted hydrocarbyl having from 1 to about 6 carbon atoms and $R_{314}$ is hydrocarbylene or substituted hydrocarbylene having from 1 to about 6 carbon atoms.

$R_{311}$ is preferably an alkyl or substituted alkyl having an average value of carbon atoms between about 4 to about 20 carbon atoms, preferably an average value between about 4 and about 18 carbon atoms, more preferably an average value from about 4 to about 12 carbon atoms, more preferably an average value from about 5 to about 12 carbon atoms, even more preferably an average value from about 6 to about 12 carbon atoms, and still more preferably an average value from about 6 to about 10 carbon atoms. The $R_{311}$ alkyl group may be derived from a variety of sources that provide alkyl groups having from about 4 to about 18 carbon atoms, for example, the source may be butyric acid, valeric acid, caprylic acid, capric acid, coco (comprising mainly lauric acid), myristic acid (from, e.g., palm oil), soy (comprising mainly linoleic acid, oleic acid, and palmitic acid), or tallow (comprising mainly palmitic acid, oleic acid, and stearic acid). In some embodiments, the amidoalkylamine surfactant component may comprise a blend of amidoalkylamines having alkyl chains of various lengths from about 5 carbon atoms to about 12 carbon atoms. For example, depending upon the source of the $R_{311}$ alkyl group, an amidoalkylamine surfactant component may comprise a blend of surfactants having $R_{311}$ groups that are 5 carbon atoms in length, 6 carbon atoms in length, 7 carbon atoms in length, 8 carbon atoms in length, 9 carbon atoms in length, 10 carbon atoms in length, 11 carbon atoms in length, and 12 carbon atoms in length, longer carbon chains, and combinations thereof. In other embodiments, the amidoalkylamine surfactant component may comprise a blend of surfactants having $R_{311}$ groups that are 5 carbon atoms in length, 6 carbon atoms in length, 7 carbon atoms in length, and 8 carbon atoms in length. In some alternative embodiments, the amidoalkylamine surfactant component may comprise a blend of surfactants having $R_1$ groups that are 6 carbon atoms in length, 7 carbon atoms in length, 8 carbon atoms in length, 9 carbon atoms in length, and 10 carbon atoms in length. In other embodiments, the amidoalkylamine surfactant component may comprise a blend of surfactants having $R_{311}$ groups that are 8 carbon atoms in length, 9 carbon atoms in length, 10 carbon atoms in length, 11 carbon atoms in length, and 12 carbon atoms in length.

$R_{312}$ and $R_{313}$ are independently preferably an alkyl or substituted alkyl having from 1 to about 4 carbon atoms. $R_{312}$ and $R_{313}$ are most preferably independently an alkyl having from 1 to about 4 carbon atoms, and most preferably methyl. $R_{314}$ is preferably an alkylene or substituted alkylene having from 1 to about 4 carbon atoms. $R_{314}$ is most preferably an alkylene having from 1 to about 4 carbon atoms, and most preferably n-propylene. When $R_{314}$ is n-propylene, the amidoalkylamine surfactants are termed amidopropylamine (APA) surfactants.

In one preferred amidoalkylamine surfactant, $R_{311}$ is $C_{6-10}$, i.e., an alkyl group having 6 carbon atoms, 7 carbon atoms, 8 carbon atoms, 9 carbon atoms, 10 carbon atoms, or a blend of any of these, i.e., from about 6 carbon atoms to about 10 carbon atoms; $R_{312}$ and $R_{313}$ are each methyl; and $R_{314}$ is n-propylene (i.e., $C_{6-10}$ amidopropyl dimethylamine).

Examples of APA surfactants include Armeen APA 2 (where $R_{311}$ is $C_2$ and $R_{312}$ and $R_{313}$ are each hydrogen), Armeen APA 6 (where $R_{311}$ is $C_6$ and $R_{312}$ and $R_{313}$ are each methyl), Armeen APA 8, 10 (where $R_{311}$ is $C_{8-10}$ and $R_{312}$ and $R_{313}$ are each methyl), Armeen APA 12 (where $R_{311}$ is $C_{12}$ and $R_{312}$ and $R_{313}$ are each methyl), ACAR 7051 (where $R_{311}$ is $C_{5-9}$ and $R_{312}$ and $R_{313}$ are each methyl), ACAR 7059 (where $R_{311}$ is 2-ethyl hexyl and $R_{312}$ and $R_{313}$ are each methyl) and Adsee C80W (where $R_{311}$ is Coco and $R_{312}$ and $R_{313}$ are each methyl).

In some embodiments of the present invention, certain polybasic amine polymers may precipitate from solution in acidic aqueous formulations. It has been discovered that certain solubilizers improve amine polymer solubility in such formulations and function to prevent or inhibit precipitation. Under one theory, and without being bound to any particular theory, it is believed that the solubilizers help to maintain amine site hydration thereby inhibiting collapse of the polymer three-dimensional structure and associated precipitation from solution. It has been discovered that amine surfactants can function as both herbicidal efficacy enhancers and solubilizers. Such solubilizers include, for example, amine surfactants such as alkoxylated tertiary etheramines, alkoxylated quaternary etheramines, alkoxylated etheramine oxides, alkoxylated tertiary amine oxides, alkoxylated tertiary amines, alkoxylated quaternary amines, polyamines, alkoxylated polyamines and betaines. Solubilizers may also include primary, secondary or tertiary $C_4$ to $C_{16}$ alkyl or aryl amine compounds, or the corresponding quaternary ammonium compounds. A weight ratio of polymer to solubilizer of from about 1:1 to about 50:1 is preferred, more preferably from about 2:1 to about 25:1.

In one embodiment, compounds which enhance polymer solubility include amines or quaternary ammonium salt compounds having the general structures (32) and (33)

(32)

-continued

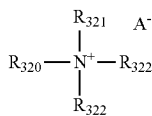

(33)

wherein $R_{320}$ is linear or branched alkyl or aryl having from about 4 to about 16 carbon atoms, $R_{321}$ is hydrogen, methyl or ethyl, $R_{322}$ is hydrogen, methyl or ethyl; $R_{323}$ is hydrogen or methyl; and $A^-$ is an agriculturally acceptable anion. Non-limiting examples include, mixed $C_{8-16}$ alkyl amine (Armeen C), dimethylcocoamine (Arquad DMCD), cocoammonium chloride (Arquad C), of which are manufactured by Akzo Nobel, hexylamine, dimethylhexylamine, octylamine, dimethyloctylamine, dodecyltrimethyl amide and $C_{4-8}$ trialkyl amines.

In some embodiments of the present invention, amidoalkylamine surfactants, as described above, can optionally be formulated as a solubilizer in compositions of the present invention comprising glyphosate co-herbicide.

Alkoxylated tertiary etheramines, alkoxylated quaternary etheramines, alkoxylated tertiary amines, alkoxylated quaternary amines, and octylamines are generally preferred stabilizers and, based on experimental evidence to date, provide greater polymer solubility and stability on a weight ratio basis than do amidoalkylamines.

The formulations of the invention may further comprise other additives such as conventional drift control agents, safeners, thickeners, flow enhancers, antifoaming agents, freeze protectants and/or UV protectants. Suitable drift control agents are known to those skilled in the art and include the commercial products Gardian®, Gardian Plus®, Dri-Gard®, Pro-One XL™, Array™, Compadre™, In-Place®, Bronc® Max EDT, EDT Concentrate™, Coverage® and Bronc® Plus Dry EDT. Safeners are likewise known to those skilled in the art and include isoxadifen, benoxacor and dichlormid.

In some embodiments of the present invention, the dicamba formulations of the present invention are used in the preparation of concentrate, tank mix or ready to use (RTU) formulations further comprising one or more additional co-herbicides. Co-herbicides include auxin herbicide salts other than dicamba salts (as previously described). Co-herbicides also include acetyl CoA carboxylase (AC-Case) inhibitors, acetolactate synthase (ALS) or acetohydroxy acid synthase (AHAS) inhibitors, photosystem II inhibitors, photosystem I inhibitors, protoporphyrinogen oxidase (PPO or Protox) inhibitors, carotenoid biosynthesis inhibitors, enolpyruvyl shikimate-3-phosphate (EPSP) synthase inhibitor, glutamine synthetase inhibitor, dihydropteroate synthetase inhibitor, mitosis inhibitors, synthetic auxins, auxin transport inhibitors and nucleic acid inhibitors, salts and esters thereof, and combinations thereof.

Included within the scope of co-herbicides are racemic mixtures and resolved isomers. Typical cations for the co-herbicide salts of the present invention include potassium, MEA, DMA, IPA, trimethylsulfonium (TMS) diethylammonium (DEA), lithium, and ammonium. Typical anions for the formation of co-herbicide salts include chlorine, bromine, fluorine and acetate. Typical esters include methyl, ethyl, propyl, isopropyl, butyl, isobutyl, pentyl, isooctyl, ethylhexyl, ethoxyethyl, butoxyethyl, butoxypropyl and octanoate.

Examples of ACCase inhibitors include clethodim, clodinafop, fenoxaprop-P, fluazifop-P, quizalofop-P and sethoxydim. Examples of ALS or AHAS inhibitors include flumetsulam, imazamethabenz-m, imazamox, imazapic, imazapyr, imazaquin, imazethapyr, metsulfuron, prosulfuron and sulfosulfuron. Examples of photosystem I inhibitors include diquat and paraquat. Examples of photosystem II inhibitors include atrazine, cyanazine and diuron. Examples of PPO inhibitors include acifluorofen, butafenacil, carfentrazone-ethyl, flufenpyr-ethyl, fluthiacet, flumiclorac, flumioxazin, fomesafen, lactofen, oxadiazon, oxyflurofen and sulfentrazone. Examples of carotenoid biosynthesis inhibitors include aclonifen, amitrole, diflufenican and sulcotrione. Glyphosate is an EPSP inhibitor, glufosinate is a glutamine synthetase inhibitor and asulam is a dihydropteroate synthetase inhibitor. Examples of mitosis inhibitors include acetochlor, alachlor, dithiopyr, S-metolachlor and thiazopyr. Naptalam is an example of a auxin transport inhibitor. Examples of nucleic acid inhibitors include difenzoquat, fosamine, metham and pelargonic acid.

Examples of suitable water-soluble herbicides include, without restriction, 2,4-D, aminopyralid, clopyralid, fluroxypyr, MCPA, and salts thereof; 2,4-DB salts, dichlorprop salts, MCPB salts, mecoprop salts, picloram salts, quinclorac salts, and triclopyr salts; and water soluble acids, salts and esters of acifluorfen, alloxydim, aminocarbazone, amidosulfuron, amitrole, asulam, azafenidin, azimsulfuron, beflubutamid, benazolin, bentazon, bensulfuron-methyl, bispyribac, bromacil, carbetamide, carfentrazone-ethyl, chlorimuron-ethyl, chlorsulfuron, cinosulfuron, clomazone, dalapon, dazomet, dicamba, dichlormid, diclofop, diclopyr, difenzoquat, deflufenzopyr, dimethachlor, dimethenamid, dimethipin, diquat dibromide, DNOC, DSMA, endothall, exasulfuron, flazasulfuron, floramsulfuron, florasulam, flucarbazone-sodium, flupropanate, fluthiacet, fomesafen, foramsulfuron, fosamine, glyphosate, glufosinate, glufosinate-P, hexazinone, imazamethabenz-methyl, imazamox, imazapic-ammonium, imazapyr, imazaquin-ammonium, imazethapyr-ammonium, iodosulfuron, mesotrione, metam, metamitron, metham, metosulam, metribuzin, metsulfuron-methyl, molinate, monolinuron, MSMA, water soluble salts of oleic acid, naptalam, oxasulfuron, paraquat dichloride, water-soluble salts of pelargonic acid, penoxsulam, prometon, propoxycarbazone-sodium, prosulfuron, pyrithiobac-sodium, quinmerac, rimsulfuron, sethoxydim, sulfosulfuron, TBA, tebuthiuron, terbacil, thifensulfuron-methyl, tralkoxydim, triasulfuron, tribenuron-methyl, triclopyr, and trifloxysulfuron; racemic mixtures and resolved isomers thereof; and mixtures thereof.

Examples of suitable water-insoluble herbicides include, without restriction, acetochlor, acifluorfen, aclonifen, alachlor, ametryn, anilofos, atrazine, azafenidin, benfluralin, bensulfuron-methyl, bensulide, benzofenap, bifenox, bromoxynil, butachlor, butroxydim, butylate, cafenstrole, chlomethoxyfen, chlorbromuron, chloridazon, chlornitrofen, chlorotoluron, chlorthal-dimethyl, chlorthiamid, cinmethylin, clethodim, clodinafop-propargyl, cloransulam-methyl, cyanazine, cycloate, cyclosulfamuron, cycloxydim, cyhalofop-butyl, desmedipham, desmetryn, dichlobenil, diclosulam, diflufenican, dimefuron, dimepiperate, dimethachlor, dinitramine, dinoterb, dithiopyr, diuron, EPTC, esprocarb, ethalfluralin, ethametsulfuron-methyl, ethofumesate, ethoxysulfuron, fenoxaprop-ethyl, fentrazamide, fluazifop-butyl, flucetosulfuron, fluchloralin, flufenacet, flufenpyr-ethyl, flumetsulam, flumiclorac-pentyl, flumioxazin, fluometuron, fluorochloridone, fluoroglycofen, flupyrsulfuron-methyl-sodium, fluridone, fluroxypyr-1-methylheptyl, flurtamone, fluthiacet-methyl, fomesafen, foramsulfuron, furyloxyfen, halosulfuron-methyl, haloxyfop-methyl, imazosulfuron, ioxynil, isoproturon, isoxaben, isoxaflutole, lactofen, lenacil, linuron, mefenacet, metazachlor, methabenzthiazuron, metobromuron, metolachlor, metosulam, metoxuron, metribuzin, molinate, monolinuron, napropamide, niocosulfuron, nitrofen, nitrofluorfen, norflurazon, oryzalin, oxadiargyl, oxadiazon, oxasulfuron, oxyfluorfen, pebulate, pelargonic acid, pendimethalin, phenmedipham, pretilachlor, prim isulfuron-methyl, prodiamine, prometon, prometryn, propachlor, propanil, propaquizafop, propisochlor, propyzamide, prosulfocarb, pyraflufen-ethyl, pyrazolynate, pyrazon, pyrazosulfuron-ethyl, pyrazoxyfen, pyribenoxim, pyridate, quinclorac, quinmerac, quizalofop-ethyl, rimsulfuron, siduron, simazine, simetryn, sulcotrione, sulfentrazone, sulfometuron, terbacil, terbumeton, terbuthylazine, terbutryn, thenylchlor, thiazopyr, thiobencarb, triallate, trietazine, trifluralin, triflusulfuron-methyl, and vernolate, agriculturally acceptable salts or esters of any of these herbicides, racemic mixtures and resolved isomers thereof, and combinations thereof.

Some preferred water-soluble herbicides include 2,4-D and salts thereof, acifluorfen salts, carfentrazone-ethyl, fomesafen salts, glyphosate and salts thereof, glufosinate and salts thereof, imazamethabenz and salts and esters thereof, imazamox and salts and esters thereof, imazapic and salts and esters thereof, imazapyr and salts and esters thereof, imazaquin and salts and esters thereof, imazethapyr and salts and esters thereof, mecoprop salts, triclopyr salts, racemic mixtures and resolved isomers thereof, and combinations thereof. Some preferred water-insoluble herbicides include acetochlor, alachlor, atrazine, azafenidin, bifenox, butachlor, butafenacil, diuron, dithiopyr, flufenpyr-ethyl, flumiclorac-pentyl, flumioxazin, fluoroglycofen, fluthiacet-methyl, lactofen, metazochlor, metolachlor (and S-metolachlor), oxadiargyl, oxadiazon, oxyfluorfen, pretilachlor, propachlor, propisochlor, pyraflufen-ethyl, sulfentrazone and thenylchlor, racemic mixtures and resolved isomers thereof, and combinations thereof.

Tank mix and RTU co-herbicide formulations of the present invention typically comprise from about 0.1 g a.e./L to about 50 g a.e./L total herbicide loading while co-herbicide concentrate formulations of the present invention typically comprise from about 50 to about 750 g a.e./L, from about 300 to about 750 g a.e./L, from about 350 to about g a.e./L, from about 400 to about 750 g a.e./L, from about 450 to about 750 g a.e./L, or even from about 500 to about 750 g a.e./L. For example, 50, 51, 55, 100, 150, 200, 250, 300, 350, 400, 450, 500, 550, 577.5, 600, 650, 700, or even 750 g a.e./L, and ranges thereof. In co-herbicide formulations, a weight ratio on an acid equivalent basis of the auxin herbicide to the total co-herbicide of no greater than about 50:1, for example, about 50:1, 25:1, 10:1, 5:1, 3:1, 2:1, 1:1, 1:2, 1:3, 1:5 or even about 1:10 and ranges thereof, for example, from about 50:1 to about 1:10, from about 50:1 to about 1:5, from about 50:1 to about 1:1, from about 50:1 to about 3:1, from about 50:1 to about 5:1, from about 50:1 to about 10:1, from about 25:1 to about 1:1, or from about 25:1 to about 3:1, are preferred. For any given auxin herbicide and concentration thereof, one skilled in the art can readily determine using routine experimentation a minimum ratio of that auxin herbicide to any co-herbicide or combination of co-herbicides that is necessary to achieve the objects of the invention in view of the other components of the formulation, such as a polybasic polymer component and/or surfactant component and their respective concentrations.

In some embodiments of the present invention, an auxin herbicide (e.g., dicamba) is combined with a co-herbicide selected from glyphosate, glufosinate (or glufosinate-P), an ALS inhibitor, salts and esters thereof, or combinations thereof, for application to transgenic plants comprising an auxin (e.g., dicamba, 2,4-D or fluroxypyr) resistant trait, a glyphosate resistant trait, a glufosinate resistant trait, an ALS resistant trait, or combinations thereof.

Crop tolerance to specific herbicides can be conferred by engineering genes into crops which encode appropriate herbicide metabolizing enzymes and/or insensitive herbicide targets. Technology for introduction of a DNA molecule (genes) into cells is well known to those of skill in the art. Methods and materials for transforming plant cells by introducing a DNA construct into a plant genome in the practice of this invention can include any of the well-known and demonstrated methods including, but not limited to:

(1) chemical methods (Graham and Van der Eb, *Virology*, 54(2):536-539 (1973) and Zatloukal, et al., *Ann. N.Y. Acad. Sci.*, 660: 136-153 (1992));

(2) physical methods such as microinjection (Capecchi, *Cell*, 22(2):479-488 (1980)), electroporation (Wong and Neumann, *Biochim. Biophys. Res. Commun.*, 107(2):584-587 (1982); Fromm, et al, *Proc. Natl. Acad. Sci. USA*, 82(17):5824-5828 (1985); U.S. Pat. No. 5,384,253) particle acceleration (Johnston and Tang, *Methods Cell Biol.*, 43(A): 353-365 (1994); Fynan, et al., *Proc. Natl. Acad. Sci. USA*, 90(24):11478-11482 (1993)): and microprojectile bombardment (as illustrated in U.S. Pat. Nos. 5,015,580; 5,550,318; 5,538,880; 6,160,208; 6,399,861; and 6,403,865);

(3) viral vectors (Clapp, *Clin. Perinatol.*, 20(1):155-168 (1993); Lu, et al., *J. Exp. Med.*, 178(6):2089-2096 (1993); Eglitis and Anderson, *Biotechniques*, 6(7):608-614 (1988));

(4) receptor-mediated mechanisms (Curiel et al., *Hum. Gen. Ther.*, 3(2):147-154 (1992) and Wagner, et al., *Proc. Natl. Acad. Sci. USA*, 89(13):6099-6103 (1992);

(5) bacterial mediated mechanisms such as *Agrobacterium*-mediated transformation (as illustrated in U.S. Pat. Nos. 5,824,877; 5,591,616; 5,981,840; and 6,384,301); direct introduction into pollen by injecting a plant's reproductive organs (Zhou, et al., *Methods in Enzymology*, 101: 433, (1983);

(6) Hess, *Intern Rev. Cytol.*, 107:367 (1987); Luo, et al., *Plant Mol Biol. Reporter,* 6:165 (1988); Pena, et al., *Nature*, 325:274 (1987));

(7) protoplast transformation (as illustrated in U.S. Pat. No. 5,508,184); and (8) injection into immature embryos (Neuhaus, et al., *Theor. Appl. Genet.*, 75:30 (1987)).

Any of the above described methods may be utilized to transform a plant cell.

Methods for transforming dicotyledonous plants, primarily by use of *Agrobacterium tumefaciens* and obtaining transgenic plants have been published for cotton (U.S. Pat. Nos. 5,004,863; 5,159,135; and 5,518,908); soybean (U.S. Pat. Nos. 5,569,834 and 5,416,011; see also, McCabe, et al., *Biotechnolgy,* 6:923 (1988) and Christou et al., *Plant Physiol.* 87:671-674 (1988)); *Brassica* (U.S. Pat. No. 5,463, 174); peanut (Cheng et al., *Plant Cell Rep.*, 15:653-657 (1996) and McKently et al., *Plant Cell Rep.*, 14:699-703 (1995)); papaya; and pea (Grant et al., *Plant Cell Rep.*, 15:254-258 (1995)).

Transformations of monocotyledon plants using electroporation, particle bombardment, and *Agrobacterium* have also been reported. Transformation and plant regeneration have been achieved in asparagus (Bytebier, et al., *Proc. Natl. Acad. Sci.* (USA), 84:5354 (1987); barley (Wan and Lemaux, *Plant Physiol,* 104:37 (1994)); maize (Rhodes, et al., *Science* 240:204 (1988), Gordon-Kamm, et al., *Plant Cell,* 2:603-618 (1990), Fromm, et al., *Bio/Technology,*

8:833 (1990), Koziel et al., *Bio/Technology,* 11:194 (1993), and Armstrong, et al., *Crop Science,* 35:550-557 (1995)); oat (Somers, et al., *Bio/Technology,* 10:1589 (1992)); orchard grass (Horn, et al., *Plant Cell Rep.* 7:469 (1988)); rye (De la Pena, et al., *Nature,* 325:274 (1987)); sugarcane (Bower and Birch, *Plant Journal,* 2:409 (1992)); tall fescue (Wang, et al., *Bio/Technology,* 10:691 (1992)); and wheat (Vasil, et al., *Bio/Technology,* 10:667 (1992) and U.S. Pat. No. 5,631, 152).

The regeneration, development, and cultivation of plants from transformed plant protoplast or explants is well known in the art (see, for example, Weissbach and Weissbach, *Methods for Plant Molecular Biology,* (Eds.), Academic Press, Inc., San Diego, Calif. (1988) and Horsch et al., *Science,* 227:1229-1231 (1985)). Transformed cells are generally cultured in the presence of a selective media, which selects for the successfully transformed cells and induces the regeneration of plant shoots and roots into intact plants (Fraley, et al., *Proc. Natl. Acad. Sci. U.S.A.,* 80: 4803 (1983)). Transformed plants are typically obtained within two to four months.

The regenerated transgenic plants are self-pollinated to provide homozygous transgenic plants. Alternatively, pollen obtained from the regenerated transgenic plants may be crossed with non-transgenic plants, preferably inbred lines of agronomically important species. Descriptions of breeding methods that are commonly used for different traits and crops can be found in one of several reference books, see, for example, Allard, *Principles of Plant Breeding,* John Wiley & Sons, NY, U. of CA, Davis, Calif., 50-98 (1960); Simmonds, *Principles of crop improvement,* Longman, Inc., NY, 369-399 (1979); Sneep and Hendriksen, Plant breeding perspectives, Wageningen (ed), Center for Agricultural Publishing and Documentation (1979); Fehr, *Soybeans: Improvement, Production and Uses,* 2nd Edition, Monograph., 16:249 (1987); Fehr, *Principles of variety development, Theory and Technique,* (Vol 1) and *Crop Species Soybean* (Vol 2), Iowa State Univ., Macmillian Pub. Co., NY, 360-376 (1987). Conversely, pollen from non-transgenic plants may be used to pollinate the regenerated transgenic plants.

The transformed plants may be analyzed for the presence of the genes of interest and the expression level and/or profile conferred by the regulatory elements of the present invention. Those of skill in the art are aware of the numerous methods available for the analysis of transformed plants. For example, methods for plant analysis include, but are not limited to Southern blots or northern blots, PCR-based approaches, biochemical analyses, phenotypic screening methods, field evaluations, and immunodiagnostic assays. The expression of a transcribable polynucleotide molecule can be measured using TaqMan® (Applied Biosystems, Foster City, Calif.) reagents and methods as described by the manufacturer and PCR cycle times determined using the TaqMan® Testing Matrix. Alternatively, the Invader® (Third Wave Technologies, Madison, Wis.) reagents and methods as described by the manufacturer can be used transgene expression.

The seeds of the plants of this invention can be harvested from fertile transgenic plants and be used to grow progeny generations of transformed plants of this invention including hybrid plant lines comprising the construct of this invention and expressing a gene of agronomic interest.

Genetically engineered crop plants of the present include, for example, cotton, soybeans, sugar beet, sugar cane, plantation crops, tobacco, rape, maize and rice. Examples of crops having herbicidal resistance given by a genetic engineering technique include corn, soybean and cotton having resistance to glyphosate (Roundup Ready®) and glufosinate (Liberty Link®). Other examples of herbicide resistant crop plants include dicamba, 2,4-D, dicamba or sethoxydim resistant corn, cotton and soybean; imidazolinone (imazethapyr and imazapyr) resistant corn (Imi-Corn®) and soybeans; and glyphosate and glufosinate resistant corn (SmartStax®).

In some embodiments of the present invention, dicamba (or a salt thereof) is combined with glyphosate co-herbicide (or a salt or ester thereof), the crop plant comprises a glyphosate-resistant trait and the crop plant is further either (i) a plant species not susceptible to auxin herbicides or (ii) comprises a dicamba resistant trait. Such compositions are useful to control (i) glyphosate susceptible plants and (ii) glyphosate resistant, but auxin susceptible, volunteer crop plants and/or weeds growing in a field of (iii) glyphosate and auxin resistant or tolerant crop plants.

In some other embodiments of the present invention, the auxin co-herbicide is an ALS-inhibitor herbicide (or a salt or ester thereof), the crop plant comprises an ALS-resistant trait and the crop plant is further either (i) a plant species not susceptible to auxin herbicides or (ii) comprises a dicamba resistant trait. Such compositions are useful to control (i) ALS susceptible plants and (ii) ALS resistant, but auxin susceptible, volunteer crop plants and/or weeds growing in a field of (iii) ALS and auxin resistant or tolerant crop plants. Some preferred ALS herbicides include amidosulfuron, azimsulfuron, florasulam, halosulfuron (-methyl), imazamethabenz, imazamox, imazapic, imazapyr, imazaquin, imazethapyr, imazosulfuron, iodosulfuron, metsulfuron (-methyl), nicosulfuron, primisulfuron (-methyl), prosulfuron, rimsulfuron, sulfosulfuron, thifensulfuron (-methyl), triasulfuron, tribenuron (-methyl), trifloxysulfuron and triflusulfuron (-methyl), salts and esters thereof, and racemic mixtures and resolved isomers thereof.

In some other embodiments of the present invention, the auxin co-herbicide is glufosinate (or glufosinate-P) (or a salt or ester thereof), the crop plant comprises a glufosinate-resistant trait and the crop plant is further either (i) a plant species not susceptible to auxin herbicides or (ii) comprises a dicamba resistant trait. Such compositions are useful to control (i) glufosinate susceptible plants and (ii) glufosinate resistant, but auxin susceptible, volunteer crop plants and/or weeds growing in a field of (iii) glufosinate and auxin resistant or tolerant crop plants.

In yet other embodiments of the present invention, glyphosate and glufosinate (or glufosinate-P) co-herbicides (or salts or esters thereof) are combined with an auxin herbicide, the crop plant is a species that comprises a glyphosate-resistant trait and a glufosinate-resistant trait, and the crop plant is further either (i) a plant species not susceptible to auxin herbicides or (ii) comprises a dicamba resistant trait.

In still other embodiments of the present invention, glyphosate and at least one ALS inhibitor herbicide (or salts or esters thereof) are combined with an auxin herbicide, the crop plant is a species that comprises a glyphosate-resistant trait and an ALS-resistant trait, and the crop plant is further either (i) a plant species not susceptible to auxin herbicides or (ii) comprises a dicamba resistant trait.

In yet other embodiments of the present invention, glufosinate (or glufosinate-P) and at least one ALS inhibitor herbicide (or salts or esters thereof) are combined with an auxin herbicide, the crop plant is a species that comprises a glufosinate-resistant trait and an ALS-resistant trait, and the crop plant is further either (i) a plant species not susceptible to auxin herbicides or (ii) comprises a dicamba resistant trait.

In still other embodiments of the present invention, glyphosate, glufosinate (or glufosinate-P) and ALS inhibitor co-herbicides (or salts or esters thereof) are combined with an auxin herbicide (e.g., dicamba) and the crop plant possesses glyphosate, glufosinate and ALS resistant traits and the crop plant is further either (i) a plant species not susceptible to auxin herbicides or (ii) comprises a dicamba resistant trait.

In herbicidal methods of the present invention of using a formulation of the invention, an application mixture, typically comprising from about 0.1 to about 50 g a.e./L herbicide, is formed and then applied to the foliage of a plant or plants at an application rate sufficient to give a commercially acceptable rate of weed control. Application mixtures are typically prepared from aqueous concentrate formulations by dilution with water to achieve the desired concentration. This application rate is usually expressed as amount of auxin herbicide per unit area treated, e.g., grams acid equivalent per hectare (g a.e./ha). Depending on plant species and growing conditions, the period of time required to achieve a commercially acceptable rate of weed control can be as short as a week or as long as three weeks, four weeks or 30 days. Typically a period of about two to three weeks is needed for the auxin herbicide to exert its full effect.

The formulations of the present invention can be applied pre-planting of the crop plant, such as from about 2 to about 3 weeks before planting auxin-susceptible crop plants or crop plants not having a dicamba-resistant trait. Crop plants that are not susceptible to certain auxin herbicides, such as corn, or plants having the dicamba-resistant trait typically have no pre-planting restriction and the formulations of the present invention can be applied immediately before planting such crops.

The formulations of the present invention can be applied at planting or post-emergence to crop plants having a dicamba-resistant trait to control auxin-susceptible weeds in a field of the crop plants and/or adjacent to a field of the crop plants. The formulations of the present invention can also be applied post-emergence to crop plants and/or adjacent to crop plants not having a dicamba resistant trait, such as corn, but that are not susceptible to auxin herbicides.

When a maximum or minimum "average number" is recited herein with reference to a structural feature such as oxyethylene units of a surfactant, or molecular weight or nitrogen content of a polybasic polymer, it will be understood by those skilled in the art that the integer number of such units in individual molecules typically varies over a range that can include integer numbers greater than the maximum or smaller than the minimum "average number". The presence in a formulation of individual molecules having an integer number of such units outside the stated range in "average number" does not remove the formulation from the scope of the present invention, so long as the "average number" is within the stated range and other requirements are met.

Having described the invention in detail, it will be apparent that modifications and variations are possible without departing from the scope of the invention defined in the appended claims.

EXAMPLES

The following non-limiting examples are provided to further illustrate the present invention.

The herbicidal effectiveness data set forth herein report "inhibition" as a percentage following a standard procedure in the art which reflects a visual assessment of plant mortality and growth reduction by comparison with untreated plants, made by technicians specially trained to make and record such observations. In all cases, a single technician makes all assessments of percent inhibition within any one experiment or trial. Such measurements are relied upon and regularly reported by Monsanto Technology LLC in the course of its herbicide business.

The selection of application rates that are biologically effective for a specific auxin herbicide is within the skill of the ordinary agricultural scientist. Those of skill in the art will likewise recognize that individual plant conditions, weather and growing conditions, as well as the specific exogenous chemical and formulation thereof selected, will affect the weed efficacy and associated crop injury achieved in practicing this invention. Useful application rates for the auxin herbicides employed can depend upon all of the above conditions. With respect to the use of the method of this invention, much information is known about appropriate auxin application rates, and a weed control practitioner can select auxin application rates that are herbicidally effective on particular species at particular growth stages in particular environmental conditions.

Effectiveness in greenhouse tests, usually at exogenous chemical rates lower than those normally effective in the field, is a proven indicator of consistency of field performance at normal use rates. As illustrated in the Examples herein, a pattern of enhancement emerges over a series of greenhouse tests; when such a pattern is identified this is strong evidence of biological enhancement that will be useful in the field.

The formulations of the present invention can be applied to plants by spraying, using any conventional means for spraying liquids, such as spray nozzles, atomizers, or the like. Formulations of the present invention can be used in precision farming techniques, in which apparatus is employed to vary the amount of exogenous chemical applied to different parts of a field, depending on variables such as the particular plant species present, soil composition, and the like. In one embodiment of such techniques, a global positioning system operated with the spraying apparatus can be used to apply the desired amount of the formulation to different parts of a field.

The formulation, at the time of application to plants, is preferably dilute enough to be readily sprayed using standard agricultural spray equipment. Preferred application rates for the present invention vary depending upon a number of factors, including the type and concentration of active ingredient and the plant species involved. Useful rates for applying an aqueous formulation to a field of foliage can range from about 25 to about 1,000 liters per hectare (1/ha) by spray application. The preferred application rates for aqueous solutions are in the range from about 50 to about 300 l/ha.

Many exogenous chemicals (including auxin herbicides) must be taken up by living tissues of the plant and translocated within the plant in order to produce the desired biological (e.g., herbicidal) effect. Thus, it is important that an herbicidal formulation not be applied in such a manner as to excessively injure and interrupt the normal functioning of the local tissue of the plant so quickly that translocation is reduced. However, some limited degree of local injury can be insignificant, or even beneficial, in its impact on the biological effectiveness of certain exogenous chemicals.

The experiments were carried out in greenhouse testing. The herbicidal formulations were applied postemergence to weeds having a height of about 10-15 cm using plot sprayers. Test formulations were applied at a spray volume 93

L/ha applied by means of a Flatfan 9501E nozzle (Spraying Systems Co., Wheaton, Ill., USA) at 165 kPa pressure. The greenhouse temperature was 21-29° C. at approximately 30% relative humidity. Evaluation was done by visual scoring. The effects on the plant species were estimated in comparison with untreated control plots using a percentage scale (0-100%).

The components in Table 1 below are used in the Examples.

TABLE 1

| Component | Description |
|---|---|
| Surf1 | Tallowamine ethoxylate 10EO surfactant |
| Surf2 | 5:2:1:1 ratio of tallowamine ethoxylate (10.5EO) surfactant (Ethomeen T105 tallowamine ethoxylate):tridecanol phosphate (4EO) surfactant (Emphos PS-121 HM):polyethylene glycol (PEG400/600):dipropylene glycol |
| Surf3 | Surfonic AGM 550 surfactant |
| Surf4 | Witconate AOK (sodium $C_{14-16}$ olefin sulfonate) |
| Surf5 | Tergitol 15-S-12 surfactant |
| Surf6 | Ethylan 68-30 surfactant |
| Surf7 | Phosphalan PS-131 |
| Surf8 | Agrimul 2067 APG surfactant |
| Surf9 | Ethomeen YT (12EO) (Tallow Y-amine 12EO) |
| Surf10 | Ethoduomeen CD (3EO) (Alkoxylated N-coco-1,3-diaminopropane) |
| Surf11 | Adogen 570 (13EO) |
| Surf12 | Ethomeen YT (16EO) |
| Surf13 | Triamine Y/12 (Alkoxylated N-tallowalkyldipropylenetriamine) |
| Surf14 | Ethomeen Y/12 (8EO) (Alkoxylated N-tallowalkylamine) |
| Surf15 | Ethomeen YT (8EO) |
| Surf16 | Adogen 560 (4.8EO) |
| Surf17 | Ethomeen YT (20EO) |
| Surf18 | Ethomeen Y/12 (12EO) |
| Surf19 | Adogen 560 (10EO) |
| Surf20 | Adogen 560 (13.4EO) |
| Surf21 | Tetrameen T (4.9EO) |
| Surf22 | Corsamine TRT (19.2EO) (Alkoxylated N-tallowalkyldipropylenetriamine) |
| Surf23 | Ethomeen Y/12 (16EO) |
| Surf24 | Heptamine YT (8EO) |
| Surf25 | Adogen 670 (14.9EO) |
| Surf26 | Ethomeen Y/12 (4EO) |
| Surf27 | Ethomeen Y/12 (20EO) |
| Surf28 | Ethomeen YT (4EO) |
| Surf29 | Agnique PG 8107 |
| Surf30 | Tallowamine 15EO |
| Surf31 | Surfonic L12-8 |
| Surf32 | Surfonic L24-9 |
| Surf33 | Surfonic L24-12 |
| Surf34 | Neodol 45-13 |
| Surf35 | Tergitol 15-S-5 |
| Surf36 | Polyvinyl alcohol (77,000 to 79,000 molecular weight - CAS No. 9002-89-5) |
| Surf37 | Tomah E-17-5 |
| Surf38 | Witconate 93-S |
| Surf39 | Phospholan PS-236 |
| Surf40 | Surfonic L68-20 |
| Surf41 | Armeen APA 2 |
| Surf42 | Armeen APA 6 |
| Surf43 | Armeen APA 8, 10 |
| Surf44 | Armeen APA 12 |
| Surf45 | ACAR 7051 |
| Surf46 | ACAR 7059 |
| Surf47 | Adsee C80W |
| Surf48 | Tallowamine ethoxylate (15EO) and glycerin |
| Surf49 | Ethomeen T/20H |
| Poly1 | Lupasol P (750,000 Dalton molecular weight) |
| Poly2 | Lupasol FG (800 Dalton molecular weight) |
| Poly3 | Aldrich Polyamine (molecular weight 25,000 Catalog No. 408727) |
| Poly4 | Lupasol SC-61-B (110,000 Dalton molecular weight) |

TABLE 1-continued

| Component | Description |
|---|---|
| Poly5 | Lupasol SK (2,000,000 Dalton molecular weight) |
| Poly6 | Polyvinylpyrrolidone K30 (molecular weight 40,000, TCI cat no. P0472) |
| Poly7 | Quadrol Polyol |
| Poly8 | Lupasol HF (25,000 Dalton molecular weight) |

Example 1

An experiment was performed to determine the efficacy of experimental application mixtures prepared by aqueous dilution of experimental MEA dicamba salt formulations containing a surfactant relative to comparative application mixtures prepared by dilution of the commercial products CLARITY and BANVEL.

Aqueous formulations comprising MEA dicamba were typically prepared by mixing water and monoethanolamine for 5 min followed by addition of dicamba acid (98.3% purity) in one portion. The resulting suspensions were stirred until all of the solids had dissolved by visual inspection, typically between 60 min and overnight. Relative amounts of dicamba and MEA used to give 61% by wt solutions of dicamba are reported in Table 1a. These and MEA dicamba solutions prepared using this procedure were subsequently used in preparation of MEA dicamba formulations containing polyimine polymers and/or surfactants.

TABLE 1a

| Dicamba wt % | Water (g) | MEA (g) | Dicamba (g) | mol eq MEA:dicamba |
|---|---|---|---|---|
| 61 | 108.28 | 81.45 | 310.27 | 0.95 |
| 61 | 103.99 | 85.74 | 310.27 | 1.00 |
| 61 | 99.7 | 90.02 | 310.27 | 1.05 |
| 61 | 57.27 | 56.58 | 186.15 | 1.10 |

The formulation of the experimental dicamba aqueous formulations are indicated in Table 1b below where the dicamba concentrations are reported on a weight percent active equivalent (wt % a.e.) basis unless otherwise indicated. CLARITY contains 56.8 wt % active ingredient (a.i.) (38.5 wt % a.e.) of the diglycolamine salt of dicamba. BANVEL contains 48.2 wt % a.i. of the dimethylamine salt of dicamba.

TABLE 1b

| Form. | Dicamba concentration | Component | Comp. conc. |
|---|---|---|---|
| 925S3J | 48 wt % MEA dicamba | Surf1 | 10 wt % |
| 926Y7O | 48 wt % MEA dicamba | Surf2 | 10 wt % |
| 931F5L | 40 wt % MEA dicamba | Poly1 | 4.2 wt % |
| 956N5T | 48 wt % MEA dicamba | Surf3 | 10 wt % |
| 933C3S | 40 wt % MEA dicamba | Poly5 | 4.2 wt % |
| 942T3R | 55 wt % DGA Dicamba | None | — |
| 944L8M | 40 wt % DGA dicamba | None | — |
| 957Y2S | 61 wt % MEA dicamba | None | — |
| 959C9L | 48 wt % MEA dicamba | Surf4 | 10 wt % |
| 960U4V | 40 wt % MEA dicamba | Surf5 | 10 wt % |
| 961X6A | 48 wt % MEA dicamba | Surf6 | 10 wt % |
| 962P0H | 40 wt % MEA dicamba | None | — |
| 963E2Z | 48 wt % MEA dicamba | Surf7 | 10 wt % |
| 968Q3W | 48.5 wt % MEA dicamba | None | — |
| 416B5G | 48 wt % MEA dicamba | Surf8 | 14.3 wt % |
| 955C3D | 40 wt % MEA dicamba | surf3 | 10 wt % |
| 403E5Y | 45 wt % MEA dicamba | None | — |
| 416U7M | 48 wt % MEA dicamba | surf8 | 10 wt % |

TABLE 1b-continued

| Form. | Dicamba concentration | Component | Comp. conc. |
|---|---|---|---|
| 802R2X | 48.1 wt % MEA dicamba | surf7 | 10 wt % |
| 929P6H | 40 wt % MEA dicamba | poly5 | 17.3 wt % |
| 908D1S | 40 wt % MEA dicamba | poly5 | 17.3 wt % |
|  |  | surf2 | 8 wt % |
| 066P9C | 39.5 wt % MEA dicamba | poly6 | 3 wt % |
| 068I4B | 39.5 wt % MEA dicamba | poly6 | 10 wt % |
| 070J7X | 48 wt % MEA dicamba | poly6 | 8 wt % |
| 071Q5H | 48 wt % MEA dicamba | poly6 | 4 wt % |
| 532U3W | 47.9 wt % MEA dicamba | poly7 | 5 wt % |
| 580Q7N | 40 wt % DGA dicamba | Poly2 | 4 wt % |
| 7601W8J | 40 wt % DGA dicamba | Poly2 | 1 wt % |
| 7602G5V | 40 wt % DGA dicamba | Poly2 | 2 wt % |
| 7603A1D | 40 wt % DGA dicamba | Poly2 | 3 wt % |
| 7604P0K | 40 wt % DGA dicamba | Poly2 | 4 wt % |
| 7605L6Y | 40 wt % DGA dicamba | Poly2 | 5 wt % |
| 7606M4R | 40 wt % DGA dicamba | Poly2 | 6 wt % |
| 7191U4V | 40 wt % potassium dicamba | Poly2 | 1 wt % |
| 7192E8K | 40 wt % potassium dicamba | Poly2 | 2 wt % |
| 7193E3C | 40 wt % potassium dicamba | Poly2 | 3 wt % |
| 7194R5X | 40 wt % potassium dicamba | Poly2 | 4 wt % |
| 7195O7T | 40 wt % potassium dicamba | Poly2 | 5 wt % |
| 7196M9K | 40 wt % potassium dicamba | Poly2 | 6 wt % |
| 1381X4R | 40 wt % potassium dicamba | Poly8 | 1 wt % |
| 1382P2H | 40 wt % potassium dicamba | Poly8 | 2 wt % |
| 1383T5B | 40 wt % potassium dicamba | Poly8 | 3 wt % |
| 1384U5U | 40 wt % potassium dicamba | Poly8 | 4 wt % |
| 1385A4S | 40 wt % potassium dicamba | Poly8 | 5 wt % |
| 1386J7G | 40 wt % potassium dicamba | Poly8 | 6 wt % |
| 8145A6B | 40 wt % DGA dicamba | Surf2 | 12 wt % |
| 8145B7U | 40 wt % DGA dicamba | Surf2 | 8 wt % |
| 8145C2Z | 40 wt % DGA dicamba | Surf2 | 4 wt % |
| 8146A8A | 40 wt % DGA dicamba | Surf49 | 12 wt % |
| 8146B2K | 40 wt % DGA dicamba | Surf49 | 8 wt % |
| 8146C9K | 40 wt % DGA dicamba | Surf49 | 4 wt % |
| 8147A1E | 40 wt % DGA dicamba | Surf48 | 12 wt % |
| 8147B8N | 40 wt % DGA dicamba | Surf48 | 8 wt % |
| 8147C4F | 40 wt % DGA dicamba | Surf48 | 4 wt % |
| Na-Dicamba | 42 wt % Sodium Dicamba | — | — |
| MEA-Dicamba | 45 wt % MEA dicamba | — | — |
| K-dicamba | 53 wt % Potassium Dicamba | — | — |

Formulations from Table 1b and CLARITY were sprayed over the top of soybeans having both dicamba resistant and Roundup Ready® (RR) traits to investigate any possible injury at application rates of 561 (the labeled rate), 1120 and 2244 grams acid equivalent per hectare (kg a.e./ha) in the equivalent of 93 liters per hectare (L/ha) water. Ratings were taken at 4 days after treatment (DAT). The data is presented in Table 1c in an ANOVA summary of formulations mean comparisons by rate.

TABLE 1c

|  | 1120 g a.e./ha | 2240 g a.e./ha | 4480 g a.e./ha |
|---|---|---|---|
| CLARITY | 1.2 | 3.2 | 5.2 |
| 925S3J | 1 | 4.5 | 11.3 |
| 926Y7O | 0 | 4 | 12.7 |
| 956N5T | 2.3 | 12.5 | 21.7 |
| 959C9L | 0.8 | 3.2 | 20 |
| 960U4V | 1.8 | 11.7 | 32.5 |
| 961X6A | 1.2 | 6.5 | 20.8 |
| 962P0H | 0.5 | 2.8 | 4.2 |
| 963E2Z | 0.5 | 7.3 | 31.7 |
| 416B5G | 1.5 | 6.5 | 23.3 |
| LSD | 2.4 | 5 | 7.6 |

At the label use rate (1120 g a.e./ha), no significant injury was noted. The 4x label application rate of 4480 g a.e./ha indicated crop injury, particularly for formulation 960U4V containing an alcohol ethoxylate surfactant. Overall, at normal use rates, none of the formulations appear to be overly injurious to soybeans having dicamba resistant and RR traits.

The efficacy of application mixtures prepared from the Table 1b formulations, CLARITY and BANVEL were evaluated on velvetleaf (ABUTH); common ragweed (AMBEL); pitted morningglory (IPOLA); and common waterhemp (AMATA). For each trial, dicamba was applied at rates of 140, 280 and 561 grams a.e./ha in the equivalent of 93 L/ha of water. Ratings were taken at 18 to 21 days after treatment DAT. The results of all rates were combined in a pair-wise T-test for each rating for the overall ratings.

The result of the efficacy trials on ABUTH, AMBEL and IPOLA is reported in Table 1d as t-test pairwise mean difference comparisons of CLARITY versus the experimental formulations and BANVEL and in Table 1e as t-test pairwise mean difference comparisons of BANVEL versus the experimental formulations and CLARITY. A negative difference value indicates that the experimental formulation provided increased efficacy relative to the comparative formulations. For instance, in Table 1c, formulation 956N5T gave significantly higher combined weed control as compared to CLARITY.

TABLE 1d

| CLARITY | Combined Data | | ABUTH | |
|---|---|---|---|---|
| versus | Difference | n | Difference | n |
| 956N5T | −11.9$^a$ | 126 | −13.5$^a$ | 108 |
| 963E2Z | −9.7$^a$ | 90 | −12$^a$ | 72 |
| 926Y7O | −9.2$^a$ | 153 | −12.2$^a$ | 108 |
| 960U4V | −8.8$^a$ | 153 | −12.4$^a$ | 108 |
| 959C9L | −8.7$^a$ | 153 | −13.5$^a$ | 108 |
| 961X6A | −7.3$^a$ | 153 | −11.9$^a$ | 108 |
| 925S3J | −6.9$^a$ | 153 | −9.5$^a$ | 108 |
| Na-Dicamba | −6.5$^a$ | 36 | −6.5$^a$ | 36 |
| 955C3D | −6.3$^a$ | 135 | −11.2$^a$ | 90 |
| K-Dicamba | −4.9$^a$ | 36 | −4.9$^a$ | 36 |
| BANVEL | −4.6$^a$ | 135 | −7.5$^a$ | 90 |
| 416B5G | −3.9$^a$ | 135 | −8.8$^a$ | 90 |
| MEA-Dicamba | −3.4$^a$ | 108 | −4$^a$ | 90 |

| CLARITY | AMBEL | | IPOLA | |
|---|---|---|---|---|
| versus | Difference | n | Difference | n |
| 956N5T | — | — | −2.4$^c$ | 18 |
| 963E2Z | — | — | −0.6$^c$ | 18 |
| 926Y7O | −3.0$^c$ | 27 | −0.8$^c$ | 18 |
| 960U4V | 0.3$^c$ | 27 | −1.1$^c$ | 18 |
| 959C9L | 4.4$^c$ | 27 | 0.4$^c$ | 18 |

TABLE 1d-continued

| | | | | |
|---|---|---|---|---|
| 961X6A | 5.9[c] | 27 | 0.7[c] | 18 |
| 925S3J | −0.4[c] | 27 | −0.6[c] | 18 |
| Na-Dicamba | — | — | — | — |
| 955C3D | 5.9[c] | 27 | −0.2[c] | 18 |
| K-Dicamba | — | — | — | — |
| BANVEL | 2.6[c] | 27 | −1.0[c] | 18 |
| 416B5G | 9.0[d] | 27 | 1.2[c] | 18 |
| MEA-Dicamba | — | — | −0.4[c] | 18 |

[a]Formulation is signifcantly more efficacious than the standard (p < 0.01)
[b]Formulation is signifcantly more efficacious than the standard (p < 0.05)
[c]Formulation cannot be distinguished from the standard (p ≥ 0.05)
[d]Formulation is signifcantly less efficacious than the standard (p < 0.05)
[e]Formulation is signifcantly less efficacious than the standard (p < 0.01)

TABLE 1e

| BANVEL | Combined Data | | ABUTH | |
|---|---|---|---|---|
| versus | Difference | n | Difference | n |
| 956N5T | −4.8[a] | 108 | −5.5[a] | 90 |
| 926Y7O | −3.7[a] | 135 | −4[a] | 90 |
| 959C9L | −3.6[a] | 135 | −6.2[a] | 90 |
| 960U4V | −3.6[a] | 135 | −4.6[a] | 90 |
| 963E2Z | −3.3[a] | 72 | −4.5[a] | 54 |
| 961X6A | −2.0[c] | 135 | −4.4[a] | 90 |
| 925S3J | −1.9[b] | 135 | −2.1[a] | 90 |
| 955C3D | −1.7[b] | 135 | −3.7[a] | 90 |
| 416B5G | 0.7[c] | 135 | −1.3[c] | 90 |
| Na-Dicamba | 2.4[d] | 36 | 2.4[d] | 36 |
| MEA-Dicamba | 3.3[e] | 90 | 4[e] | 72 |
| K-Dicamba | 3.9[d] | 36 | 3.9[d] | 36 |
| CLARITY | 4.6[e] | 135 | 7.5[e] | 90 |

| CLARITY | AMBEL | | IPOLA | |
|---|---|---|---|---|
| versus | Difference | n | Difference | n |
| 956N5T | — | — | −1.4[c] | 18 |
| 926Y7O | −5.5[c] | 27 | 0.2[c] | 18 |
| 959C9L | 1.9[c] | 27 | 1.4[c] | 18 |
| 960U4V | −2.3[c] | 27 | −0.1[c] | 18 |
| 963E2Z | — | — | 0.4[c] | 18 |
| 961X6A | 3.4[c] | 27 | 1.7[c] | 18 |
| 925S3J | −2.9[c] | 27 | 0.4[c] | 18 |
| 955C3D | 3.3[c] | 27 | 0.8[c] | 18 |
| 416B5G | 6.5[c] | 27 | 2.2[c] | 18 |
| Na-Dicamba | — | — | — | — |
| MEA-Dicamba | — | — | 0.6[c] | 18 |
| K-Dicamba | — | — | — | — |
| CLARITY | −2.6[c] | 27 | 1.0[c] | 18 |

The result of the efficacy trials, in % control at 17 DAT, on AMATA is reported in Table 1f.

TABLE 1f

| Formulation | 140 g a.e./ha | 280 g a.e./ha | 561 g a.e./ha |
|---|---|---|---|
| CLARITY | 59.2 | 68 | 72 |
| 962P0H | 55 | 70.8 | 75 |
| 925S3J | 57 | 76 | 94.2 |
| 926Y7O | 62 | 79 | 91.3 |
| 956N5T | 65 | 78 | 94.7 |
| 959C9L | 64 | 75 | 95 |
| 960U4V | 63.3 | 72.5 | 93 |
| 961X6A | 67.5 | 70 | 96.7 |
| 963E2Z | 67.5 | 87.5 | 99 |
| 929P6H | 71.7 | 80.8 | 93.8 |
| 908D1S | 63.3 | 72.5 | 100 |
| LSD | 8.7 | 11 | 7 |

At the highest application rate of 561 g a.e./ha all experimental formulations gave superior efficacy as compared to MEA dicamba (962P0H) and CLARITY. At the application rate of 280 g a.e./ha, formulations 963E2Z and 929P6H were more efficacious than CLARITY. At the lowest application rate of 140 g a.e./ha, formulation 929P6H was more efficacious than CLARITY. In general, the formulations containing polyimine polymers (Formulations 929P6H and 908D1S) provided equivalent herbicide performance as compared to formulations comprising a surfactant.

The result of the efficacy trials, in % control, on CHEAL is reported in Table 1g. The CHEAL was at the 9-12 leaf growth stage and was 10-15 cm in height.

TABLE 1g

| Formulation | 140 g a.e./ha | 280 g a.e./ha | 561 g a.e./ha |
|---|---|---|---|
| CLARITY | 27.5 | 50 | 68.3 |
| 962P0H | 34.2 | 50 | 70.8 |
| 925S3J | 75.8 | 89.2 | 96 |
| 926Y7O | 79.2 | 89.7 | 93.2 |
| 956N5T | 77.5 | 81.7 | 85.5 |
| 959C9L | 58.3 | 80 | 89.3 |
| 960U4V | 58.3 | 81.7 | 86.7 |
| 961X6A | 57.5 | 75.8 | 86.7 |
| 963E2Z | 55.8 | 75 | 84.2 |
| 929P6H | 53.3 | 61.7 | 87.5 |
| 908D1S | 59.2 | 77.5 | 86.7 |
| LSD | 7.8 | 6.5 | 5.5 |

At the 140 g a.e./ha application rate, all dicamba formulations were superior to the MEA dicamba salt formulation (962P0H) and CLARITY. Among the highest efficacy formulations at that rate were 925S3J, 926Y7O and 956N5T. At the 280 g a.e./ha application rate, all dicamba formulations were superior to the MEA dicamba salt formulation (962P0H) and CLARITY. The highest efficacy formulations at that rate were 925S3J and 926Y7O. At the 561 g a.e./ha application rate, all dicamba formulations except were superior to the MEA dicamba salt formulation (962P0H) and CLARITY. The highest efficacy formulations at that rate were 925S3J and 926Y7O.

The result of the efficacy trials, in % control, on IPOLA is reported in Table 1h. The IPOLA was at the 1-2 leaf growth stage and was 5-10 cm in height.

TABLE 1h

| Formulation | 140 g a.e./ha | 280 g a.e./ha | 561 g a.e./ha |
|---|---|---|---|
| CLARITY | 83.3 | 98.8 | 99.5 |
| 403E5Y | 83.8 | 99.5 | 99.7 |
| BANVEL | 85 | 99.8 | 99.8 |
| 925S3J | 85.5 | 98 | 100 |
| 926Y7O | 89.7 | 94.8 | 99.5 |
| 955C3D | 85 | 97.5 | 99.8 |
| 956N5T | 89.2 | 100 | 99.7 |
| 959C9L | 82.5 | 98 | 100 |
| 960U4V | 85 | 99.8 | 100 |
| 961X6A | 81.7 | 98.2 | 99.7 |
| 416U7M | 80.8 | 97.3 | 100 |
| 802R2X | 83.3 | 100 | 100 |
| LSD | 9.6 | 3.2 | 0.5 |

At the 140 g a.e./ha application rate, 926Y7O was slightly less efficacious than the other formulations.

The result of the efficacy trials, in % control at 15 DAT, on IPOLA is reported in Table 1i. The IPOLA was at the 1-2 leaf growth stage and was 5-10 cm in height.

TABLE 1i

| Formulation | 140 g a.e./ha | 280 g a.e./ha | 561 g a.e./ha |
|---|---|---|---|
| CLARITY | 83.3 | 98.8 | 99.5 |
| 403E5Y | 83.8 | 99.5 | 99.7 |
| BANVEL | 85 | 99.8 | 99.8 |
| 925S3J | 85.5 | 98 | 100 |
| 926Y7O | 89.7 | 94.8 | 99.5 |
| 955C3D | 85 | 97.5 | 99.8 |
| 956N5T | 89.2 | 100 | 99.7 |
| 959C9L | 82.5 | 98 | 100 |
| 960U4V | 85 | 99.8 | 100 |
| 961X6A | 81.7 | 98.2 | 99.7 |
| 416U7M | 80.8 | 97.3 | 100 |
| 802R2X | 83.3 | 100 | 100 |
| LSD | 9.6 | 3.2 | 0.5 |

At the 140 g a.e./ha application rate, 926Y7O was slightly less efficacious than the other formulations.

The result of the efficacy trials, in % control at 18 DAT, on ABUTH is reported in Table 1j. The ABUTH was at the 5-6 leaf growth stage and was 10-15 cm in height.

TABLE 1j

| Formulation | 140 g a.e./ha | 280 g a.e./ha | 561 g a.e./ha |
|---|---|---|---|
| CLARITY | 25 | 52 | 79 |
| 962P0H | 36 | 58 | 84 |
| 929P6H | 39 | 59 | 85 |
| 926Y7O | 44 | 67 | 90 |
| 066P9C | 39 | 68 | 82 |
| 068I4B | 28 | 54 | 74 |
| 070J7X | 38 | 58 | 84 |
| 071Q5H | 41 | 65 | 83 |
| 532U3W | 32 | 58 | 83 |
| LSD | 7.5 | 58 | 83 |

At the 140 g a.e./ha application rate, all six formulations of the present invention gave greater efficacy than CLARITY. At the application rate of 280 g a.e./ha, formulations 926Y7O, 066P9C and 071 Q5H were more efficacious than CLARITY. At the application rate of 561 g a.e./ha, formulation 926Y7O was more efficacious than CLARITY. The data appear to indicate that higher efficacy is achieved at lower polyvinylpyrrolidone loading.

The result of the efficacy trials, in % control at 21 DAT, on ABUTH is reported in Table 1k. The ABUTH was at the 5-6 leaf growth stage and was 10-15 cm in height.

TABLE 1k

| Formulation | 140 g a.e./ha | 280 g a.e./ha | 561 g a.e./ha |
|---|---|---|---|
| CLARITY | 36.7 | 63.3 | 79.2 |
| 962P0H | 36.7 | 64.2 | 82.5 |
| 925S3J | 42.5 | 64.2 | 84.2 |
| 926Y7O | 39.2 | 70 | 92.2 |
| 956N5T | 45 | 72.5 | 88.3 |
| 959C9L | 47.5 | 71.7 | 91.3 |
| 960U4V | 45.8 | 78.3 | 92.2 |
| 961X6A | 45.8 | 65.8 | 91.8 |
| 963E2Z | 41.7 | 75 | 88.3 |
| 929P6H | 44.2 | 75.8 | 90.5 |
| 908D1S | 45 | 73.3 | 85 |
| LSD | 4.9 | 7.3 | 4.8 |

At the 140 g a.e./ha application rate, all formulations of the present invention except 926Y7O gave greater efficacy than CLARITY. At the application rate of 280 g a.e./ha, formulations 956N5T, 959C9L, 960U4V, 963E2Z, 929P6H and 908D1S were more efficacious than CLARITY. At the application rate of 561 g a.e./ha, all formulations of the present invention were more efficacious than CLARITY and MEA dicamba (962P0H).

The result of the efficacy trials, in % control at 21 DAT, on White clover (TRFRE) is reported in Table 1l. The TRFRE was at greater than 12 leaf growth stage and was 10-15 cm in height.

TABLE 1l

| Formulation | 140 g a.e./ha | 280 g a.e./ha | 561 g a.e./ha |
|---|---|---|---|
| CLARITY | 45 | 62 | 76 |
| 962P0H | 44 | 63 | 73 |
| 925S3J | 51 | 74 | 80 |
| 926Y7O | 53 | 62 | 85 |
| 956N5T | 62 | 79 | 86 |
| 959C9L | 52 | 70 | 78 |
| 960U4V | 60 | 78 | 84 |
| 961X6A | 58 | 67 | 89 |
| 963E2Z | 56 | 73 | 83 |
| 929P6H | 56 | 59 | 81 |
| 908D1S | 55 | 66 | 83 |
| LSD | 6.5 | 7.5 | 7.1 |

At the 140 g a.e./ha application rate, all formulations of the present invention except 925S3J gave greater efficacy than CLARITY and MEA dicamba. At the application rate of 280 g a.e./ha, formulations 956N5T, 959C9L, 960U4V, 963E2Z and 925S3J were slightly more efficacious than CLARITY. At the application rate of 561 g a.e./ha, formulations 956N5T, 926Y7O, 960U4V and 961X6A were slightly more efficacious than CLARITY.

Overall, the data of Tables 1b through 1k show that the herbicidal performance of dicamba can be improved as compared to the commercial products CLARITY and BANVEL. The etheramine surfactant Surfonic AGM 550 surfactant and surf2, comprising a mixture of a cationic alkyl ether amine surfactant and an anionic alkyl ether phosphate surfactant, provided the greatest dicamba herbicidal activity. Of the surfactants, the alkylpolyglucoside gave the least improvement also ABUTH control was improved as compared to CLARITY. The data further show that polymers can give substantially equivalent dicamba efficacy enhancement as do surfactants.

The efficacy of application mixtures prepared from Table 1b formulations, CLARITY, and 480 g/L MEA dicamba (formulations 943Q1H and 944L8M) were evaluated on velvetleaf (ABUTH). For each trial, dicamba was applied post-emergent to 10-15 cm velvetleaf at rates of 140, 280 and 560 grams a.e./ha. The results of the efficacy trial in % control at 22 DAT are reported in Table 1m TABLE 1m

| Formulation | 140 g ae/ha | 280 g ae/ha | 560 g ae/ha |
|---|---|---|---|
| 943Q1H | 60.0 | 70.8 | 83.3 |
| 944L8M | 65.8 | 78.3 | 85.0 |
| 7601W8J | 70.0 | 79.2 | 91.7 |
| 7602G5V | 61.7 | 69.2 | 80.0 |
| 7603A1D | 60.0 | 68.3 | 74.2 |
| 7604P0K | 58.3 | 68.3 | 79.2 |
| 7605L6Y | 60.8 | 65.8 | 73.3 |
| 7606M4R | 56.7 | 61.7 | 67.5 |
| CLARITY | 56.7 | 70.8 | 82.5 |
| 962P0H | 63.3 | 66.7 | 74.2 |

The ANOVA summary of formulation mean comparisons by rate indicated that at 140 g/L and 280 g/L 944L8M was more efficacious than CLARITY. Formulation 7601W8J was more efficacious than CLARITY at all 3 rates tested. At more than one rate, formulations 7605L6Y and 7606M4R were less efficacious than CLARITY.

Potassium dicamba formulations from Table 1 b, CLARITY, and 480 g/L MEA dicamba were tested for their post-emergent control of 15 cm velvetleaf at 70, 140, 280 and 560 grams a.e./ha. The results of the efficacy trial in % control at 22 DAT are reported in Table 1n.

TABLE 1n

| Form. | 70 g ae/ha | 140 g ae/ha | 280 g ae/ha | 560 g ae/ha |
|---|---|---|---|---|
| 7191U4V | 31.7 | 55.0 | 65.8 | 79.2 |
| 7192E8K | 40.0 | 55.8 | 65.8 | 78.3 |
| 7193E3C | 45.0 | 56.7 | 65.8 | 73.3 |
| 7194R5X | 32.5 | 51.7 | 62.5 | 75.0 |
| 7195O7T | 42.5 | 64.2 | 70.0 | 84.2 |
| 7196M9K | 38.3 | 49.2 | 74.2 | 87.5 |
| CLARITY | 29.2 | 55.8 | 65.0 | 75.8 |
| 962P0H | 37.5 | 55.0 | 67.5 | 76.7 |

All experimental formulations of potassium dicamba with polyimine polymers from Table 1n provided equivalent or superior control of ABUTH compared to CLARITY.

Potassium dicamba formulations from Table 1b, CLARITY, 962P0H, and 931F5L were tested for their post-emergent control of 15 cm velvetleaf at 70, 140, 280 and 560 grams a.e./ha. The results of the efficacy trial in % control at 22 DAT are reported in Table 1o TABLE 1o

| Form. | 70 g ae/ha | 140 g ae/ha | 280 g ae/ha | 560 g ae/ha |
|---|---|---|---|---|
| 1381X4R | 55.8 | 62.5 | 68.3 | 84.2 |
| 1382P2H | 52.5 | 62.5 | 65.8 | 80.8 |
| 1383T5B | 48.3 | 59.2 | 67.5 | 78.3 |
| 1384U5U | 50.0 | 62.5 | 67.5 | 80.8 |
| 1385A4S | 55.8 | 61.7 | 68.3 | 81.7 |
| 1386J7G | 54.2 | 65.0 | 66.7 | 81.7 |
| CLARITY | 50.8 | 63.3 | 72.5 | 85.8 |
| 931F5L | 55.8 | 62.5 | 69.2 | 83.3 |
| 962P0H | 50.0 | 65.0 | 70.8 | 85.0 |

The efficacy of certain application mixtures from Table 1b, CLARITY, 962PoH and 931F5L were evaluated on velvetleaf (ABUTH). For each trial, dicamba was applied post-emergent to 15 cm velvetleaf at rates of 140, 280 and 560 grams a.e./ha. The results of the efficacy trial in % control at 22 DAT are reported in Table 1p.

TABLE 1p

| Form. | 140 g ae/ha | 280 g ae/ha | 560 g ae/ha |
|---|---|---|---|
| 8145A6B | 60.0 | 76.7 | 91.7 |
| 8145B7U | 56.7 | 79.2 | 90.0 |
| 8145C2Z | 51.7 | 75.0 | 90.0 |
| 8146A8A | 64.2 | 79.2 | 92.5 |
| 8146B2K | 58.3 | 81.7 | 92.5 |
| 8146C9K | 64.2 | 73.3 | 90.8 |
| 8147A1E | 58.3 | 82.5 | 92.5 |
| 8147B8N | 58.3 | 79.2 | 92.5 |
| 8147C4F | 55.8 | 80.0 | 91.7 |
| Clarity | 50.8 | 66.7 | 90.0 |
| 931F5L | 61.7 | 75.8 | 90.8 |
| 962P0H | 55.0 | 75.8 | 93.3 |

At 140 and 280 grams a.e./ha all experimental formulations from Table 1b provided equivalent or superior control of ABUTH in comparison to CLARITY. At 540 grams a.e./ha all experimental formulations from Table 1p were equivalent to CLARITY.

Example 2

Aqueous formulations comprising MEA dicamba and various coco and tallow di- and tri-amine ethoxylates were prepared as indicated in Table 2a wherein the dicamba concentration in each formulation was 633 g a.e./ha (47.9 wt % a.e.) and the concentration of the other components in wt % is indicated in parenthesis.

TABLE 2a

| Formulation | 504A3F | 504B5T | 504C8N | 504D3J |
|---|---|---|---|---|
| MEA Dicamba | 61 | 61 | 61 | 61 |
| Surfactant (wt %) | Surf9 (10) | Surf10 (10) | Surf11 (10) | Surf12 (10) |
| Formulation | 504E7C | 504F2I | 504G0L | 504H6T |
| MEA Dicamba | 61 | 61 | 61 | 61 |
| Surfactant (wt %) | Surf13 (10) | Surf14 (10) | Surf15 (10) | Surf16 (10) |
| Formulation | 504I8L | 504J4P | 504K1B | 504L9O |
| MEA Dicamba | 61 | 61 | 61 | 61 |
| Surfactant (wt %) | Surf17 (10) | Surf18 (10) | Surf19 (10) | Surf20 (10) |
| Formulation | 504M6K | 504N5U | 504O7X | 50P1F |
| MEA Dicamba | 61 | 61 | 61 | 61 |
| Surfactant (wt %) | Surf21 (10) | Surf22 (10) | Surf23 (10) | Surf24 (10) |
| Formulation | 504Q3D | 504R6E | 504S9M | 504T7Q |
| MEA Dicamba | 61 | 61 | 61 | 61 |
| Surfactant (wt %) | Surf25 (10) | Surf26 (10) | Surf27 (10) | Surf28 (10) |

The formulations from Table 2a and CLARITY were sprayed over the top of velvetleaf (ABUTH) plants evaluate herbicidal efficacy at application rates of 140, 280 and 561 g a.e./ha in the equivalent of 93 liters per hectare (L/ha) water. Herbicidal efficacy was evaluated at 22 days after treatment (DAT). The data is presented in Table 2b in an ANOVA summary of formulations mean comparisons by rate.

TABLE 2b

| Formulation | 140 g a.e./ha | 280 g a.e./ha | 561 g a.e./ha |
|---|---|---|---|
| CLARITY | 42.5 | 59.2 | 79.2 |
| 926Y7O | 45 | 58.3 | 79.2 |
| 504A3F | 45 | 64.2 | 80 |
| 504B5T | 42.5 | 63.3 | 82.5 |
| 504C8N | 45 | 64.2 | 83.3 |
| 504D3J | 49.2 | 65 | 83.3 |
| 504E7C | 48.3 | 63.3 | 77.5 |
| 504F2I | 44.2 | 61.7 | 78.3 |
| 504G0L | 49.2 | 66.7 | 80.8 |
| 504H6T | 49.2 | 63.3 | 78.3 |
| 504I8L | 49.2 | 65.8 | 79.2 |
| 504J4P | 50 | 68.3 | 81.7 |
| LSD | 4.1 | 4.5 | 4.9 |
| CLARITY | 46.7 | 69.2 | 85 |
| 926Y7O | 55 | 71.7 | 89.7 |
| 504K1B | 52.5 | 77.5 | 89.2 |
| 504L9O | 53.3 | 76.7 | 90.5 |

TABLE 2b-continued

| Formulation | 140 g a.e./ha | 280 g a.e./ha | 561 g a.e./ha |
|---|---|---|---|
| 504M6K | 49.2 | 73.3 | 90.8 |
| 504N5U | 51.7 | 80 | 90.5 |
| 504O7X | 60 | 72.5 | 88.3 |
| 50P1F | 52.5 | 71.7 | 90.5 |
| 504Q3D | 55 | 76.7 | 88.3 |
| 504R6E | 54.2 | 71.7 | 91 |
| 504S9M | 46.7 | 72.5 | 87.5 |
| 504T7Q | 53.3 | 71.7 | 87.2 |
| LSD | 5.7 | 3.8 | 4.7 |

The experimental formulations were generally more efficacious than the CLARITY standard. None of the surfactants provided a clear efficacy advantage on ABUTH at higher application rates. At lower application rates, the Ethomeen YT series of surfactants provided good ABUTH efficacy.

Example 3

The specific gravity and pH of potassium and MEA dicamba aqueous solutions were evaluated. The results are reported in Table 3a wherein "Dicamba wt %" refers to weight percent acid equivalent dicamba in solution and "SG" refers to specific gravity in grams per mL. The pH of MEA dicamba was measured for two lots of material.

TABLE 3a

| Dicamba | K Dicamba | | MEA Dicamba | | | g |
|---|---|---|---|---|---|---|
| wt % | SG | pH | SG | pH | pH | a.e./L |
| 5 | 1.03 | 5.4 | 1.02 | 6.6 | 8.3 | — |
| 10 | 1.05 | 5.4 | 1.05 | 6.7 | 8.4 | — |
| 15 | 1.09 | 5.4 | 1.07 | 6.8 | 8.5 | — |
| 20 | 1.12 | 5.9 | 1.09 | 6.9 | 8.55 | — |
| 25 | 1.15 | 6.3 | 1.12 | 7 | 8.6 | — |
| 30 | 1.18 | 6.5 | 1.14 | 7.1 | 8.65 | 291 |
| 35 | 1.22 | 6.8 | 1.17 | 7.3 | 8.7 | 391 |
| 40 | 1.25 | 7 | 1.2 | 7.4 | 8.8 | 478 |
| 45 | 1.29 | 7.3 | 1.23 | 7.5 | 8.85 | 554 |
| 50 | 1.33 | 7.6 | 1.25 | 7.6 | 8.9 | 623 |
| 55 | 1.36 | 7.8 | 1.28 | 7.7 | 8.95 | 684 |
| 60 | 1.4 | 8.1 | 1.31 | 7.8 | 9 | 741 |

The data indicate that solutions of potassium dicamba have a greater specific gravity and lower pH at a given concentration than do solutions of MEA dicamba.

In a set of experiments, the crystallization behavior of formulations containing MEA dicamba, potassium glyphosate and a surfactant was evaluated. The formulation of the experimental dicamba formulations are indicated in Table 3b below where dicamba concentration is reported in wt % a.e., the surfactant concentration is reported in wt %, "SG" refers to specific gravity (20/18.6), "Ratio K:MEA" refers to the ratio (a.e. basis) of potassium glyphosate to MEA dicamba, "surf" refers to surfactant, and "Xtals" refers to crystals. Approximately 3-5 mL of each solution was placed into a 60 mL jar and left uncovered in a fume hood to dry at ambient humidity and temperature. The solutions were visually observed periodically for the presence of crystalline residue as the water evaporated from the solution.

TABLE 3b

| Form. | 957A | 857A | 858A | 858B | 859A |
|---|---|---|---|---|---|
| Ratio K:MEA | 0:1 | 1:1 | 3:1 | 1:3 | 1:0 |
| K-gly wt % a.e. | 0 | 23.6 | 36.1 | 12.1 | 46.3 |
| MEA-dicamba wt % a.e. | 61 | 23.6 | 12.1 | 36.1 | 0 |
| surf. | none | surf3 | surf3 | surf3 | surf3 |
| wt % surf | 0 | 10 | 10 | 10 | 10 |
| SG | 1.2606 | 1.2859 | 1.249 | 1.2913 | |
| Xtals @1 day | no | yes | yes | no | yes |
| Xtals @3 days | no | yes | yes | no | yes |
| Xtals @20 days | no | yes | yes | no | yes |

| Form. | 864 | 865 | 866 | 867 |
|---|---|---|---|---|
| Ratio K:MEA | 3:1 | 1:3 | 1:1 | 1:0 |
| K-gly wt % a.e. | 35 | 12.1 | 23.9 | 46.5 |
| MEA-dicamba wt % a.e. | 11.6 | 36.1 | 23.9 | 0 |
| surf. | surf2 | surf2 | surf2 | surf2 |
| wt % surf | 9.3 | 9.3 | 9.3 | 9.3 |
| SG | 1.2839 | 1.2589 | 1.276 | 1.3049 |
| Xtals @1 day | yes | no | no | yes |
| Xtals @3 days | yes | no | yes | yes |
| Xtals @20 days | yes | no | yes | yes |

In a second set of experiments, the crystallization behavior of formulations containing MEA dicamba, potassium glyphosate, a surfactant and 5 wt % glycerine was evaluated. The formulation of the experimental dicamba formulations is indicated in Table 3c. The method described above for the date in Table 3b was used for crystallization evaluation.

TABLE 3c

| Form | 877 | 878 | 879 |
|---|---|---|---|
| Ratio K:MEA | 1:0 | 1:0 | 1:0 |
| K-gly wt % a.e. | 46.4 | 46.4 | 46.4 |
| MEA-dicamba wt % a.e. | 0 | 0 | 0 |
| surf. | surf2 | surf1 | surf3 |
| wt % surf | 10 | 10 | 10 |
| wt % glycerin | 5 | 5 | 5 |
| SG | 1.3189 | 1.3227 | 1.3082 |
| Xtals @3 days | yes | yes | yes |

Example 4

The volatility of the sodium, potassium, DMA, MEA, IPA and DGA salts of dicamba contained in aqueous formulations were measured in distillation experiments.

Solutions of each of the sodium, potassium, DMA, MEA, IPA and DGA salts of dicamba were prepared as 10% stock solutions at a mole ratio of approximately 1:1 dicamba acid to base. To alter the pH, either dicamba acid was added or base was added. The pH was measured on a standard Orion Model 320 pH meter of each neat solution. For the distillations, the salt solutions were diluted to obtain a dicamba concentration of 5%, 2%, and 1% a.e. while compensating for any added base or dicamba acid to adjust pH. The Diglycolamine salt solutions were prepared using Clarity®, a 38.5% a.e. dicamba solution.

Simple distillation using a short path still was used to collect the water distillate containing the dicamba in the vapor phase of the salt solutions. A 50 mL distillation flask was used. The distillation receiver was a "cow" type with four 2 mL graduated sections. The solutions were heated at the 30% setting of the GlassCol heating unit and the boiling point of each distillation was noted. The first 2 ml of distillate was collected, and the receiver rotated to avoid collection of any further distillate in that section as the distillation flask cooled. The 2 mL sample was quantitatively transferred by pipette to HPLC vials for later analysis. Between each distillation the distillation apparatus was washed with 10 volumes of tap water, 10 volumes of distilled water, rinsed with acetone, and dried in a 60° C. oven. Each distillation was run in triplicate.

The distillate was collected and analyzed for dicamba concentration using HPLC/Mass Spectroscopy (MS). The HPLC column was an Agilent Zorbax Eclipse XDB-C8, 4.6×150 mm, 5u, PN 993967-90. Mobile phase A was 0.1% formic acid in D.I. water. Mobile phase B was 0.1% formic acid in acetonitrile. A flow rate of 1.2 mL/min was used and an injection volume of 5, 10, 15 or 25 ul was used depending on the dicamba level in the sample. The following gradient was used:

| Time | % A | % B |
|------|-----|-----|
| 0    | 100 | 0   |
| 7.5  | 0   | 100 |
| 10   | 0   | 100 |
| 10.1 | 100 | 0   |
| 15   | 100 | 0   |

The MS parameters were as follows: Type SIR; ES-ion mode; 0.05 second inter channel delay; 0.05 second inter-scan time; 0.5 span (Da); 10 minutes elapsed time; and 6-6000 ppb calibration range. Channel 1 mass was 175 (Da); Dwell was 0.25(s); Cone(V)=tune and; 0.05(s) delay. Channel 2 mass was 177 (Da); Dwell was 0.25(s); Cone(V)=tune and; 0.05(s) delay.

Differences in the amount of dicamba in the distillate of dicamba salt solutions were found with changing cation, concentration, and pH. Tables 4a through 4f summarize the data for all experiments. These tables show the mean values of Dicamba concentration in the distillate from the triplicate distillations. The standard deviation is shown.

TABLE 4a

Distillation and liquid chromatography/mass spectroscopy (LC/MS) results for Na Dicamba salt solution at varying pH and concentration.

| Salt | % a.e. Dicamba | Solution pH | Mean Dicamba in Distillate (ppm) | Standard Dev |
|------|------|-------|-------|-------|
| Na | 5% | 3.36 | 11.57 | 0.498 |
| Na | 5% | 4.34 | 2.36 | 0.047 |
| Na | 5% | 6.32 | 0.77 | 0.186 |
| Na | 5% | 10.36 | 0.45 | 0.044 |
| Na | 5% | 12.15 | 0.22 | 0.071 |
| Na | 2% | 3.33 | 5.74 | 0.337 |
| Na | 2% | 4.29 | 1.39 | 0.486 |
| Na | 2% | 6.28 | 0.32 | 0.165 |
| Na | 2% | 9.93 | 0.16 | 0.074 |
| Na | 2% | 11.50 | 0.15 | 0.077 |
| Na | 1% | 3.31 | 3.42 | 1.174 |
| Na | 1% | 4.25 | 0.70 | 0.117 |
| Na | 1% | 6.19 | 0.13 | 0.013 |
| Na | 1% | 9.82 | 0.09 | 0.022 |
| Na | 1% | 11.15 | 0.06 | 0.020 |

TABLE 4b

Distillation and LC/MS results for MEA Dicamba salt solution at varying pH and concentration.

| Salt | % a.e. Dicamba | Solution pH | Mean Dicamba in Distillate (ppm) | Standard Dev |
|------|------|-------|-------|-------|
| MEA | 5% | 3.61 | 4.58 | 0.165 |
| MEA | 5% | 4.44 | 1.71 | 0.518 |
| MEA | 5% | 6.87 | 0.54 | 0.068 |
| MEA | 5% | 8.03 | 0.27 | 0.054 |
| MEA | 5% | 9.32 | 0.33 | 0.151 |
| MEA | 2% | 2.90 | 12.05 | NA |
| MEA | 2% | 4.81 | 0.48 | NA |
| MEA | 2% | 4.89 | 0.36 | NA |
| MEA | 2% | 6.4 | 0.4 | NA |
| MEA | 2% | 7.25 | 0.25 | NA |
| MEA | 2% | 8.03 | 0.18 | NA |
| MEA | 2% | 9.21 | 0.1 | NA |
| MEA | 1% | 3.68 | 1.39 | 0.208 |
| MEA | 1% | 4.34 | 0.39 | 0.075 |
| MEA | 1% | 6.81 | 0.37 | 0.218 |
| MEA | 1% | 7.84 | 0.08 | 0.019 |

TABLE 4c

Distillation and LC/MS results for DGA Dicamba salt solution at varying pH and concentration

| Salt | % a.e. Dicamba | Solution pH | Mean Dicamba in Distillate (ppm) | Standard Dev |
|------|------|-------|-------|-------|
| DGA | 5% | 4.57 | 2.11 | 1.154 |
| DGA | 5% | 6.35 | 0.75 | 0.174 |
| DGA | 5% | 8.26 | 0.58 | 0.082 |
| DGA | 5% | 9.03 | 0.32 | 0.094 |
| DGA | 2% | 4.17 | 1.10 | 0.275 |
| DGA | 2% | 6.44 | 0.31 | 0.081 |
| DGA | 2% | 8.22 | 0.28 | 0.129 |
| DGA | 2% | 8.92 | 0.19 | 0.028 |
| DGA | 1% | 4.23 | 0.46 | 0.032 |
| DGA | 1% | 6.48 | 0.18 | 0.009 |
| DGA | 1% | 8.24 | 0.13 | 0.030 |
| DGA | 1% | 8.88 | 0.12 | 0.013 |

TABLE 4d

Distillation and LC/MS results for IPA Dicamba salt solution at varying pH and concentration

| Salt | % a.e. Dicamba | Solution pH | Mean Dicamba in Distillate (ppm) | Standard Dev |
|------|------|-------|-------|-------|
| IPA | 5% | 3.44 | 5.85 | 0.785 |
| IPA | 5% | 4.33 | 3.14 | 0.482 |
| IPA | 5% | 4.94 | 3.77 | 1.081 |
| IPA | 5% | 8.24 | 2.47 | 0.170 |
| IPA | 5% | 9.28 | 12.57 | 1.502 |
| IPA | 2% | 3.37 | 3.65 | 1.132 |
| IPA | 2% | 4.36 | 1.42 | 0.625 |
| IPA | 2% | 5.10 | 0.94 | 0.344 |
| IPA | 2% | 8.13 | 0.75 | 0.118 |
| IPA | 2% | 9.20 | 3.43 | 1.034 |
| IPA | 1% | 3.41 | 1.42 | 0.283 |
| IPA | 1% | 4.40 | 0.42 | 0.036 |
| IPA | 1% | 5.13 | 0.37 | 0.082 |
| IPA | 1% | 8.10 | 0.72 | 0.575 |
| IPA | 1% | 9.13 | 1.22 | 0.088 |

TABLE 4e

Distillation and LC/MS results for DMA Dicamba salt solution at varying pH and concentration

| Salt | % a.e. Dicamba | Solution pH | Mean Dicamba in Distillate (ppm) | Standard Dev |
|---|---|---|---|---|
| DMA | 5% | 3.18 | 20.10 | 3.212 |
| DMA | 5% | 4.22 | 2.67 | 0.550 |
| DMA | 5% | 5.58 | 2.06 | 1.184 |
| DMA | 5% | 8.69 | 8.43 | 1.001 |
| DMA | 5% | 10.17 | 12.34 | 2.335 |
| DMA | 2% | 3.20 | 9.19 | 1.315 |
| DMA | 2% | 4.25 | 1.08 | 0.087 |
| DMA | 2% | 5.97 | 0.83 | 0.161 |
| DMA | 2% | 8.66 | 1.98 | 0.104 |
| DMA | 2% | 10.24 | 4.88 | 3.060 |
| DMA | 1% | 3.25 | 4.50 | 0.566 |
| DMA | 1% | 4.36 | 0.57 | 0.052 |
| DMA | 1% | 6.11 | 0.30 | 0.103 |
| DMA | 1% | 8.53 | 0.73 | 0.079 |
| DMA | 1% | 10.12 | 1.32 | 0.543 |

TABLE 4f

Distillation and LC/MS results for Dicamba acid solution with varying concentration

| wt % a.e. dicamba | pH | Dist ppm | Std Dev |
|---|---|---|---|
| 0.5 | 1.84 | 19.6 | 5.3 |
| 1 | <1.2 | 56.5 | 21.4 |
| 2 | <1.2 | 151.1 | 11.2 |

For all of the solutions studied, as the concentration of Dicamba in the solution increased, the amount of Dicamba in the distillate increased. The data suggests that pH significantly affects the amount of Dicamba entering the vapor phase. In distillations with salts of Na, K, MEA, and DGA, as the pH is increased, the amount of Dicamba measured in the distillate is decreased. With the IPA and DMA salts, this trend holds until the pH is 6-7, but at a higher pH values, the amount of Dicamba measured in the distillate is increased. The data show that the low volatility cation salts, Na, K, MEA and DGA, all have similar volatilities at a given pH. In one explanation, the more volatile cations IPA and DMA show more dicamba in the distillate at higher pH because as the solution distills, a significant amount of the cation (DMA or IPA) is distilling from the solution. This leads to an effectively lower pH in the solution being distilled and a resultant higher amount of dicamba being distilled from the solution. Another possible explanation is that the volatile cations are co-distilling from the solutions with dicamba, particularly when the original pH of the distillation solution is greater than 7.

To investigate the increased volatility with the DMA salt at a pH greater than about 6 to 7, the concentration of the amine was measured in the distillate in a separate experiment, and is shown in Table 4g. The data shows that at higher pH there is a larger amount of amine entering the vapor phase. It is also significant to note that at an acidic pH (3.6) there was no detectable amine in the distillate by HPLC analysis. The data also show a resulting lowering of the pH from the solution in the distillation flask from loss of amine as one might expect from distillation of the base from the solution.

TABLE 4g pH and concentration of dimethylamine after distillation of 5% a.e. DMA Dicamba solutions

| Starting Solution pH | pH Solution After Distillation | ppm DMA in Distillate |
|---|---|---|
| 3.60 | 3.58 | Undetectable |
| 8.20 | 7.04 | 400 ppm |
| 10.10 | 6.4 | 5000 ppm |

Table 4h provides a summary of dicamba in the distillate of 5% a.e. Dicamba solutions at approximately neutral pH. While it is difficult to directly compare the values as the pH of each solution is slightly different, the relative difference are clear that the more volatile amine salts have a higher concentration of dicamba in the distillate compared to the lower volatile cation salts DGA Na, K, and MEA. These lower volatility salts also showed a pH dependent trend of lower amounts of dicamba in the distillate as the pH increases.

TABLE 4h

Dicamba concentration in distillate for 5% a.e. salt solutions at the near neutral pH

| Salt | pH | ppm Dicamba in distillate |
|---|---|---|
| Na | 6.32 | 0.8 |
| K | 7.06 | 0.6 |
| MEA | 6.87 | 0.5 |
| MEA | 8.03 | 0.3 |
| DGA | 6.35 | 0.8 |
| DGA | 8.26 | 0.6 |
| DMA | 5.58 | 2.1 |
| DMA | 8.69 | 8.4 |
| IPA | 8.24 | 2.5 |

In a further set of experiments, measurements of dicamba concentration in the gas phase (air) above 38.5 wt % a.e. solutions of various dicamba salts was measured. 5 mL of each sample of dicamba was placed into a 50 mL plastic centrifuge tube with four holes approximately ⅛ in diameter drilled into the tube at the 10 mL line. A 22 mm×30 mm PUF (SKC ct. #226-124) was placed into a glass tube of app. 20 mm diameter with parafilm wrapped around the outside to obtain a snug fit into the top of the centrifuge tube. A hose was connected to the other end of the glass tube leading to a vacuum line. The air flow was regulated to app. 2 L/min using a flow controller (about 0.4 L air/min-mL sample). Air was pulled through the tube at app. 1 L/min for approximately 1 day. Note that the air conditions of flow rate, temperature, pressure and composition (e.g., relative humidity) are not narrowly critical as long as the various samples are analyzed under similar conditions. For instance, air at from about 5° C. to about 40° C., from about 0.5 to about 1.5 bar pressure, from about 0% to about 95% relative humidity, and at a flow rate of from about 0.1 to 10 L/min-mL sample could be suitably used for volatility analysis. The PUF was removed from the glass tube, extracted with 20 mL methanol and the resulting solution analyzed for dicamba concentration by LC-MS. The results are shown in Table 4i below where "wt % a.e." refers to the dicamba concentration, "µg/mL" refers to the dicamba concentration in the distillate, "µg dicamba" refers to the total dicamba extracted from the PUF by 20 mL methanol, and "ng/L air" and "moles/L air" refer to the dicamba concentration in the gas phase above the solution.

TABLE 4i

| Dicamba salt | wt % a.e. | µg/mL | µg dicamba | ng/L air | moles/L air |
|---|---|---|---|---|---|
| sodium (pH 2.7) | 35.8 | 3.55 | 71 | 9.86 | $4.46 \times 10^{-11}$ |
| potassium (pH 10.5) | 35.8 | 0.24 | 4.8 | 0.67 | $3.02 \times 10^{-12}$ |
| MEA | 35.8 | 0.02 | 0.4 | 0.056 | $2.51 \times 10^{-13}$ |
| BANVEL (DMA salt) | 40 | 0.42 | 8.4 | 1.17 | $5.28 \times 10^{-12}$ |
| dicamba acid | 99 | 15.3 | 305.4 | 42.4 | $1.92 \times 10^{-10}$ |

The MEA salt showed a dicamba concentration in the gas phase above the solution lower than the acid or the sodium, potassium and DMA salts. Notably, the MEA salt had a gas concentration on the order of 20 times less than the commercial product BANVEL.

In a further set of experiments, measurements of dicamba concentration in the gas phase (air) above 10 wt % a.e. solutions of various MEA dicamba formulations and CLARITY (DGA dicamba salt) was measured. The method was as follows:

Equipment: Polyurethane Foam (PUF) plug approximately 22 mm×30 mm available from SKC Inc., cat. No. CPM100108-003; 50 mL PET, Centrifuge tube, Corning cat No. 430290, with a hole drilled into the wall app. ½ inch above the 20 mL line on the tube with a ⅛ inch drill bit; Glass tube to hole the PUF app. 30 mm iD with a nipple on one end to attach to a Tygon Tube; Ring Stand; Parafilm; Air Pump; Constant Humidity/temperature chamber, such as a growth chamber or Incubator; Solutions of dicamba.

Procedure: The procedure took place in a growth chamber at a temperature of 35° C. and relative humidity of 30%. A PUF was placed into the glass tube. The top of the tube was wrapped with parafilm such that it would fit snuggly into the top of the centrifuge tube. 10 mL of the dicamba a.e. solution prepared to be approximately 20% a.e. dicamba was placed into the centrifuge tube. The tube was attached to the ring stand and held in a vertical position. The glass tube was fitted into the top of the centrifuge tube. A tygon tube was connected to the nipple on the glass tube. This tube was connected to an air pump through a needle valve to control the air flow at 2 liters per minute (about 0.2 L air/min-mL sample). The air pump was started and air pulled through the tube for 24 hours. After 24 hours, the pump was turned off and the PUF removed from the glass tube. The PUF was placed into 20 mL of methanol to extract the dicamba. The amount of dicamba was quantified by LC/Mass Spectrometric analysis.

The results are shown in Table 4j below wherein formulations 506C3N, 5851AR and 566E7H each contained Lupasol SK polymer (poly5) at a 1:1 weight ratio of dicamba a.e. to polymer and formulations 5851 BT and 565B8I each contained dicamba MEA in the absence of polymer. The reported results for formulation 506C3N is the average of 6 samples, each tested in duplicate, and the remaining results represent the average of 4 samples, each tested in duplicate. In the table, "S.D." refers to standard deviation, "% RSD" refers to percent relative standard deviation and "Form. pH" refers to the pH of the dicamba formulation.

TABLE 4j

| Form. | Dicamba (ng/L) | Dicamba (ng/L) S.D. | % RSD | Form. pH |
|---|---|---|---|---|
| 506C3N | 0.111 | 0.049 | 44.05 | 8.26 |
| CLARITY | 0.696 | 0.066 | 9.50 | 6.94 |
| 5851AR | 0.036 | 0.010 | 27.42 | 9.43 |
| 5851BT | 0.047 | 0.017 | 35.77 | 9.62 |
| CLARITY | 0.611 | 0.072 | 11.78 | 6.94 |
| 566E7H | 0.138 | 0.088 | 63.61 | 6.92 |
| 565B8I | 1.513 | 0.172 | 11.34 | 7.16 |

The data indicate that Lupasol reduced MEA dicamba volatilization by about 25% at a pH of about 9.5 and by about 1000% at a pH of about 7.

In a further set of experiments, measurements of dicamba concentration in the gas phase (air) above 10 wt % a.e. solutions of various MEA dicamba formulations, CLARITY (DGA dicamba salt) and BANVEL (DMA dicamba salt) were measured and are reported in Table 4k below. The method was as described above for the data of Table 4j. The reported results are the average of 4 or 6 samples, each tested in duplicate. In the table, "Form." refers to formulation number, "ng/L" refers to the dicamba concentration above the 10 wt % a.e. dicamba solutions, "SD" refers to standard deviation, "pH" refers to the pH of the formulation, "Test mL" refers to the volume of dicamba solution tested and "Ratio" refers to the weight ratio of dicamba a.e. to polymer where the identity of the polymer is indicated in parentheses.

TABLE 4k

| Form. | ng/L | SD | pH | Test mL | Ratio (polymer) |
|---|---|---|---|---|---|
| CLARITY | 0.65 | 0.08 | 6.9 | 10 | no polymer |
| CLARITY | 1.17 | 0.06 | 6.98 | 20 | no polymer |
| CLARITY | 0.41 | 0.02 | 7.8 | 10 | no polymer |
| CLARITY | 0.05 | 0.02 | 7.8 | 10 | 8:1 (poly5) |
| BANVEL | 3.43 | 1.59 | 6.14 | 10 | no polymer |
| BANVEL | 5.68 | 2.21 | 6.38 | 20 | no polymer |
| BANVEL | 1.53 | 0.32 | 8.1 | 10 | no polymer |
| 565K8T | 16.53 | 0.94 | 3.2 | 10 | no polymer |
| 565L9U | 1.78 | 0.20 | 6.06 | 10 | no polymer |
| 565M7G | 0.88 | 0.12 | 6.12 | 10 | no polymer |
| 565N3K | 1.22 | 0.10 | 7.08 | 10 | no polymer |
| 565B8X | 1.51 | 0.17 | 7.16 | 10 | no polymer |
| 565B8X | 3.56 | 0.59 | 7.17 | 20 | no polymer |
| 565O2V | 0.48 | 0.05 | 8.01 | 10 | no polymer |
| 957Y2S | 0.98 | 0.31 | 8.44 | 20 | no polymer |
| 565C6L | 0.38 | 0.13 | 8.53 | 10 | no polymer |
| 565D0J | 0.19 | 0.04 | 9.04 | 20 | no polymer |
| 5851BR | 0.05 | 0.02 | 9.62 | 10 | no polymer |
| 565CC8I7 | 0.21 | 0.04 | 7.09 | 10 | 8:1 (poly1) |
| 565DD2K9 | 0.17 | 0.03 | 8.05 | 10 | 8:1 (poly1) |
| 565EE3E2 | 0.05 | 0.01 | 9.12 | 10 | 8:1 (poly1) |
| 565P5G | 0.17 | 0.01 | 5.73 | 10 | 8:1 (poly5) |
| 566E6Y | 0.14 | 0.09 | 6.92 | 10 | 8:1 (poly5) |
| 506C7J | 0.25 | 0.08 | 8.23 | 20 | 8:1 (poly5) |
| 506C7J | 0.54 | 0.18 | 8.24 | 10 | 8:1 (poly5) |
| 506D9P | 0.18 | 0.05 | 8.74 | 20 | 8:1 (poly5) |
| 5851AT | 0.04 | 0.01 | 9.43 | 10 | 8:1 (poly5) |
| 565Q9L | 1.10 | 0.24 | 7.19 | 10 | 100:1 (poly5) |
| 565R7F | 0.31 | 0.09 | 8.03 | 10 | 100:1 (poly5) |
| 565S3T | 0.06 | 0.01 | 8.98 | 10 | 100:1 (poly5) |
| 565T4V | 0.44 | 0.03 | 7.62 | 10 | 20:1 (poly5) |
| 565U8S | 0.20 | 0.10 | 8.24 | 10 | 20:1 (poly5) |
| 565V7M | 0.05 | 0.02 | 9.25 | 10 | 20:1 (poly5) |
| 565W0J | 0.50 | 0.15 | 7.19 | 10 | 100:1 (poly2) |
| 565Y1U | 0.25 | 0.06 | 9.03 | 10 | 100:1 (poly2) |
| 565X3Y | 0.06 | 0.03 | 9.00 | 10 | 100:1 (poly2) |
| 565Z5R | 0.34 | 0.28 | 7.37 | 10 | 20:1 (poly2) |
| 565AA3B | 0.14 | 0.04 | 8.26 | 10 | 20:1 (poly2) |
| 565BB7H | 0.04 | 0.02 | 9.17 | 10 | 20:1 (poly2) |

The results indicate that polymer reduces dicamba volatility. At pH 7, even a 100:1 weight ratio of dicamba a.e. to polymer provided a small volatility reduction.

Example 5

Aqueous formulations comprising 601 g a.e./L MEA dicamba (48.3 wt % a.e.) were combined with from 1 to 10 wt % polyimine polymers having a range of molecular weights as indicated in Table 5a below. Each of the formulations was a clear solution.

TABLE 5a

|  | Component 1 | | Component 2 | |
| --- | --- | --- | --- | --- |
| Formulation | Polymer | wt % | Surfactant | wt % |
| 151J6M | — | — | — | — |
| 152F5X | — | — | Surf3 | 6 |
| 153P0L | Poly1 | 5 | — | — |
| 154V4V | Poly1 | 5 | Surf3 | 6 |
| 161L8I | Poly2 | 5 | — | — |
| 162N4R | Poly2 | 5 | Surf3 | 6 |
| 163L1K | Poly3 | 5.7 | — | — |
| 164A2D | Poly3 | 5 | Surf3 | 6 |
| 171H3P | Poly4 | 7.6 | — | — |
| 172G5F | Poly4 | 7.6 | Surf3 | 6 |

The formulations from Table 5a, previously described formulations 962P0H, 926Y7O, 956N5T, formulation 962-2A (containing 480 g a.e./L (40 wt % a.e.) MEA dicamba with no surfactant, and CLARITY were applied postemergence at rates of 140, 280 and 561 g a.e./ha on 10-15 cm high Velvetleaf and evaluated 18 days after treatment. The results in % control are reported in Table 5b below.

TABLE 5b

| Formulation | 140 g a.e./ha | 280 g a.e./ha | 561 g a.e./ha |
| --- | --- | --- | --- |
| CLARITY | 58.3 | 86.7 | 91.8 |
| 962P0H | 52.5 | 86.7 | 91.7 |
| 962-2A | 70.8 | 87.5 | 93 |
| 926Y7O | 65.8 | 85 | 95.7 |
| 956N5T | 65.8 | 86.7 | 94.3 |
| 151J6M | 70.8 | 87.5 | 93 |
| 152F5X | 62.5 | 86.7 | 95.2 |
| 153P0L | 70.8 | 87.5 | 93 |
| 154V4V | 68.3 | 88.3 | 91.7 |
| 161L8I | 72.5 | 85 | 92.2 |
| 162N4R | 58.3 | 85 | 97.5 |
| 163L1K | 73.3 | 90 | 91.7 |
| 164A2D | 67.5 | 88.3 | 93 |
| 171H3P | 66.7 | 85.8 | 93.5 |
| 172G5F | 69.2 | 85.8 | 93 |
| LSD | 6.5 | 5.6 | 3.9 |

The bioefficacy data shows an increase in dicamba activity at an application rate of 140 g a.e./ha and no reduction in dicamba activity at application rates of 280 and 561 g a.e./ha for the formulations comprising the polymers as compared to formulations comprising a surfactant in the absence of a polymer or the combination of a surfactant and a polymer. At an application rate of 140 g a.e./ha, formulations 151 J6M, 153P0L, 154V4V, 161L81, 163L1K and 172G5F were significantly more efficacious than CLARITY.

Example 6

Aqueous formulations comprising 600 g a.e./L MEA dicamba (48.3 wt % a.e.) were prepared as indicated in Table 6a below where "Form" refers to formulation. All of the formulations were clear, homogeneous solutions. The formulations were evaluated for spraying characteristics.

TABLE 6a

|  | Component 1 | | Component 2 | |
| --- | --- | --- | --- | --- |
| Form | polymer | wt % | Surfactant | wt % |
| 019A8J | Poly5 | 3.5 | — | — |
| 019B6Y | Poly5 | 3.5 | Surf3 | 6 |
| 019C9J | Poly5 | 6 | — | — |

The formulations from Table 6a, previously described formulations 151J6M, 152F5X, 962P0H, 926Y7O and 956N5T and CLARITY were applied postemergence at rates of 140, 280 and 561 g a.e./ha on 10-15 cm high Velvetleaf and evaluated 18 days after treatment. The results in % control are reported in Table 6b below.

TABLE 6b

| Formulation | 140 g a.e./ha | 280 g a.e./ha | 561 g a.e./ha |
| --- | --- | --- | --- |
| CLARITY | 60.0 | 83.3 | 96.5 |
| 962P0H | 68.3 | 84.2 | 98.5 |
| 926Y7O | 71.7 | 87.5 | 97.7 |
| 956N5T | 70.0 | 92.5 | 96.3 |
| 019A8J | 71.7 | 88.3 | 96.3 |
| 019B6Y | 72.5 | 91.7 | 98.3 |
| 019C9J | 75.8 | 89.2 | 96.7 |
| 151J6M | 75.0 | 87.5 | 95.5 |
| 152F5X | 80.8 | 90.8 | 98.0 |
| LSD | 6.5 | 2.4 | 2.2 |

The formulations and the comparative formulation CLARITY were diluted in water to a dicamba concentration of 0.77 wt % a.e. The diluted formulations were sprayed using the method for greenhouse efficacy testing on plant, as describe above, on water sensitive paper that changes color (to blue) where a spray drop contacts the paper. The CLARITY composition produced more color on the paper as compared to experimental formulations 019A8J, 019B6Y and 019C9J. The experimental formulations show a comparably more consistent drop size, but still provide good coverage over the paper. The results suggest that polyimines may result in fewer fine droplet particles as compared to CLARITY and can therefore provide some drift control properties to the formulations.

Example 7

The cold temperature stability of aqueous formulations comprising 480 g a.e./L MEA dicamba and 5 wt % polymer formulated at varied mole ratios of MEA to dicamba was evaluated. For each test, approximately 50 mL of each formulation was placed into a glass bottle. The bottle were placed in an oven or freezer and evaluated after 1 and 4 weeks of storage and observed for any layering, crystal formation or freezing. The pH was evaluated by measurement after dilution to 1 wt % a.e. dicamba. The formulation of the formulations and test results are reported in Table 7a below wherein "MEA:dicamba" refers to the molar ratio of MEA base to dicamba acid, "stable" refers to no phase separation, "Clr. Sln." refers to clear solution, and "layer" refers to phase separation.

TABLE 7a

| MEA:mol | 0.8:1 | 0.9:1 | 1:1 | 1.1:1 |
| --- | --- | --- | --- | --- |
| pH | 3.87 | 4.77 | 8.19 | 8.94 |
| 60° C. | Clr. Sln. | Stable, Clr. Sln. | Clr. Sln. | Clr. Sln. |
| 50° C. | Stable | Stable | Clr. Sln. | Clr. Sln. |

TABLE 7a-continued

| 0° C. | Clr. Sln. | Clr. Sln. | Clr. Sln. | Layer |
|---|---|---|---|---|
| −10° C. | Clr. Sln. | Clr. Sln. | Clr. Sln. | Layer |
| −20° C. | Frozen | Clr. Sln. | Clr. Sln. | Layer |
| −30° C. | Frozen | Frozen | Frozen | Frozen |

The results indicate that at high pH (8.9) layering occurs while at slightly lower pH (8.2) the formulation is stable.

Example 8

Aqueous formulations comprising 480 and 600 g a.e./L MEA dicamba were formulated with varying amounts of Lupasol SK polymer (poly5). Viscosity was measured at 10° C. using a Haake VT550 viscometer @45 RPM. The viscosity results are reported in Table 8a in centipoise.

TABLE 8a

| Lupasol SK (wt %) | 480 g a.e./L dicamba | 600 g a.e./L dicamba |
|---|---|---|
| 0 | — | 20 |
| 1.5 | — | 105 |
| 2 | 55 | — |
| 3 | — | 280 |
| 4 | 160 | 460 |
| 5 | — | 700 |
| 6 | 335 | — |
| 8 | 650 | — |
| 8.5 | 770 | — |

The data show that the viscosity of a formulation increases with increasing amount of polymer and dicamba salt.

Example 9

The compatibility of MEA dicamba and tank mixes containing MEA dicamba with Roundup WeatherMAX® or Roundup PowerMAX® with the drift control agents Gardian®, Gardian Plus®, Dri-Gard®, Pro-One XL™, Array™, Compadre™, In-Place®, Bronc® Max EDT, EDT Concentrate™, Coverage® and Bronc® Plus Dry EDT was evaluated. Aqueous formulations were prepared as described in Table 9a below where "Form" refers to the formulation, "Drift Cont." refers to the drift control agent, "Amt" refers to the amount, "W.MAX" refers to ROUNDUP WEATHERMAX, and "P.MAX" refers to ROUNDUP POWERMAX.

TABLE 9a

| Form. | Drift Cont. | Amt. | Dicamba | | pH |
|---|---|---|---|---|---|
| | | | ROUNDUP | | |
| 9A | GARDIAN | 0.75 mL | 0.52 g | — | 6.2 |
| 9B | GARDIAN PLUS | 5 mL | 0.52 g | — | 6.72 |
| 9C | DRI-GARD | 1.44 g | 0.52 g | — | 7.16 |
| 9D | PRO-ONE XL | 1.56 g | 0.52 g | — | 6.74 |
| 9E | ARRAY | 1.68 g | 0.52 g | — | 7.25 |
| | | | W.MAX | | |
| 9F | GARDIAN | 0.75 mL | 1 g | 3 g | 5.13 |
| 9G | GARDIAN PLUS | 5 mL | 1 g | 3 g | 5.01 |
| 9H | DRI-GARD | 1.44 g | 1 g | 3 g | 4.97 |
| 9I | PRO-ONE XL | 1.56 g | 1 g | 3 g | 4.98 |
| 9J | ARRAY | 1.68 g | 1 g | 3 g | 4.96 |
| 9K | COMPADRE | 0.125 mL | 1 g | 3 g | 5.11 |
| 9L | IN PLACE | 1.5 g | 1 g | 3 g | 5.15 |
| 9M | BRONC MAX EDT | 2 mL | 1 g | 3 g | 5.14 |
| 9N | EDT CONCENTRATE | 2 mL | 1 g | 3 g | 5.18 |
| 9O | COVERAGE | 3.1 mL | 1 g | 3 g | 5.14 |
| 9P | BRONC PLUS DRY EDT | 2.4 g | 1 g | 3 g | 5.12 |
| 9Q | GARDIAN | 0.75 mL | 2 g | 6 g | 5.03 |
| 9R | GARDIAN PLUS | 5 mL | 2 g | 6 g | 4.97 |
| 9S | DRI-GARD | 1.44 g | 2 g | 6 g | 4.94 |
| 9T | PRO-ONE XL | 1.56 g | 2 g | 6 g | 4.96 |
| 9U | ARRAY | 1.68 g | 2 g | 6 g | 5 |
| 9V | COMPADRE | 0.125 mL | 2 g | 6 g | 5.06 |
| 9W | IN PLACE | 1.5 g | 2 g | 6 g | 5.13 |
| 9X | BRONC MAX EDT | 2 mL | 2 g | 6 g | 5.1 |
| 9Y | EDT CONCENTRATE | 2 mL | 2 g | 6 g | 5.08 |
| 9Z | COVERAGE | 3.1 mL | 2 g | 6 g | 5.11 |
| 9AA | BRONC PLUS DRY EDT | 2.4 g | 2 g | 6 g | 5.02 |
| | | | P.MAX | | |
| 9BB | GARDIAN | 0.75 mL | 1 g | 3 g | 4.9 |
| 9CC | GARDIAN PLUS | 5 mL | 1 g | 3 g | 4.84 |
| 9DD | DRI-GARD | 1.44 g | 1 g | 3 g | 4.82 |
| 9EE | PRO-ONE XL | 1.56 g | 1 g | 3 g | 4.8 |
| 9FF | ARRAY | 1.68 g | 1 g | 3 g | 4.78 |
| 9GG | COMPADRE | 0.125 mL | 1 g | 3 g | 4.86 |
| 9HH | IN PLACE | 1.5 g | 1 g | 3 g | 4.87 |
| 9II | BRONC MAX EDT | 2 mL | 1 g | 3 g | 4.95 |
| 9JJ | EDT CONCENTRATE | 2 mL | 1 g | 3 g | 4.89 |
| 9KK | COVERAGE | 3.1 mL | 1 g | 3 g | 4.93 |
| 9LL | BRONC PLUS DRY EDT | 2.4 g | 1 g | 3 g | 4.9 |
| 9MM | GARDIAN | 0.75 mL | 2 g | 6 g | 4.82 |
| 9NN | GARDIAN PLUS | 5 mL | 2 g | 6 g | 4.76 |
| 9OO | DRI-GARD | 1.44 g | 2 g | 6 g | 4.75 |
| 9PP | PRO-ONE XL | 1.56 g | 2 g | 6 g | 4.75 |
| 9QQ | ARRAY | 1.68 g | 2 g | 6 g | 4.76 |
| 9RR | COMPADRE | 0.125 mL | 2 g | 6 g | 4.8 |
| 9SS | IN PLACE | 1.5 g | 2 g | 6 g | 4.87 |
| 9TT | BRONC MAX EDT | 2 mL | 2 g | 6 g | 4.92 |
| 9UU | EDT CONCENTRATE | 2 mL | 2 g | 6 g | 4.9 |
| 9VV | COVERAGE | 3.1 mL | 2 g | 6 g | 4.88 |
| 9WW | BRONC PLUS DRY EDT | 2.4 g | 2 g | 6 g | 4.86 |

The Table 9a formulations were evaluated for compatibility by observing the appearance after storage at room temperature after one hour. After one hour, the solutions were poured through a 150 micron sieve and observed for the presence of solids. The results are reported in Table 9b below.

TABLE 9b

| Form. | Observations | Separations |
|---|---|---|
| 9A | Clear | None |
| 9B | Clear | None |
| 9C | Hazy White | None |
| 9D | Hazy White | None |
| 9E | Suspension that separates out in a few hours | Undissolved particles |
| 9F | Clear | None |
| 9G | Clear | None |

TABLE 9b-continued

| Form. | Observations | Separations |
|---|---|---|
| 9H | Hazy | None |
| 9I | Clear | Undissolved particles |
| 9J | Suspension that separates out in a few hours | — |
| 9K | Transparent blue-green solution | None |
| 9L | Hazy light blue | 1 mm cream, 4 mm oil |
| 9M | Clear blue | None |
| 9N | Clear blue | None |
| 9O | Hazy light blue | 5 mm cream, 7 mm oil |
| 9P | Very hazy, light blue | Undissolved particles |
| 9Q | Clear | None |
| 9R | Clear | None |
| 9S | Hazy | None |
| 9T | Dissolved better than with 3 g W.MAX | Undissolved particles |
| 9U | Suspension that separates out in a few hours | — |
| 9V | Transparent blue-green solution | None |
| 9W | Hazy light blue | 3 mm oil |
| 9X | Clear blue | None |
| 9Y | Clear blue | None |
| 9Z | Hazy light blue | 1 mm cream, 6 mm oil |
| 9AA | Very hazy, light blue | Undissolved particles |
| 9BB | Clear | None |
| 9CC | Clear | None |
| 9DD | Hazy | None |
| 9EE | Clear | None |
| 9FF | Suspension that separates out in a few hours | — |
| 9GG | Clear | None |
| 9HH | Hazy White | 4 mm oil |
| 9II | Clear | None |
| 9JJ | Clear | None |
| 9KK | Very hazy white | 7 mm oil |
| 9LL | Clear | Undissolved particles |
| 9MM | Clear | None |
| 9NN | Clear | None |
| 9OO | Hazy | None |
| 9PP | Clear | None |
| 9QQ | Suspension that separates out in a few hours | — |
| 9RR | Clear | None |
| 9SS | Hazy White | 5 mm oil |
| 9TT | Clear | None |
| 9UU | Clear | None |
| 9VV | Very hazy white | 8 mm oil |
| 9WW | Clear | Undissolved particles |

GARDIAN, GARDIAN PLUS, COMPADRE, BRONC MAX EDT and EDT CONCENTRATE were compatible with all of the mixtures and dicamba alone. Each created clear solutions with no separation and left little to no particles on a 150 um sieve. DRI-GARD dissolved well, but the solutions were all hazy. PRO-ONE XL did create clear solutions but some particles would not dissolve in the tests containing ROUNDUP WEATHER MAX. In all cases ARRAY appeared to suspend for a few hours, but precipitated with time leaving a large amount of residue on the Nessler tubes. IN-PLACE and COVERAGE created emulsions that separated quickly. BRONC PLUS DRY EDT did not dissolve completely.

PRO-ONE XL and BRONC PLUS MAX EDT were the only formulations to show clear differences in compatibility between ROUDNUP WEATHER MAX and ROUNDUP POWER MAX. PRO-ONE XL dissolved better in ROUNDUP POWER MAX and BRONC PLUS MAX EDT created a clear solution with Power Max but created a hazy solution with ROUNDUP WEATHER MAX.

Example 10

The aqueous solubility of the various salts of dicamba prepared from the bases sodium, potassium, DGA, MEA and hexamethylene diamine (HMDA) salt of dicamba was measured. The maximum solubility was measured by taking a solution of that salt containing salt crystals and equilibrating the solution at 20° C. and 0° C. for 5 to 7 days. The solution was then passed through a 0.45 micron filter and assayed by HPLC for soluble dicamba. The results are reported in Table 10a below where "salt" refers to the dicamba salt, the solubility in reported in wt % acid equivalent (a.e.) and wt % active ingredient (a.i.).

TABLE 10a

| Salt | 20° C. a.e. | 20° C. a.i. | 0° C. a.e. | 0° C. a.i. | Comments |
|---|---|---|---|---|---|
| Na | 36.3 | 40.3 | 33 | 36.3 | Crystals form easily |
| K | 54.6 | 64 | 52.7 | 61.8 | Crystals form on surfaces easily |
| DGA | <50 | — | — | — | Crystals formed slowly |
| MEA | >71.9 | >91.8 | — | — | No crystals, sticky oil |
| HMDA | 14.1 | 17.8 | 11.2 | 14.1 | Pasty solid |

The solutions of the MEA and DGA salts were found to be particularly difficult to get to form crystals. The MEA salt solution did not form crystals and it took several weeks for a DGA salt solution at ~57% a.e. to start to form crystals. It should be noted that, when these salt solutions dry on a glass surface, in some experiments a sticky residue is left that does not form crystals. In other experiments crystals did form upon drying MEA dicamba solutions. The data show that it can be difficult to initiate crystal growth from MEA dicamba solutions.

The Na and K salts formed crystals very readily on a glass surface. As the solution dried, a powdery residue of salt formed quickly and readily.

In a second experiment, the aqueous solubility of the sodium, potassium, DGA and MEA salts of dicamba and dicamba acid were measured at 20° C. was measured. The results are reported in Table 10b below:

TABLE 10b

| Dicamba | wt % a.e. @20° C. | wt % a.i. @20° C. |
|---|---|---|
| acid | 0.4 | — |
| sodium salt | 36.3 | 40.3 |
| potassium salt | 54.6 | 64 |
| DGA salt | 56.5 | 83.4 |
| MEA salt | 66.1 | 84.4 |

Example 11

The compatibility of 480 and 600 g a.e./L solutions of MEA dicamba with various surfactants was evaluated as a function of cloud point. The results are reported in Table 11a below where "salt" refers to the dicamba salt, "wt % a.e." refers to the dicamba concentration, "Surf Conc" refers to the surfactant concentration and "Cld Pt" refers to cloud point. Formulations having a dicamba loading of 38.5-40 wt % a.e. contained about 480 g a.e./L dicamba and formulations having a dicamba loading of 48 wt % a.e. contained about 600 g a.e./L dicamba.

TABLE 11a

| Form. | Salt | wt % a.e. | Surfactant | Surf Conc | Cld Pt |
|---|---|---|---|---|---|
| 11A | K | 38.5 | Surf3 | 10 wt % | >90° C. |
| 11B | K | 38.5 | Surf29 | 10 wt % | >90° C. |
| 11C | MEA | 38.5 | Surf3 | 10 wt % | >90° C. |
| 11D | MEA | 38.5 | Surf29 | 10 wt % | >90° C. |
| 11E | MEA | 38.5 | Surf30 | 10 wt % | >90° C. |
| 11F | MEA | 38.5 | Surf31 | 10 wt % | >90° C. |
| 11G | MEA | 38.5 | Surf32 | 10 wt % | >90° C. |
| 11H | MEA | 38.5 | Surf33 | 10 wt % | >90° C. |
| 11I | MEA | 38.5 | Surf34 | 10 wt % | >90° C. |
| 11J | K | 38.5 | Surf30 | 10 wt % | >90° C. |
| 11K | K | 38.5 | Surf31 | 10 wt % | >90° C. |
| 11L | K | 38.5 | Surf32 | 10 wt % | >90° C. |
| 11M | K | 38.5 | Surf33 | 10 wt % | >90° C. |
| 11N | K | 38.5 | Surf34 | 10 wt % | >90° C. |
| 11O | K | 38.5 | Surf35 | 10 wt % | >90° C. |
| 11P | K | 38.5 | Surf5 | 10 wt % | >90° C. |
| 11Q | MEA | 38.5 | Surf35 | 10 wt % | >90° C. |
| 11R | MEA | 38.5 | Surf5 | 10 wt % | >90° C. |
| 11S | MEA | 38.5 | Surf4 | 10 wt % | >90° C. |
| 11T | K | 38.5 | Surf4 | 10 wt % | >90° C. |
| 11U | MEA | 38.5 | Surf36 | 0.8 wt % | >90° C. |
| 11V | MEA | 38.5 | Surf36 | 2.7 wt % | >90° C. |
| 11W | MEA | 38.5 | Surf37 | 10 wt % | >90° C. |
| 11X | K | 38.5 | Surf37 | 10 wt % | >90° C. |
| 11Y | K | 38.5 | Surf2 | 15 wt % | >90° C. |
| 11Z | MEA | 38.5 | Surf2 | 15 wt % | >90° C. |
| 11AA | MEA | 38.5 | Surf40 | 10 wt % | >90° C. |
| 11BB | MEA | 48 | Surf3 | 10 wt % | >90° C. |
| 11CC | MEA | 48 | Surf38 | 10 wt % | >90° C. |
| 11DD | MEA | 48 | Surf1 | 10 wt % | >90° C. |
| 11EE | MEA | 48 | Surf36 | 1.5 wt % | >90° C. |
| 11FF | MEA | 48 | Surf34 | 10 wt % | >90° C. |
| 11GG | MEA | 48 | Surf39 | 10 wt % | >90° C. |
| 11HH | MEA | 48 | Surf6 | 10 wt % | >90° C. |
| 11II | MEA | 48 | Surf2 | 10 wt % | >90° C. |
| 11JJ | MEA | 48 | Surf4 | 10 wt % | >90° C. |
| 11KK | MEA | 40 | Surf5 | 8 wt % | >90° C. |
| 11LL | MEA | 48 | Surf29 | 14 wt % | >90° C. |

It is demonstrated by this data that a wide range of different types of surfactants are surprisingly compatible with highly concentrated K and MEA salt solutions of dicamba.

Example 12

Aqueous tank mix compatibility of the Na, MEA and DGA dicamba salts with potassium glyphosate was measured. A 35.8% a.e. aqueous solution of the dicamba salt solution was added to an aqueous solution comprising 7.7% Roundup POWERMAX® herbicide (containing 540 g a.e./L potassium glyphosate) until precipitation was noted. The weight of the dicamba solution that caused precipitation was noted. The results are reported in Table 12a below where "salt" refers to the dicamba salt and "g to crystals" refers to the total amount of grams of dicamba a.e. that were required to induce crystallization or precipitation of crystals.

TABLE 12a

| Salt | g to crystals | Comment |
|---|---|---|
| Na | 13.6 | — |
| DGA | >17 | CLARITY-clear solution with no precipitate |
| MEA | >34.2 | Clear solution, no precipitate |

Only the sodium salt induced crystallization in the presence of potassium glyphosate.

Formulation 11BB was discovered to have low viscosity demonstrating that a 600 g/L a.e. MEA dicamba formulation containing 10% surfactant has a low viscosity and would be easily pumpable. The viscosity as a function of temperature was measured and the results are reported in Table 12b below.

TABLE 12b

| Temp (° C.) | Viscosity (cP) |
|---|---|
| 2.5 | 201.4 |
| 6.5 | 161.5 |
| 10.5 | 127.1 |
| 14.6 | 99.7 |
| 18.3 | 79.4 |
| 22.1 | 63.7 |
| 26 | 52.2 |
| 29.8 | 42.7 |

Example 13

In certain formulations containing MEA dicamba and polyimine polymer, the polymer may precipitate upon dilution, particularly at low pH. Addition of APA surfactants to these formulations was evaluated to determine if polyimine polymer dissolution could be facilitated.

A MEA dicamba solution was prepared by mixing together 799.9 grams (64% w/w/) dicamba acid, 198.6 grams (15.9% w/w) MEA and 251.4 grams (20.1% w/w) water until dissolved.

A 16.6% Lupasol P (Poly1) solution was prepared by mixing together 58.2 grams (33.1% w/w) Lupasol P (50%) and 117.5 grams (66.9% w/w water) until dissolved.

Formulations of MEA dicamba containing Lupasol P, and Armeen APA 8, 10 (Surf43) were prepared by combining, in order, the MEA dicamba solution, water, the Armeen APA, and the Lupasol P solution using the amounts reported in Table 13a.

TABLE 13a

| Form. | MEA dicamba (g) | Poly1 (g) | Surf43 (g) | Water (g) | pH |
|---|---|---|---|---|---|
| 13A | 33.33 | 12.52 | 0 | 4.17 | 9.26 |
| 13B | 33.33 | 12.52 | 1 | 3.15 | 9.33 |
| 13C | 33.33 | 12.52 | 1.5 | 2.65 | 9.35 |
| 13D | 33.33 | 12.54 | 1.75 | 2.41 | 9.38 |
| 13E | 33.33 | 12.55 | 2.01 | 2.17 | 9.4 |

In a series of evaluations, 1 mL of each of the Table 13a formulations were combined with 2 mL ROUNDUP WEATHERMAX and 47 mL water in a 50 mL Nessler tube. The results are reported in Table 13b.

TABLE 13b

| Form. | Observation |
|---|---|
| 13A | Polymer settled to the bottom of the tube as white lumps |
| 13B | White lumps formed, a few settled to the bottom of the tube |
| 13C | White lumps formed then dissolved before settling to bottom |
| 13D | Very few white lumps formed then dissolved before settling to bottom |
| 13E | No lumps formed, dissolved well |

The formulations containing APA surfactant showed little or no precipitation of the polymer compared to formulations containing no APA surfactant.

Aqueous formulations comprising MEA dicamba, Lupasol SK, and APA surfactants were formulated as indicated in Table 13c wherein each formulation contained 480 g a.e./L MEA dicamba, 4.15% a.i. Lupasol SK and 2% APA surfactant.

TABLE 13c

| Formulation | APA |
|---|---|
| 681K7H | Surf41 |
| 682M3D | Surf42 |
| 683Q9L | Surf43 |
| 684V5F | Surf44 |
| 685Y4N | Surf45 |
| 686X8I | Surf46 |
| 687E1R | Surf47 |

For all of the formulations studied, the addition of APA surfactant facilitated dissolution of the polymer and no precipitation upon dilution with water or in ROUNDUP tank mixtures was observed.

Additional formulations with varied concentrations of APA were evaluated. Data is provided in Table 13d wherein each formulation was 480 g a.e./L MEA dicamba and 4.15% a.i. Lupasol SK.

TABLE 13d

| Formulation | wt % Surf43 |
|---|---|
| 521O5B | 0.50% |
| 522C2A | 1.00% |
| 523M9I | 3.00% |
| 524R0P | 4.00% |
| 525L2Z | 5% |

For all of the formulations studied, the addition of APA facilitated dissolution of the polymer and no precipitation upon dilution with water or in ROUNDUP tank mixtures was observed.

Cold temperature stability of aqueous MEA dicamba formulations containing APA was evaluated. The formulation of the MEA dicamba/APA formulations and test results are provided in Table 13e where all formulations contain 4.15% a.i. Lupasol SK and 2% APA.

TABLE 13e

| Form. | % Dicamba (a.e.) | Polymer | APA | -25° C. | -20° C. | -15° C. |
|---|---|---|---|---|---|---|
| 091U6J | 36.00% | None | none | Frozen | Frozen | Liquid |
| 033P3X | 36.00% | Poly5 | None | Liquid | Liquid | Liquid |
| 048L8N | 36.50% | Poly5 | Surf43 | Frozen | Frozen | Liquid |
| 684M1S | 36.30% | Poly5 | Surf45 | Frozen | Liquid | Liquid |
| 686T6G | 36.3% | Poly5 | Surf47 | Frozen | Frozen | Liquid |

An experiment was performed to evaluate the efficacy of application mixtures comprising MEA dicamba, polyimine polymer and APA. The formulations of the experimental dicamba formulations are indicated in table 13f where the dicamba concentration is reported as wt % a.e. and the concentration of the other components in wt % is indicated in parentheses.

TABLE 13f

| Form. | % MEA dicamba a.e. by wt | Poly.(%) | APA |
|---|---|---|---|
| 810B4B | 39.5 | Poly1 (4.15) | Surf43 (2) |
| 810D3E | 39.5 | Poly1 (4.15) | Surf45 (2) |

TABLE 13f-continued

| Form. | % MEA dicamba a.e. by wt | Poly.(%) | APA |
|---|---|---|---|
| 810F9K | 39.5 | Poly1 (4.15) | Surf47 (2) |
| 751W4I | 36.3 | Poly5 (4) | Surf45 (2) |
| 752A4J | 36.3 | Poly5 (4) | Surf47 (2) |
| 811U3Y | 36.3 | Poly3 (4) | Surf43 (2) |
| 812T5F | 36.3 | Poly3 (4) | Surf45 (2) |

The formulations from Table 13f, CLARITY and 925S3J were sprayed over the top of 10-15 cm velvetleaf (ABUTH) plants to evaluate herbicidal efficacy at application rates of 140, 280, and 561 g a.e./ha. Herbicidal efficacy was evaluated 21 days after treatment. The data is presented in Table 13g in an ANOVA summary of formulations mean comparisons by rate.

TABLE 13g

| Form. | 140 g a.e./ha | 280 g a.e/ha | 560 g a.e/ha |
|---|---|---|---|
| CLARITY | 44.2 | 70.8 | 85.0 |
| 925S3J | 57.5 | 80.0 | 90.0 |
| 810B4B | 50.0 | 74.2 | 84.2 |
| 810D3E | 58.3 | 82.5 | 86.7 |
| 810F9K | 64.4 | 74.2 | 86.7 |
| 751W4I | 56.7 | 83.3 | 91.7 |
| 752A4J | 65.8 | 81.7 | 88.3 |
| 811U3Y | 50.0 | 80.0 | 87.5 |
| 812T5F | 61.7 | 75.0 | 90.8 |

At the 140 g a.e./ha application rate 925S3J, 810D3E, 810F9K, 751W4I, 752A4J, and 812T5F were more efficacious than CLARITY. At the 280 g a.e./ha application rate 925S3J, 810D3E, 751W4I, 752A4J, and 811U3Y were more efficacious than CLARITY. At the 560 g a.e./ha application rate 925S3J, 751 W4I and 811U3Y were more efficacious than CLARITY.

The volatility of formulations comprising MEA dicamba, polyimine polymer, and APA was measured and the results are shown in Table 13h below.

TABLE 13h

| Form. | Polymer | % Dicamba | APA | pH | Dicamba ng/L |
|---|---|---|---|---|---|
| 357C8D | Poly1 (1.25) | 10 | Surf43 (4) | 6.98 | 0.413 |
| 358X5Y | Poly1 (1.25) | 10 | Surf43 (4) | 8.00 | 0.321 |
| 359R8Y | Poly1 (1.25) | 10 | Surf43 (4) | 9.02 | 0.051 |
| 360L4F | Poly1 (1.25) | 10 | Surf45 (2) | 7.14 | 0.052 |
| 361M0G | Poly1 (1.25) | 10 | Surf45 (2) | 8.04 | 0.056 |
| 362W7S | Poly1 (1.25) | 10 | Surf45 (2) | 9.21 | 0.049 |
| 475K3N | Poly3 (1.25) | 10 | Surf45 (4) | 7.07 | 0.459 |
| 476I8K | Poly3 (1.25) | 10 | Surf45 (4) | 8.04 | 0.215 |
| 477E9B | Poly3 (1.25) | 10 | Surf45 (4) | 9.03 | 0.039 |

Addition of 2% ACAR 7051 to the formulation comprising MEA dicamba and polyimine polymer greatly reduced dicamba volatility at all 3 pH values of 7.14, 8.04 and 9.21 while addition of 4% Armeen APA 810 showed significant reduction in volatility at pH 9.02.

Example 14

The volatility of MEA dicamba formulations containing polyimine polymer with ROUNDUP herbicides was evaluated and compared with CLARITY+ROUNDUP combination. The dicamba formulations were mixed with ROUNDUP POWERMAX to give a 1:1 ratio of dicamba to glyphosate. The results are shown in Table 14a.

TABLE 14a

| Form. | Dicamba Form. | pH | Polymer | Volatility (ng/L) |
|---|---|---|---|---|
| 114L6H | CLARITY | 4.57 | none | 3.172 |
| 112Q1E | MEA DICAMBA | 4.55 | none | 5.729 |
| 115D5B | MEA DICAMBA | 5.22 | Poly2 | 1.758 |

The dicamba formulation containing the polyimine polymer had reduced volatility compared to both MEA dicamba and CLARITY formulations.

In a further set of experiments, the volatility of aqueous tank mixtures containing dicamba salt and Roundup POWERMAX® was measured. Aqueous formulations were prepared as described in table 14b. The tank mixtures were evaluated for dicamba concentration in the gas phase (air) through air sampling while being exposed to constant temperature and humidity in humidome in growth chambers.

Humidomes were purchased from Hummert International (Part Nos 14-3850-2 for humidomes and 11-3050-1 for 1020 flat tray) and modified by cutting a 2.2 centimeter (cm) diameter hole on one end approx 5 cm from the top to allow for insertion of glass air sampling tube (22 mm OD) containing a polyurethane foam (PUF) filter. The sampling tube was secured with a Viton o-ring on each side of the humidome wall. The air sampling tube external to the humidome was fitted with tubing that was connected to a vacuum manifold immediately prior to sampling.

Formulations containing dicamba were introduced into the humidome in one of two ways. Solutions containing dicamba formulations (20 mL) were placed in a petri dish which was positioned on the flat tray beneath the humidome. Alternatively, the flat tray beneath the humidome was filled 1 liter of sifted dry or wet 50/50 soil (50% Redi-Earth and 50% US 10 Field Soil) to a depth of about 1 cm and dicamba formulations were sprayed over the soil using a track sprayer at a rate of 10 gallons per acre (GPA). To avoid contamination of the sides of the flat tray each tray was nested in an empty tray prior to spraying. In some evaluations, potted soybean or velvetleaf plants were placed on top of the soil.

The flat tray bottom containing the dicamba formulation in a petri dish or on soil was covered with a humidome lid and the lid was secured with clamps. The assembled humidomes were placed in a temperature and humidity controlled environment and connected to a vacuum manifold through the air sampling line. Air was drawn through the humidome and PUF at a rate of 2 liters per minutes (LPM) for 24 hours at which point the air sampling was stopped. The humidomes were then removed from the controlled environment and the PUF filter was removed. The PUF filter was extracted with 20 mL of methanol and the solution was analyzed for dicamba concentration using liquid chromatography-mass spectroscopy methods known in the art. The reported results are an average of 3-6 samples.

Aqueous formulations were prepared as indicated in Table 14b below and humidome results are indicated in Table 14c below. Each formulation contained a combination of the indicated dicamba formulation and POWERMAX and having concentrations of 0.5 wt % a.e. dicamba and 1.5 wt % a.e. glyphosate. In Table 14b, "Form. No." refers to formulation number and "Dicamba form." refers to dicamba formulation. In Table 14c, "T" refers to temperature in degrees centigrade, "RH" refers to relative humidity, "SD" refers to standard deviation, "ng/L" refers to the air sample dicamba concentration in nanograms per liter, "Petri" refers to petri dish, "soil" refers to 50/50 soil (50% Redi-Earth and 50% US 10 Field Soil), "soy" refers to soybean and "vel" refers to velvetleaf.

TABLE 14b

| Form No. | Dicamba form. | Dicamba salt | pH |
|---|---|---|---|
| 14(1) | CLARITY | DGA | 4.46 |
| 14(2) | BANVEL | DMA | 4.47 |
| 14(3) | 968Q3W | MEA | 4.5 |
| 14(4) | 933C3S | MEA | 4.81 |

TABLE 14c

| Form. No. | Medium | Plant | T | RH | Dicamba ng/L | SD | % plant injury |
|---|---|---|---|---|---|---|---|
| 14(1) | Petri | None | 35 | 40 | 0.179 | 0.03 | |
| 14(2) | Petri | None | 35 | 40 | 0.151 | 0.021 | |
| 14(3) | Petri | None | 35 | 40 | 0.209 | 0.057 | |
| 14(4) | Petri | None | 35 | 40 | 0.165 | 0.025 | |
| 14(1) | Petri | Soy | 35 | 40 | 0.115 | 0.045 | 18% 10DAT |
| 14(2) | Petri | Soy | 35 | 40 | 0.202 | 0.084 | 19% 10DAT |
| 14(3) | Petri | Soy | 35 | 40 | 0.071 | 0.02 | 20% 10DAT |
| 14(4) | Petri | Soy | 35 | 40 | 0.056 | 0.018 | 18% 10DAT |
| 14(1) | Soil | Soy | 35 | 40 | 1.254 | 0.145 | 32% 13DAT |
| 14(2) | Soil | Soy | 35 | 40 | 2.851 | 1.258 | 41% 13DAT |
| 14(3) | Soil | Soy | 35 | 40 | 1.308 | 0.044 | 37% 13DAT |
| 14(4) | Soil | Soy | 35 | 40 | 1.139 | 0.073 | 34% 13DAT |
| 14(1) | Soil | Vel | 27 | 40 | 0.384 | 0.162 | 37% 14DAT |
| 14(2) | Soil | Vel | 27 | 40 | 0.594 | 0.208 | 37% 14DAT |
| 14(3) | Soil | Vel | 27 | 40 | 0.462 | 0.154 | 37% 14DAT |
| 14(4) | Soil | Vel | 27 | 40 | 0.228 | 0.097 | 36% 14DAT |
| 14(1) | Soil | Vel | 27 | 40 | 0.487 | 0.198 | 16% 14DAT |
| 14(2) | Soil | Vel | 27 | 40 | 0.697 | 0.183 | 19% 14DAT |
| 14(3) | Soil | Vel | 27 | 40 | 0.649 | 0.283 | 18% 14DAT |
| 14(4) | Soil | Vel | 27 | 40 | 0.302 | 0.103 | 13% 14DAT |

The data in Table 14c indicates that composition 968Q3W (containing MEA dicamba) and BANVEL showed the highest volatility in this humidome test. 933C3S (containing MEA dicamba and Lupasol SK polymer) showed the lowest volatility. Plant injury data was inconclusive in this test.

In a second set of humidome experiments, aqueous formulations were prepared as indicated in Table 14d below. Each formulation contained a combination of the indicated dicamba formulation and POWERMAX and having concentrations of 1 wt % a.e. dicamba and 3 wt % a.e. In Table 14d, "Form. No." refers to formulation number and "Dicamba form." refers to dicamba formulation. In Table 14e, "T" refers to temperature in degrees centigrade, "RH" refers to relative humidity, "SD" refers to standard deviation, "ng/L" refers to the air sample dicamba concentration in nanograms per liter, "soil" refers to 50/50 soil (50% Redi-Earth and 50% US 10 Field Soil) wherein the compositions are applied to the soil, "RR soy" refers to ROUNDUP READY soybean wherein the compositions are applied to the plant canopy, and "DT soy" refers to dicamba tolerant soybean wherein the compositions are applied to the plant canopy.

TABLE 14d

| Form No. | Dicamba form. | Dicamba salt | pH |
|---|---|---|---|
| 14(5) | CLARITY | DGA | 4.41 |
| 14(6) | 968Q3W | MEA | 4.43 |
| 14(7) | 944L8M | DGA | 4.48 |
| 14(8) | 933C3S | MEA | 4.81 |

TABLE 14e

| Form. No. | Medium | T | RH | Dicamba ng/L | SD |
|---|---|---|---|---|---|
| 14(5) | Soil | 27 | 40 | 0.409 | 0.142 |
| 14(6) | Soil | 27 | 40 | 0.632 | 0.186 |
| 14(5) | RR soy | 27 | 40 | 0.77 | 0.194 |
| 14(6) | RR soy | 27 | 40 | 0.822 | 0.347 |
| 14(5) | DT soy | 27 | 40 | 0.619 | 0.112 |
| 14(6) | DT soy | 27 | 40 | 0.837 | 0.144 |
| 14(7) | Soil | 27 | 40 | 0.265 | 0.077 |
| 14(8) | Soil | 27 | 40 | 0.178 | 0.062 |
| 14(7) | RR soy | 27 | 40 | 0.468 | 0.081 |
| 14(8) | RR soy | 27 | 40 | 0.464 | 0.117 |

The data show that the addition of PEI polymer to MEA dicamba formulations reduces the volatility of dicamba from a canopy of ROUNDUP READY soybeans and from a canopy of dicamba tolerant soybeans.

In a set of tube test experiments, aqueous formulations were prepared as indicated in Table 14f below. In Table 14f, "Form. No." refers to formulation number and "Dicamba form." refers to dicamba formulation. Each Table 14f formulation contained 2 wt % a.e. dicamba and 6 wt % a.e. glyphosate. Glyphosate "K salt" refers to the potassium salt of glyphosate wherein the glyphosate source was an aqueous solution containing 47.9 wt % a.e. potassium glyphosate; POWERMAX refers to ROUNDUP POWERMAX®; and WEATHERMAX refers to ROUNDUP WEATHERMAX®. In Table 14g, "SD" refers to standard deviation and "ng/L" refers to the air sample dicamba concentration in nanograms per liter.

TABLE 14f

| Form. No. | Dicmaba Form. | Dicamba Salt | Additional components | Glyphosate |
|---|---|---|---|---|
| 14(9) | BANVEL | DMA | — | K salt |
| 14(10) | 957Y25 | MEA | — | K salt |
| 14(11) | CLARITY | DGA | — | K salt |
| 14(12) | 929P6H | MEA | — | K salt |
| 14(13) | 931F5L | MEA | — | K salt |
| 14(14) | MEA-Dicamba | MEA | 0.2% LUPASOL P + Surf48 | K salt |
| 14(15) | CLARITY | DGA | 0.2% LUPASOL P | K salt |
| 14(16) | MEA-Dicamba | MEA | 0.2% LUPASOL HF | K salt |
| 14(17) | MEA-Dicamba | MEA | 0.2% LUPASOL P + AGM 550 | K salt |
| 14(18) | MEA-Dicamba | MEA | 0.2% LUPASOL FG + Surf3 | K salt |
| 14(19) | CLARITY | DGA | — | POWERMAX |
| 14(20) | 931F5L | MEA | — | POWERMAX |
| 14(21) | 926Y7O | MEA | Surf2 | K salt |
| 14(22) | 925S3J | MEA | Surf48 | K salt |
| 14(23) | 956N5T | MEA | Surf3 | K salt |
| 14(24) | CLARITY | DGA | 0.2% LUPASOL SK | K salt |
| 14(25) | CLARITY | DGA | 0.2% LUPASOL HF | K salt |
| 14(26) | CLARITY | DGA | 0.2% LUPASOL FG | K salt |
| 14(27) | 933C3S | MEA | — | K salt |
| 14(28) | DEA dicamba salt solution | DEA | — | K salt |
| 14(29) | K-Dicamba | K | 0.2% LUPASOL SK | K salt |
| 14(30) | K-Dicamba | K | 0.2% LUPASOL P | K salt |
| 14(31) | K-Dicamba | K | 0.2% LUPASOL HF | K salt |
| 14(32) | K-Dicamba | K | 0.2% LUPASOL FG | K salt |
| 14(33) | MEA-Dicamba | MEA | 0.05% LUPASOL SK + 0.15% LUPASOL P | K salt |
| 14(34) | MEA-Dicamba | MEA | 0.15% LUPASOL SK + 0.05% LUPASOL P | K salt |
| 14(35) | Na-Dicamba | Na | — | K salt |
| 14(36) | Na-Dicamba | Na | — | POWERMAX |
| 14(37) | BANVEL | DMA | 0.2% LUPASOL SK | K salt |
| 14(38) | BANVEL | DMA | 0.2% LUPASOL P | K salt |
| 14(39) | BANVEL | DMA | 0.2% LUPASOL HF | K salt |
| 14(40) | BANVEL | DMA | 0.2% LUPASOL FG | K salt |
| 14(41) | MEA-Dicamba | MEA | 0.15% LUPASOL FG | K salt |
| 14(42) | MEA-Dicamba | MEA | 0.10% LUPASOL FG | K salt |
| 14(43) | MEA-Dicamba | MEA | 0.05% LUPASOL FG | K salt |
| 14(44) | MEA-Dicamba | MEA | 0.05% LUPASOL P + 0.05% LUPASOL HF | K salt |
| 14(45) | MEA-Dicamba | MEA | 0.05% LUPASOL P + 0.05% LUPASOL PN60 | K salt |
| 14(46) | MEA-Dicamba | MEA | 0.05% LUPASOL P + 0.05% LUPASOL FG | K salt |
| 14(47) | MEA-Dicamba | MEA | 0.05% LUPASOL SK + 0.05% LUPASOL FG | K salt |
| 14(48) | MEA-Dicamba | MEA | 0.05% LUPASOL SK + 0.05% LUPASOL HF | K salt |
| 14(49) | MEA-Dicamba | MEA | 0.05% LUPASOL SK + 0.05% LUPASOL PN60 | K salt |
| 14(50) | MEA-Dicamba | MEA | 0.05% LUPASOL FG + 0.05% LUPASOL HF | K salt |
| 14(51) | MEA-Dicamba | MEA | 0.05% LUPASOL FG + 0.05% LUPASOL PN60 | K salt |
| 14(52) | MEA-Dicamba | MEA | 0.05% LUPASOL HF + 0.05% LUPASOL PN60 | K salt |
| 14(53) | K-Dicamba | K | 0.05% LUPASOL P + 0.05% LUPASOL SK | K salt |

TABLE 14f-continued

| Form. No. | Dicmaba Form. | Dicamba Salt | Additional components | Glyphosate |
|---|---|---|---|---|
| 14(54) | K-Dicamba | K | 0.05% LUPASOL P + 0.05% LUPASOL HF | K salt |
| 14(55) | K-Dicamba | K | 0.05% LUPASOL P + 0.05% LUPASOL PN60 | K salt |
| 14(56) | K-Dicamba | K | 0.05% LUPASOL P + 0.05% LUPASOL FG | K salt |
| 14(57) | K-Dicamba | K | 0.05% LUPASOL SK + 0.05% LUPASOL FG | K salt |
| 14(58) | K-Dicamba | K | 0.05% LUPASOL SK + 0.05% LUPASOL HF | K salt |
| 14(59) | K-Dicamba | K | 0.05% LUPASOL SK + 0.05% LUPASOL PN60 | K salt |
| 14(60) | K-Dicamba | K | 0.05% LUPASOL FG + 0.05% LUPASOL HF | K salt |
| 14(61) | K-Dicamba | K | 0.05% LUPASOL FG + 0.05% LUPASOL PN60 | K salt |
| 14(62) | K-Dicamba | K | 0.05% LUPASOL HF + 0.05% LUPASOL PN60 | K salt |
| 14(63) | MEA-Dicamba | MEA | 0.10% LUPASOL FG | K salt |
| 14(64) | MEA-Dicamba | MEA | 0.15% LUPASOL FG | K salt |
| 14(65) | MEA-Dicamba | MEA | 0.21% LUPASOL FG | K salt |
| 14(66) | MEA-Dicamba | MEA | 0.25% LUPASOL FG | K salt |
| 14(67) | MEA-Dicamba | MEA | 0.30% LUPASOL FG | K salt |
| 14(68) | MEA-Dicamba | MEA | 0.41% Surf30 | K salt |
| 14(69) | MEA-Dicamba | MEA | 0.05% LUPASOL HF | K salt |
| 14(70) | MEA-Dicamba | MEA | 0.10% LUPASOL HF | K salt |
| 14(71) | MEA-Dicamba | MEA | 0.15% LUPASOL HF | K salt |
| 14(72) | MEA-Dicamba | MEA | 0.20% LUPASOL HF | K salt |
| 14(73) | MEA-Dicamba | MEA | 0.25% LUPASOL HF | K salt |
| 14(74) | MEA-Dicamba | MEA | 0.30% LUPASOL HF | K salt |
| 14(75) | MEA-Dicamba | MEA | 0.05% LUPASOL P | K salt |
| 14(76) | MEA-Dicamba | MEA | 0.10% LUPASOL P | K salt |
| 14(77) | MEA-Dicamba | MEA | 0.15% LUPASOL P | K salt |
| 14(78) | MEA-Dicamba | MEA | 0.20% LUPASOL P | K salt |
| 14(79) | MEA-Dicamba | MEA | 0.25% LUPASOL P | K salt |
| 14(80) | MEA-Dicamba | MEA | 0.30% LUPASOL P | K salt |
| 14(81) | K-Dicamba | K | 0.05% LUPASOL HF | K salt |
| 14(82) | K-Dicamba | K | 0.10% LUPASOL HF | K salt |
| 14(83) | K-Dicamba | K | 0.15% LUPASOL HF | K salt |
| 14(84) | K-Dicamba | K | 0.20% LUPASOL HF | K salt |
| 14(85) | K-Dicamba | K | 0.25% LUPASOL HF | K salt |
| 14(86) | K-Dicamba | K | 0.30% LUPASOL HF | K salt |
| 14(87) | K-Dicamba | K | 0.05% LUPASOL FG | K salt |
| 14(88) | K-Dicamba | K | 0.10% LUPASOL FG | K salt |
| 14(89) | K-Dicamba | K | 0.15% LUPASOL FG | K salt |
| 14(90) | K-Dicamba | K | 0.20% LUPASOL FG | K salt |
| 14(91) | K-Dicamba | K | 0.25% LUPASOL FG | K salt |
| 14(92) | K-Dicamba | K | 0.30% LUPASOL FG | K salt |
| 14(93) | MEA-Dicamba | MEA | 0.15% LUPASOL FG | POWERMAX |
| 14(94) | MEA-Dicamba | MEA | 0.20% LUPASOL FG | POWERMAX |
| 14(95) | 942T3R | DGA | — | K salt |
| 14(96) | K-Dicamba | K | 0.20% LUPASOL FG | K salt |
| 14(97) | MEA-Dicamba | MEA | 0.25% LUPASOL FG | POWERMAX |
| 14(98) | 942T3R | DGA | — | POWERMAX |
| 14(99) | 942T3R | DGA | — | WEATHERMAX |
| 14(100) | 957Y2S | MEA | — | WEATHERMAX |
| 14(101) | BANVEL | DMA | — | POWERMAX |
| 14(102) | MEA-Dicamba | MEA | 0.2% LUPASOL FG + Surf3 | K salt |
| 14(103) | 933C3S | MEA | — | POWERMAX |
| 14(104) | DGA-Dicamba | DGA | 0.05% LUPASOL FG | K salt |
| 14(105) | DGA-Dicamba | DGA | 0.10% LUPASOL FG | K salt |
| 14(106) | DGA-Dicamba | DGA | 0.15% LUPASOL FG | K salt |
| 14(107) | DGA-Dicamba | DGA | 0.20% LUPASOL FG | K salt |
| 14(108) | DGA-Dicamba | DGA | 0.25% LUPASOL FG | K salt |
| 14(109) | DGA-Dicamba | DGA | 0.30% LUPASOL FG | K salt |
| 14(110) | DGA-Dicamba | DGA | 0.20% LUPASOL SK | K salt |
| 14(111) | DGA-Dicamba | DGA | 0.20% LUPASOL P | K salt |
| 14(112) | DGA-Dicamba | DGA | 0.20% LUPASOL HF | K salt |
| 14(113) | MEA-Dicamba | MEA | 0.20% LUPASOL G20 | K salt |
| 14(114) | MEA-Dicamba | MEA | 0.20% LUPASOL G35 | K salt |
| 14(115) | MEA-Dicamba | MEA | 0.20% LUPASOL G100 | K salt |
| 14(116) | DGA-Dicamba | DGA | 0.20% LUPASOL G20 | K salt |
| 14(117) | DGA-Dicamba | DGA | 0.20% LUPASOL G35 | K salt |
| 14(118) | DGA-Dicamba | DGA | 0.20% LUPASOL G100 | K salt |

TABLE 14g

| Form. No. | pH | Dicamba ng/L | SD |
|---|---|---|---|
| 14(9) | 4.08 | 5.04 | 0.963 |
| 14(10) | 4.08 | 3.052 | 0.682 |
| 14(11) | 4.07 | 2.778 | 0.476 |
| 14(12) | 4.19 | 2.801 | 0.039 |
| 14(13) | 4.46 | 3.483 | 0.336 |
| 14(14) | 4.47 | 3.397 | 0.199 |
| 14(15) | 4.56 | 1.706 | 0.233 |
| 14(16) | 4.51 | 2.622 | 0.113 |
| 14(17) | 4.52 | 3.53 | 0.181 |
| 14(18) | 4.1 | 3.949 | 1.342 |
| 14(19) | 4.36 | 1.811 | 0.13 |
| 14(20) | 4.65 | 1.766 | 0.329 |
| 14(21) | 4.21 | 5.761 | 1.294 |
| 14(22) | 4.23 | 3.566 | 0.184 |
| 14(23) | 4.28 | 3.644 | 0.283 |
| 14(24) | 4.22 | 2.218 | 0.589 |
| 14(25) | 4.69 | 1.7 | 0.015 |
| 14(26) | 4.64 | 1.08 | 0.184 |
| 14(27) | 4.58 | 0.781 | 0.092 |
| 14(28) | 4.1 | 2.398 | 0.592 |
| 14(29) | 4.26 | 2.484 | 0.427 |
| 14(30) | 4.54 | 2.454 | 0.531 |
| 14(31) | 4.53 | 1.527 | 0.085 |
| 14(32) | 4.49 | 1.152 | 0.194 |
| 14(33) | 4.46 | 3.244 | 1.016 |
| 14(34) | 4.35 | 3.176 | 0.153 |
| 14(35) | 4.75 | 0.98 | 0.245 |
| 14(36) | 4.87 | 1.566 | 0.451 |
| 14(37) | 4.15 | 2.685 | 0.45 |
| 14(38) | 4.46 | 3.611 | 0.732 |
| 14(39) | 4.47 | 3.54 | 0.681 |
| 14(40) | 4.48 | 1.879 | 0.045 |
| 14(41) | 4.32 | 2.934 | 0.671 |
| 14(42) | 4.26 | 2.965 | 0.392 |
| 14(43) | 4.23 | 3.416 | 0.591 |
| 14(44) | 4.31 | 4.482 | 0.912 |
| 14(45) | 4.22 | 5.322 | 1.191 |
| 14(46) | 4.29 | 3.052 | 0.492 |
| 14(47) | 4.26 | 2.96 | 0.523 |
| 14(48) | 4.23 | 4.978 | 1.258 |
| 14(49) | 4.15 | 5.453 | 0.981 |
| 14(50) | 4.31 | 2.513 | 0.709 |
| 14(51) | 4.19 | 2.261 | 0.363 |
| 14(52) | 4.21 | 3.605 | 0.888 |
| 14(53) | 4.28 | 3.59 | 1.143 |
| 14(54) | 4.35 | 3.599 | 0.788 |
| 14(55) | 4.21 | 3.459 | 1.033 |
| 14(56) | 4.27 | 2.483 | 0.63 |
| 14(57) | 4.24 | 2.359 | 0.268 |
| 14(58) | 4.23 | 2.545 | 0.543 |
| 14(59) | 4.13 | 4.832 | 0.31 |
| 14(60) | 4.34 | 2.761 | 0.801 |
| 14(61) | 4.23 | 2.962 | 0.709 |
| 14(62) | 4.2 | 2.622 | 0.609 |
| 14(63) | 4.26 | 2.266 | 0.459 |
| 14(64) | 4.32 | 2.51 | 0.41 |
| 14(65) | 4.56 | 0.933 | 0.351 |
| 14(66) | 4.56 | 1.323 | 0.407 |
| 14(67) | 4.66 | 0.898 | 0.188 |
| 14(68) | 4.25 | 3.564 | 0.337 |
| 14(69) | 4.15 | 3.797 | 0.883 |
| 14(70) | 4.27 | 3.953 | 0.702 |
| 14(71) | 4.33 | 3.551 | 0.236 |
| 14(72) | 4.44 | 2.641 | 0.863 |
| 14(73) | 4.51 | 3.228 | 0.54 |
| 14(74) | 4.63 | 2.776 | 0.386 |
| 14(75) | 4.26 | 2.963 | 0.422 |
| 14(76) | 4.34 | 2.829 | 0.868 |
| 14(77) | 4.43 | 2.471 | 0.611 |
| 14(78) | 4.53 | 2.156 | 0.573 |
| 14(79) | 4.59 | 3.311 | 0.104 |
| 14(80) | 4.67 | 2.451 | 0.173 |
| 14(81) | 4.19 | 4.159 | 0.411 |
| 14(82) | 4.28 | 3.417 | 0.487 |
| 14(83) | 4.37 | 3.244 | 0.565 |
| 14(84) | 4.44 | 3.431 | 0.998 |
| 14(85) | 4.49 | 2.972 | 0.676 |
| 14(86) | 4.54 | 2.515 | 0.739 |
| 14(87) | 4.24 | 2.28 | 0.233 |
| 14(88) | 4.33 | 1.91 | 0.458 |
| 14(89) | 4.41 | 1.708 | 0.346 |
| 14(90) | 4.52 | 0.908 | 0.631 |
| 14(91) | 4.58 | 1.146 | 0.207 |
| 14(92) | 4.64 | 1.094 | 0.232 |
| 14(93) | 4.68 | 1.799 | 0.754 |
| 14(94) | 4.71 | 2.412 | 0.84 |
| 14(95) | 4.12 | 1.806 | 0.313 |
| 14(96) | 4.52 | 1.457 | 0.371 |
| 14(97) | 4.77 | 1.251 | 0.38 |
| 14(98) | 4.41 | 1.688 | 0.197 |
| 14(99) | 4.52 | 1.558 | 0.413 |
| 14(100) | 4.449 | 2.347 | 0.457 |
| 14(101) | 4.34 | 3.898 | 0.991 |
| 14(102) | 4.58 | 3.837 | 0.475 |
| 14(103) | 4.61 | 1.391 | 0.087 |
| 14(104) | 4.25 | 1.972 | 0.343 |
| 14(105) | 4.35 | 1.334 | 0.135 |
| 14(106) | 4.43 | 1.334 | 0.25 |
| 14(107) | 4.53 | 1.431 | 0.373 |
| 14(108) | 4.59 | 1.046 | 0.097 |
| 14(109) | 4.63 | 1.149 | 0.394 |
| 14(110) | 4.18 | 3.551 | 0.241 |
| 14(111) | 4.46 | 1.947 | 0.268 |
| 14(112) | 4.45 | 2.725 | 0.634 |
| 14(113) | 4.57 | 1.275 | 0.262 |
| 14(114) | 4.56 | 1.467 | 0.372 |
| 14(115) | 4.53 | 2.797 | 0.936 |
| 14(116) | 4.56 | 1.164 | 0.364 |
| 14(117) | 4.55 | 1.036 | 0.169 |
| 14(118) | 4.54 | 1.34 | 0.204 |

The Table 14g data show that the addition of PEI reduces the volatility of CLARITY (DGA dicamba), BANVEL (DMA dicamba) and potassium dicamba with LUPASOL FG providing the largest reduction. The data further show that lower molecular weight LUPASOL PEIs provide the greatest volatility reduction for MEA dicamba. The data further show that a weight ratio of dicamba a.e. to PEI polymer of about 10:1 provides the best volatility reduction. The data still further show that PEI polymers having a molecular weight in excess of about 5,000 Daltons are preferred.

Example 15

The spray droplet particle size of compositions of the present invention and comparative compositions were measured using an Aerometrics phase doppler particle analysis (PDPA) system. The samples were each diluted in 15 L tap water at 20.0° C. to a final equivalent kilogram per hectare (kg/ha) value based on an application rate of 93 liters per hectare (L/ha). The kg/ha values are disclosed in Table 15a below. For each reported kg/ha value, a corresponding concentration in grams acid equivalent per liter can be calculated from the application rate of 93 L/ha. In particular, values of 0.073, 0.09, 0.28 and 0.56 kg/ha reported in table 15a below correspond to 0.78, 0.97, 3 and 6 g a.e./L, respectively. Where the drift control agents GARDIAN and INTERLOCK are indicated, the concentration is reported in % v/v based on the final diluted formulation.

TABLE 15a

| Formulation | Sample 1 | Sample 2 | Sample 3 | Sample 4 |
|---|---|---|---|---|
| CLARITY | 0.073 | 0.28 | 0.56 | — |
| CLARITY + | 0.073 + | 0.28 + | — | — |

TABLE 15a-continued

| Formulation | Sample 1 | Sample 2 | Sample 3 | Sample 4 |
|---|---|---|---|---|
| GARDIAN | 0.5% v/v | 0.5% v/v | — | — |
| CLARITY | 0.073 + | 0.28 + | — | — |
| INTERLOCK | 0.3% v/v | 0.3% v/v | | |
| 962P0H | 0.073 | 0.28 | 0.56 | — |
| 962P0H + | 0.070 + | 0.28 + | — | — |
| GARDIAN | 0.5% v/v | 0.5% v/v | | |
| 962P0H + | 0.073 + | 0.28 + | — | — |
| INTERLOCK | 0.3% v/v | 0.3% v/v | | |
| 908D1S | 0.073 | 0.28 | 0.56 | — |
| 908D1S + | 0.073 + | — | — | — |
| GARDIAN | 0.5% v/v | | | |
| 908DIS + | 0.073 + | — | — | — |
| INTERLOCK | 0.3% v/v | | | |
| 929P6H | 0.073 | 0.28 | 0.56 | — |
| 929P6H + | 0.073 + | — | — | — |
| GARDIAN | 0.5% v/v | | | |
| 926Y7O | 0.073 | 0.09 | 0.28 | 0.56 |
| 926Y7O + | — | 0.09 + | 0.28 + | — |
| GARDIAN | | 0.5% v/v | 0.5% v/v | |
| 926Y7O + | 0.073 + | — | 0.28 + | — |
| INTERLOCK | 0.3% v/v | | 0.3% v/v | |
| 931F5L | — | 0.28 | 0.56 | — |
| 931F5L + | — | 0.28 + | — | — |
| GARDIAN | | 0.5% v/v | | |
| 931F5L + | — | 0.28 + | — | — |
| INTERLOCK | | 0.3% v/v | | |
| GARDIAN | 0.5% v/v | — | — | — |
| INTERLOCK | 0.3% v/v | — | — | — |

Each mixture was sprayed through a Teejet XR8003VS nozzle tip at 276 kPa (40 psi) at a height of 30 cm above the probe volume of the Aerometrics PDPA laser system. The size range scanned was from 25.7 μm-900.0 μm. The voltage for the photo-multiplier tube (PMT) was set to 325V.

Two types of measurement were made for each treatment: a stationary center measurement under the x-y axes intersection point (center); and a scan down the length of the long x-axis to yield an overall global sample (x-scan). Each measurement was replicated 3 times. These replicates were merged to yield an overall sample. This data was run through a macro program to generate data including (i) average velocity (in meters per second for the entire spray cloud); (ii) D10 (arithmetic mean diameter); (iii) D20 (area mean); (iv) D30 (volume mean); (v) D32 (sauter mean); (vi) 10% and 90% points (The droplet particle size below which 10% (or 90%) of the volume of the measured particles lie); (vii) Volume Median Diameter (Dv0.5—The droplet particle size below which 50% of the volume of particles are contained); (viii) Number Median Diameter (NMD—The particle size below which 50% of the number of droplet particles are contained); (ix) relative span [(90% point-10% point)/VMD, wherein, the smaller the number, the more narrow (monodispersed) the distribution]; (x) percent by volume and number <100 and <150 μm (the proportion of the volume of the spray cloud/number of droplet particles contained within (above/below) a given size range); and (xi) percent distributions by volume and number for 100-200 μm.

The PDPA particle size data for a first set of experiments is reported in Table 15b below.

TABLE 15b

| Formulation | Measurement | % V < 100 μm | % V < 150 μm | % V 100 μm to 200 μm |
|---|---|---|---|---|
| Water | Center | 7.73 | 16.69 | 19.91 |
| | x-scan | 4.32 | 12.02 | 18.75 |

TABLE 15b-continued

| Formulation | Measurement | % V < 100 μm | % V < 150 μm | % V 100 μm to 200 μm |
|---|---|---|---|---|
| CLARITY Sample 1 | Center | 8.11 | 17.49 | 20.54 |
| | x-scan | 4.78 | 12.62 | 18.89 |
| CLARITY Sample 2 | Center | 8.39 | 17.92 | 21.16 |
| | x-scan | 4.44 | 12.19 | 18.87 |
| CLARITY Sample 3 | Center | 9.32 | 19.21 | 21.7 |
| | x-scan | 5.3 | 13.73 | 20.24 |
| 926Y7O Sample 1 | Center | 5.16 | 13.22 | 19.47 |
| | x-scan | 2.99 | 9.79 | 17.03 |
| 926Y7O Sample 3 | Center | 4.66 | 12.19 | 18.42 |
| | x-scan | 2.84 | 9.12 | 16.15 |
| 926Y7O Sample 4 | Center | 6.11 | 14.82 | 20.32 |
| | x-scan | 3.44 | 10.47 | 17.66 |
| 926Y7O + GARDIAN Sample 3 | Center | 6.94 | 15.47 | 17.75 |
| | x-scan | 3.29 | 8.5 | 12.13 |
| 926Y7O + INTERLOCK Sample 3 | Center | 2.49 | 8.15 | 15.18 |
| | x-scan | 2.14 | 7.71 | 15.05 |
| 931F5L Sample 2 | Center | 5.33 | 13.41 | 19.19 |
| | x-scan | 2.91 | 9.39 | 16.43 |
| 931F5L Sample 3 | Center | 3.69 | 10.54 | 17.23 |
| | x-scan | 2.42 | 8.28 | 15.61 |
| 931F5L + GARDIAN Sample 2 | Center | 5.4 | 11.73 | 13.96 |
| | x-scan | 2.47 | 6.43 | 9.45 |
| 931F5L + INTERLOCK Sample 2 | Center | 1.42 | 5.63 | 12.12 |
| | x-scan | 1.39 | 5.74 | 12.5 |

The x-scan results for water, CLARITY Sample 3, 926Y7O Sample 4, 931F5L Sample 3, 908D1S Sample 3 and 929P6H Sample 3 are depicted in FIG. 1.

Analysis of the Table 15b results show that the CLARITY prior art compositions had a greater volume percent at less than 100 μm, less than 150 μm and from 100 μm to 200 μm than each composition of the present invention at comparative dicamba concentrations thereby indicating that the inventive compositions provide a larger average droplet particle size than the comparative prior art compositions.

The PDPA particle size data for a second set of experiments is reported in Table 15c below wherein the dicamba final kg/ha values for formulation 926Y7O Samples 5, 6 and 7 were 0.072, 0.35 and 0.7 kg/ha, respectively.

TABLE 15c

| Formulation | Measurement | % V < 100 μm | % V < 150 μm | % V 100 μm to 200 μm |
|---|---|---|---|---|
| Water | x-scan | 4.7 | 12.78 | 19.5 |
| Water + GARDIAN | x-scan | 2.76 | 7.38 | 10.91 |
| CLARITY Sample 1 | x-scan | 4.78 | 12.62 | 18.89 |
| CLARITY Sample 2 | x-scan | 4.44 | 12.19 | 18.87 |
| CLARITY Sample 3 | x-scan | 5.3 | 13.73 | 20.24 |
| CLARITY + GARDIAN Sample 1 | x-scan | 2.28 | 6.08 | 9.07 |
| CLARITY + INTERLOCK Sample 1 | x-scan | 1.78 | 6.73 | 13.44 |
| 962P0H Sample 1 | x-scan | 4.66 | 12.42 | 18.87 |
| 962P0H Sample 2 | x-scan | 4.45 | 12.5 | 19.13 |

TABLE 15c-continued

| Formulation | Measurement | % V < 100 μm | % V < 150 μm | % V 100 μm to 200 μm |
|---|---|---|---|---|
| 962P0H Sample 3 | x-scan | 4.4 | 12.44 | 19.38 |
| 962P0H + GARDIAN Sample 1 | x-scan | 2.46 | 6.36 | 9.2 |
| 962P0H + INTERLOCK Sample 1 | x-scan | 1.65 | 6.44 | 13.58 |
| 908D1S Sample 1 | x-scan | 4.23 | 11.82 | 18.32 |
| 908D1S Sample 2 | x-scan | 5.19 | 13.59 | 19.81 |
| 908D1S Sample 3 | x-scan | 6.26 | 15.68 | 22.05 |
| 908D1S + GARDIAN Sample 1 | x-scan | 2.86 | 7.41 | 10.59 |
| 908D1S + INTERLOCK Sample 1 | x-scan | 1.5 | 5.89 | 12.69 |
| 929P6H Sample 1 | x-scan | 4.67 | 12.46 | 18.72 |
| 929P6H Sample 2 | x-scan | 4.24 | 11.76 | 18.23 |
| 929P6H Sample 3 | x-scan | 4.31 | 11.72 | 18.04 |
| 929P6H + GARDIAN Sample 1 | x-scan | 2.22 | 5.84 | 8.68 |
| 926Y7O Sample 5 | x-scan | 3.46 | 10.7 | 17.71 |
| 926Y7O Sample 6 | x-scan | 2.69 | 8.9 | 16.6 |
| 926Y7O Sample 7 | x-scan | 5.59 | 14.58 | 21.05 |
| 926Y7O + GARDIAN Sample 2 | x-scan | 2.63 | 7.09 | 10.44 |

Analysis of the Table 15c results show that the CLARITY prior art compositions had a greater volume percent: at less than 100 μm, less than 150 μm and from 100 μm to 200 μm than each of compositions 962P0H Sample 1, 908D1S Sample 1, 908D1S+INTERLOCK Sample 1, 929P6H Samples 1-3, 929P6H+GUARDIAN Sample 1 and 926Y7O Sample 5 of the present invention at comparative dicamba concentrations; at less than 100 μm and from 100 μm to 200 μm than 962P0H Sample 3 at a comparative dicamba concentration; at less than 100 μm and at less than 150 μm than 962P0H+INTERLOCK Sample 1 at a comparative dicamba concentration; and at less than 150 μm and from 100 μm to 200 μm than composition 908D1S Sample 3 at a comparative dicamba concentration thereby indicating that those inventive compositions provide a larger average droplet particle size than the comparative prior art compositions.

The Average velocity (m/sec), NMD (in μm) and span for the measurements reported in Table 15c are reported in Table 15d below.

TABLE 15d

| Formulation | Average velocity (m/sec) | NMD (μm) | Span |
|---|---|---|---|
| Water | 5.55 | 76.97 | 1.22 |
| Water + GARDIAN | 5.6 | 73.14 | 1.02 |
| CLARITY Sample 1 | 5.58 | 73.14 | 1.14 |
| CLARITY Sample 2 | 5.78 | 79.33 | 1.18 |
| CLARITY Sample 3 | 5.58 | 71.77 | 1.18 |
| CLARITY + GARDIAN Sample 1 | 5.69 | 72.47 | 0.97 |
| CLARITY + INTERLOCK Sample 1 | 7.3 | 119.42 | 1.01 |
| 962P0H Sample 1 | 5.53 | 75.23 | 1.15 |
| 962P0H Sample 2 | 5.83 | 79.27 | 1.17 |
| 962P0H Sample 3 | 5.81 | 78.88 | 1.14 |
| 962P0H + GARDIAN Sample 1 | 5.64 | 69.65 | 0.98 |
| 962P0H + INTERLOCK Sample 1 | 7.54 | 124.48 | 1.02 |
| 908D1S Sample 1 | 5.65 | 76.92 | 1.23 |
| 908D1S Sample 2 | 5.69 | 73.44 | 1.27 |
| 908D1S Sample 3 | 5.48 | 70.22 | 1.16 |
| 908D1S + GARDIAN Sample 1 | 5.74 | 72.72 | 1.05 |
| 908D1S + INTERLOCK Sample 1 | 7.57 | 126.58 | 0.94 |
| 929P6H Sample 1 | 5.62 | 73.82 | 1.11 |
| 929P6H Sample 2 | 5.88 | 80.83 | 1.15 |
| 929P6H Sample 3 | 5.85 | 77.96 | 1.11 |
| 929P6H + GARDIAN Sample 1 | 5.67 | 73.36 | 1.05 |
| 926Y7O Sample 5 | 6.3 | 91.54 | 1.05 |
| 926Y7O Sample 6 | 6.53 | 100.98 | 1.21 |
| 926Y7O Sample 7 | 5.66 | 75.35 | 1.11 |
| 926Y7O + GARDIAN Sample 2 | 5.58 | 74.76 | 1.11 |

Analysis of the Table 15d results show that the CLARITY prior art compositions had a smaller median droplet particle size than inventive compositions 962P0H Samples 1 and 3, 962P0H+INTERLOCK Sample 1, 908D1S Sample 1, 908D1S+GARDIAN Sample 1, 908D1S+INTERLOCK Sample 1, 929P6H Samples 1-3, 929P6H+GARDIAN Sample 1, 926Y70 Sample 5 and 926Y7O+GARDIAN Sample 1 at comparative dicamba concentrations thereby indicating that those inventive compositions provide a larger droplet particle size than the comparative prior art compositions.

Example 16

The eye irritation potential of an aqueous formulation of the present invention was evaluated. A formulation consisting 61 wt % a.e. aqueous MEA dicamba solution having a pH of 8.5 was prepared. Eye irritation testing was done according to the methods provided in U.S. Environmental Protection Agency Office of Prevention, Pesticides and Toxic Substances, Health Effects Test Guidelines: OPPTS 870.2400 Acute Eye Irritation. The eyes of 3 rabbit animals were treated with the formulation and were scored for effects on the cornea, iris, and conjunctivae (redness, swelling and discharge). A FIFRA category 3 rating, or moderately irritating, was assigned to the formulation. The results are presenting in Tables 16a-c below.

TABLE 16a

Animal 1

| | Hours | | | | Days | | |
|---|---|---|---|---|---|---|---|
| | 2 | 24 | 48 | 72 | 4 | 7 | 10 |
| Cornea | | | | | | | |
| Opacity | 1 | 2 | 1 | 1 | 1 | 0 | 0 |
| Area | 2 | 4 | 4 | 3 | 3 | 4 | 4 |
| Iris | | | | | | | |
| Values | 1 | 1 | 1 | 1 | 1 | 0 | 0 |
| Conjunctivae | | | | | | | |
| Redness | 3 | 3 | 3 | 3 | 3 | 0 | 0 |
| Chemosis | 3 | 2 | 2 | 2 | 2 | 0 | 0 |
| Discharge | 3 | 3 | 2 | 1 | 1 | 1 | 0 |

TABLE 16b

Animal 2

| | Hours | | | | Days | | |
|---|---|---|---|---|---|---|---|
| | 2 | 24 | 48 | 72 | 4 | 7 | 10 |
| Cornea | | | | | | | |
| Opacity | 1 | 1 | 1 | 1 | 1 | 0 | 0 |
| Area | 2 | 3 | 3 | 1 | 1 | 4 | 4 |
| Iris | | | | | | | |
| Values | 1 | 1 | 1 | 1 | 0 | 0 | 0 |
| Conjunctivae | | | | | | | |
| Redness | 3 | 3 | 3 | 2 | 2 | 0 | 0 |
| Chemosis | 3 | 2 | 2 | 2 | 2 | 0 | 0 |
| Discharge | 3 | 3 | 1 | 0 | 1 | 1 | 0 |

TABLE 16c

Animal 3

| | Hours | | | | Days | | |
|---|---|---|---|---|---|---|---|
| | 2 | 24 | 48 | 72 | 4 | 7 | 10 |
| Cornea | | | | | | | |
| Opacity | 1 | 1 | 1 | 0 | 0 | 0 | 0 |
| Area | 2 | 4 | 4 | 4 | 4 | 4 | 4 |
| Iris | | | | | | | |
| Values | 1 | 1 | 1 | 1 | 1 | 0 | 0 |
| Conjunctivae | | | | | | | |
| Redness | 3 | 3 | 3 | 2 | 2 | 1 | 3 |
| Chemosis | 3 | 2 | 2 | 2 | 2 | 0 | 3 |
| Discharge | 3 | 3 | 1 | 1 | 1 | 1 | 3 |

All treated eyes exhibited corneal opacity, iritis and conjunctivitis within 24 hours after treatment. All eyes were free of positive scores 7 days after treatment and all irritation by 10 days (conjunctival scores of 1 are not considered as positive scores). Based on the results of the study, the MEA dicamba formulation is considered to be moderately irritating to the eye and would likely be classified in FIFRA Category III.

Example 17

The eye irritation potential of formulations 908D1S and 929P6H were evaluated. Eye irritation testing was conducted to comply with Good Laboratory Practices (GLP) regulations as defined in: 40 CFR 160 (U.S. EPA GLP Standards—Pesticide Programs (FIFRA) 1989; OECD Principles of GLP (as revised in 1977) published in ENV/MC/CHEM (98)17, OECD, Paris (1978); and EC Directive 2004/10/EC, Official Journal of the European Union, L50/44 (2004). Testing was done according to the protocol provided in: U.S. Environmental Protection Agency Office of Prevention, Pesticides and Toxic Substances, Health Effects Test Guidelines (OPPTS 870.2400) Acute Eye Irritation; OECD Guideline for the Testing of Chemicals, Test No. 405; and Official Journal of the European Communities, Methods for the Determination of Toxicity, Part B.5 (Eye Irritation), Directive 2004/73/EC.

The eyes of 3 rabbit animals were treated with each formulation to determine the potential for formulations 908D1S and 929P6H to produce irritation from a single instillation via the ocular route. Prior to testing of the formulations, one drop of 2% ophthalmic fluorescein sodium was instilled into both eyes of each rabbit. After about 30 seconds, the eyes were rinsed with physiological saline (0.9% NaCl) and then evaluated and scored for corneal damage and abnormalities using an ultraviolet light source. Three healthy rabbits, not previously tested and without preexisting ocular irritation, were selected for testing. Prior to testing of the formulations, 2-3 drops of ocular anesthetic (Tetracaine Hydrochloride Ophthalmic Solution 0.5%) were placed in each of both eyes of each rabbit. One tenth of a milliliter of the evaluated formulation was instilled in the right eye of the rabbit. The left eye remained untreated and served as a control. Ocular irritation was evaluated at 1, 24, 48 and 72 hours by the method of Draize et al. (Methods for the study of irritation and toxicity of substances applied topically to the skin and mucous membranes, *J. Pharmacol. Exp. Ther.*, 82:377-390 (1944)). The fluorscein dye evaluation method described above was performed at 24 and/or at 48 hours to evaluate the extent of corneal damage. The time interval with the highest mean score (Maximum Mean Total Score—MMTS) for all rabbits was used to classify the test substance by the system of Kay and Calandra (Kay, J. H. and Calandra, J. C., Interpretation of eye irritation tests, *J. Soc. Cos. Chem.*, 13:281-289 (1962)). The results for formulation 929P6H are presented in Tables 17a and b below and the results for formulation 908D1S are presented in Tables 17c-e below.

TABLE 17a

EEC Mean Scores for formulation 929P6H.

| Rabbit No. | Corneal Opacity | Iris Lesion | Conjunctival Redness | Conjunctival Chemosis |
|---|---|---|---|---|
| 1 (Male) | 0.3 | 0.0 | 1.0 | 0.0 |
| 2 (Female) | 0.0 | 0.0 | 0.0 | 0.0 |
| 3 (Female) | 0.0 | 0.0 | 0.0 | 0.0 |

Formulation 929P6H is classified as mildly irritating to the eye and meets the requirements for the EC classification of "No classification for ocular irritation.

TABLE 17b

Individual scores for ocular irritation for formulation 929P6H

|  | Hour 1 | Hour 24 | Hour 48 | Hour 72 |
|---|---|---|---|---|
| Rabbit No. 1 (Male) | | | | |
| I. Cornea | | | | |
| A. Opacity | 0 | 1[a] | 0[a] | 0 |
| B. Area | 4 | 1 | 4 | 4 |
| (A × B) × 5 | 0 | 5 | 0 | 0 |
| II. Iris | | | | |
| A. Values | 0 | 0 | 0 | 0 |
| A × 5 | 0 | 0 | 0 | 0 |
| III. Conjunctivae | | | | |
| A. Redness | 2 | 2 | 1 | 0 |
| B. Chemosis | 1 | 0 | 0 | 0 |
| C. Discharge | 2 | 2 | 1 | 0 |
| (A + B + C) × 2 | 10 | 8 | 4 | 0 |
| Total | 10 | 13 | 4 | 0 |
| Rabbit No. 2 (Female) | | | | |
| I. Cornea | | | | |
| A. Opacity | 0 | 0[a] | 0 | 0 |
| B. Area | 4 | 4 | 4 | 4 |
| (A × B) × 5 | 0 | 0 | 0 | 0 |
| II. Iris | | | | |
| A. Values | 0 | 0 | 0 | 0 |
| A × 5 | 0 | 0 | 0 | 0 |
| III. Conjunctivae | | | | |
| A. Redness | 1 | 0 | 0 | 0 |
| B. Chemosis | 0 | 0 | 0 | 0 |
| C. Discharge | 2 | 0 | 0 | 0 |
| (A + B + C) × 2 | 6 | 0 | 0 | 0 |
| Total | 6 | 0 | 0 | 0 |
| Rabbit No. 3 (Female) | | | | |
| I. Cornea | | | | |
| A. Opacity | 0 | 0[a] | 0 | 0 |
| B. Area | 4 | 4 | 4 | 4 |
| (A × B) × 5 | 0 | 0 | 0 | 0 |
| II. Iris | | | | |
| A. Values | 0 | 0 | 0 | 0 |
| A × 5 | 0 | 0 | 0 | 0 |
| III. Conjunctivae | | | | |
| A. Redness | 2 | 0 | 0 | 0 |
| B. Chemosis | 1 | 0 | 0 | 0 |
| C. Discharge | 2 | 1 | 0 | 0 |
| (A + B + C) × 2 | 10 | 2 | 0 | 0 |
| Total | 10 | 2 | 0 | 0 |

[a]2% ophthalmic fluorscein used to evaluate the extent or verify the absence of corneal opacity

TABLE 17c

EEC Mean Scores for formulation 908D1S

| Rabbit No. | Corneal Opacity | Iris Lesion | Conjunctival Redness | Conjunctival Chemosis |
|---|---|---|---|---|
| 4 (Female) | 1.0 | 0.0 | 2.0 | 1.3 |
| 5 (Female) | 1.0 | 0.0 | 2.0 | 1.3 |
| 6 (Female) | 1.0 | 0.0 | 2.0 | 1.3 |

Formulation 908D1S is classified as mildly irritating to the eye and meets the requirements for the EC classification of "No classification for ocular irritation."

TABLE 17d

Average scores for ocular irritation for formulation 908D1S

| Time Post Installation | Incidence of Positive Effects | | |
|---|---|---|---|
| | Corneal Opacity | Iritis | Conjunctivitis |
| 1 hour | 2/3 | 2/3 | 3/3 |
| 24 hours | 3/3 | 0/3 | 3/3 |
| 48 hours | 3/3 | 0/3 | 3/3 |
| 72 hours | 3/3 | 0/3 | 3/3 |
| Day 4 | 3/3 | 0/3 | 1/3 |
| Day 7 | 3/3 | 0/3 | 0/3 |
| Day 10 | 3/3 | 0/3 | 0/3 |
| Day 14 | 3/3 | 0/3 | 0/3 |
| Day 17 | 3/3 | 0/3 | 0/3 |
| Day 21 | 3/3 | 0/3 | 0/3 |

TABLE 17e

Mean scores for severity of irritation for formulation 908D1S

| Time Post Installation | Severity of Irritation (Mean Score) |
|---|---|
| 1 hour | 25.0 |
| 24 hours | 30.3 |
| 48 hours | 23.3 |
| 72 hours | 23.3 |
| Day 4 | 20.3 |
| Day 7 | 19.7 |
| Day 10 | 17.3 |
| Day 14 | 15.3 |
| Day 17 | 16.0 |
| Day 21 | 11.0 |

One hour after instillation of formulation 908D1S, two of the three treated eyes exhibited corneal opacity and iritis, and "positive" conjunctivitis was evident in all three eyes. By 24-hours iritis had cleared from both affected eyes, however, corneal opacity and conjunctivitis were present in all three treated eyes. The overall incidence and severity of irritation decreased gradually thereafter. Pannus was observed in all three eyes between Days 14 and 21. By study termination (Day 21), corneal opacity persisted in all treated eyes with minimal conjunctivitis noted in two eyes.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above methods, formulations and processes without departing from the scope of the invention, it is intended that all matter contained in the above description and shown in the accompanying drawing shall be interpreted as illustrative and not in a limiting sense.

What is claimed is:

1. A method for from preparing a herbicidal application mixture, the method comprising:
   mixing (a) a salt of dicamba, (b) a salt of glyphosate, and (c) water to form the herbicidal application having a herbicide concentration from about 0.1 to about 50 g a.e./L, and
   mixing a base or pH buffer with the application mixture such that the base or pH buffer raises the pH of the herbicidal application mixture to be within the range from about 5 to about 10 and the base or pH buffer comprises an ion selected from the group consisting of sodium, potassium, dimethylammonium, monoethanolammonium, isopropylammonium, diglycolammonium, and mixtures thereof.

2. The method of claim 1 wherein the salt of dicamba is selected from the group consisting of the sodium salt of dicamba, potassium salt of dicamba, monoethanolamine salt of dicamba, diglycolamine salt of dicamba, and mixtures thereof.

3. The method of claim 2 wherein the salt of dicamba is the diglycolamine salt of dicamba.

4. The method of claim 1 wherein the pH of the herbicidal application mixture is from about 7 to about 9.

5. The method of claim 1 wherein the base or pH buffer comprises a sodium or potassium ion.

6. The method of claim 1 wherein the method further comprises mixing one or more soluble polybasic polymers with the herbicidal application mixture.

7. The method of claim 1 wherein the weight ratio on an acid equivalent basis of the dicamba salt to the salt of glyphosate in the herbicidal application mixture is from about 5:1 to about 1:5.

8. The method of claim 1 wherein the weight ratio on an acid equivalent basis of the dicamba salt to the salt of glyphosate in the herbicidal application mixture is from about 3:1 to about 1:3.

9. The method of claim 3 wherein the weight ratio on an acid equivalent basis of the dicamba salt to the salt of glyphosate in the herbicidal application mixture is from about 3:1 to about 1:3.

10. The method of claim 2 wherein the salt of dicamba comprises the monoethanolamine salt of dicamba and the weight ratio on an acid equivalent basis of the dicamba salt to the salt of glyphosate in the herbicidal application mixture is from about 3:1 to about 1:3.

11. The method of claim 1 further comprising applying the herbicidal application mixture to a weed.

* * * * *

UNITED STATES PATENT AND TRADEMARK OFFICE
CERTIFICATE OF CORRECTION

| | |
|---|---|
| PATENT NO. | : 11,503,826 B2 |
| APPLICATION NO. | : 15/472425 |
| DATED | : November 22, 2022 |
| INVENTOR(S) | : Daniel R. Wright et al. |

It is certified that error appears in the above-identified patent and that said Letters Patent is hereby corrected as shown below:

In the Claims

Column 79, Claim 1, Line 2: "A method for from preparing a herbicidal application"
Should read -- A method for preparing a herbicidal application --

Column 79, Claim 1, Line 5: "(c) water to form the herbicidal application having a"
Should read -- (c) water to form the herbicidal application mixture having a --

Signed and Sealed this
Third Day of January, 2023

Katherine Kelly Vidal
*Director of the United States Patent and Trademark Office*